United States Patent
Lussier et al.

(10) Patent No.: US 8,910,051 B2
(45) Date of Patent: Dec. 9, 2014

(54) SYSTEMS AND METHODS FOR CONTENT AGGREGATION, EDITING AND DELIVERY

(75) Inventors: Paul Lussier, Venice, CA (US); Nikolas Namikas, Playa Del Rey, CA (US); Dmitry Buslaev, Mill Valley, CA (US); Robert McFarland, Los Angeles, CA (US)

(73) Assignee: Citizenglobal, Inc., Venice, CA (US)

( * ) Notice: Subject to any disclaimer, the term of this patent is extended or adjusted under 35 U.S.C. 154(b) by 637 days.

(21) Appl. No.: 12/847,135

(22) Filed: Jul. 30, 2010

(65) Prior Publication Data
US 2011/0029883 A1 Feb. 3, 2011

Related U.S. Application Data

(60) Provisional application No. 61/230,662, filed on Jul. 31, 2009.

(51) Int. Cl.
| | |
|---|---|
| G06F 3/00 | (2006.01) |
| G11B 27/034 | (2006.01) |
| G11B 27/34 | (2006.01) |
| G06F 3/01 | (2006.01) |
| H04N 5/76 | (2006.01) |
| H04N 21/854 | (2011.01) |
| H04N 21/231 | (2011.01) |
| H04N 21/2343 | (2011.01) |
| H04N 21/472 | (2011.01) |

(52) U.S. Cl.
CPC ............... *G11B 27/034* (2013.01); *H04N 5/76* (2013.01); *H04N 21/854* (2013.01); *G11B 27/34* (2013.01); *H04N 21/231* (2013.01); *H04N 21/234363* (2013.01); *H04N 21/47205* (2013.01)
USPC ........... 715/738; 715/719; 715/723; 386/281; 386/284; 386/283

(58) Field of Classification Search
USPC ......... 715/719, 738, 723, 530, 730, 511, 720, 715/500.1
See application file for complete search history.

(56) References Cited

U.S. PATENT DOCUMENTS

| | | | |
|---|---|---|---|
| 6,292,619 B1 | 9/2001 | Fujita et al. | |
| 6,895,407 B2 * | 5/2005 | Romer et al. | 348/722 |

(Continued)

FOREIGN PATENT DOCUMENTS

| | | |
|---|---|---|
| EP | 1 517 260 A2 | 3/2005 |
| WO | 2007/082171 A2 | 7/2007 |
| WO | 2007/149575 A2 | 12/2007 |

OTHER PUBLICATIONS

U.S. Appl. No. 61/230,662, filed Jul. 31, 2009, Lussier et al.

(Continued)

*Primary Examiner* — Nicholas Augustine
*Assistant Examiner* — Toan Vu
(74) *Attorney, Agent, or Firm* — McDermott Will & Emery LLP

(57) ABSTRACT

Method and systems for editing, receiving and processing video. Media submissions may be received from remote devices associated with a plurality of users, and the media submissions and a copy of the media submissions in a format for easier access may be stored. A data organization structure including a mechanism for providing sets of folders may be provided, the sets of folders configurable based on input from a user. Media submissions may be organized into the respective folders designated by the users based on user input. A media product may be created based on one or more media submissions. The media product may be created by utilizing an editing interface which allows users at different locations to collaboratively edit video over a network.

16 Claims, 41 Drawing Sheets

(56) References Cited

U.S. PATENT DOCUMENTS

| | | | |
|---|---|---|---|
| 7,769,270 B2 | 8/2010 | Nakamura et al. | |
| 7,783,154 B2 | 8/2010 | Wilkins et al. | |
| 8,140,953 B1* | 3/2012 | Weaver | 715/202 |
| 8,141,111 B2 | 3/2012 | Gilley et al. | |
| 8,180,920 B2 | 5/2012 | Mills et al. | |
| 8,218,764 B1* | 7/2012 | Kline | 380/215 |
| 8,311,660 B2 | 11/2012 | Weedlun et al. | |
| 2002/0026398 A1* | 2/2002 | Sheth | 705/37 |
| 2004/0131330 A1 | 7/2004 | Wilkins et al. | |
| 2005/0025454 A1 | 2/2005 | Nakamura et al. | |
| 2005/0050043 A1 | 3/2005 | Pyhalammi et al. | |
| 2005/0114784 A1* | 5/2005 | Spring et al. | 715/762 |
| 2005/0183017 A1* | 8/2005 | Cain | 715/719 |
| 2005/0246745 A1* | 11/2005 | Hirsch et al. | 725/74 |
| 2006/0045473 A1* | 3/2006 | Alterman | 386/69 |
| 2006/0291798 A1 | 12/2006 | Suneya | |
| 2007/0078750 A1* | 4/2007 | Rosenbaum | 705/37 |
| 2007/0094328 A1 | 4/2007 | Birch | |
| 2007/0113184 A1 | 5/2007 | Haot et al. | |
| 2007/0174774 A1 | 7/2007 | Lerman et al. | |
| 2007/0234214 A1 | 10/2007 | Lovejoy et al. | |
| 2007/0255727 A1 | 11/2007 | Hirose et al. | |
| 2007/0277220 A1 | 11/2007 | Shikuma et al. | |
| 2007/0280648 A1* | 12/2007 | Yahata | 386/131 |
| 2008/0002942 A1 | 1/2008 | White et al. | |
| 2008/0013916 A1 | 1/2008 | Sharpe et al. | |
| 2008/0209514 A1* | 8/2008 | L'Heureux et al. | 726/3 |
| 2008/0273862 A1 | 11/2008 | Okamoto et al. | |
| 2009/0094653 A1* | 4/2009 | Shields | 725/109 |
| 2009/0119369 A1 | 5/2009 | Chou | |
| 2009/0192869 A1* | 7/2009 | Irvine et al. | 705/10 |
| 2009/0193345 A1 | 7/2009 | Wensley et al. | |
| 2010/0169977 A1* | 7/2010 | Dasher et al. | 726/26 |
| 2010/0269158 A1* | 10/2010 | Ehler et al. | 726/4 |
| 2010/0281424 A1* | 11/2010 | Vaysburg et al. | 715/810 |
| 2011/0010241 A1* | 1/2011 | Mays | 705/14.49 |
| 2011/0026898 A1 | 2/2011 | Lussier et al. | |
| 2011/0026899 A1 | 2/2011 | Lussier et al. | |
| 2011/0026900 A1 | 2/2011 | Lussier et al. | |
| 2011/0030031 A1 | 2/2011 | Lussier et al. | |
| 2011/0035667 A1 | 2/2011 | Dittmer-Roche | |
| 2011/0258547 A1* | 10/2011 | Symons et al. | 715/723 |
| 2012/0022975 A1* | 1/2012 | L'Heureux et al. | 705/27.1 |

OTHER PUBLICATIONS

International Search report and Written Opinion for PCT Application PCT/US2010/043903 Search report dated Nov. 17, 2010.

International Search report and Written Opinion for PCT Application PCT/US2010/043935 Search report dated Nov. 16, 2010.

United States Office Action issued in U.S. Appl. No. 12/847,098 dated Sep. 27, 2012.

United States Office Action issued in U.S. Appl. No. 12/847,114 dated Dec. 5, 2012.

United States Office Action issued in U.S. Appl. No. 12/847,070 dated Sep. 19, 2012.

Office Action issued in U.S. Appl. No. 12/847,070 mailed Jun. 5, 2013.

Extended European Search Report issued in European Application No. 10805119.4 dated Aug. 28, 2013.

Extended European Search Report issued in European Application No. 10805112.9 dated Jul. 10, 2013.

U.S. Office Action issued in U.S. Appl. No. 12/847,070 dated May 14, 2014.

* cited by examiner

CGS
CITIZEN'S GLOBAL STUDIO

Studios  Projects  Bins  Media  Cuts  Members | Upload  Submit  Edit

Current Studio

☐ CGS
Media  Cuts  All Bins

Log In

Username:
Password:
☐ Remember Me
Log In
Lost Password?
Register

CGS Studio Projects

CGS
CITIZEN'S GLOBAL STUDIO

Just like any other client, CGS makes media too! What we're interested in producing is media that is socially empowering and features narratives about change with particular focus on bringing to light citizens initiatives around the globe which speak to emerging new paradigms and points of view to better engage the public at large and uncover stories of healing and power currently under the global media radar.

CGS Projects [Full List]

| P4P-09 | THEM |

Plan For The Planet
PLAN FOR THE PLANET, the world's first collaborative film event – upload, share and edit the community's...

THEM
There is, perhaps, no more contentious of an issue in the American political debate than immagination....

CGS Studio

CGS Studio
Studio Media
Studio Cuts
All Studio Bins

Upload Media

CGS
Upload Media

Featured Project

THEM
THEM

Figure 13

CGS
CITIZEN'S GLOBAL STUDIO

Studios  Projects  Bins  Media  Cuts  Members | Upload  Submit  Edit

Current Studio

| CGS |
| Media  Cuts  All Bins |

Current Project

| P4P-09 | Plan For The Planet |
| Media  Cuts  All Bins |
| ICON | Causes |
| ICON | Effects |
| ICON | Impacts |
| ICON | Solutions |

PLAN FOR
THE PLANET

World's First Global Participatory Film
A Plan To Save The Planet And Ourselves

"Quote"

-Author

Until now...

PLAN FOR THE PLANET, the world's first collaborative film event – upload, share and edit the community's media into your stories about environmental solutions and climate change stories to be part of the world's first participatory film! It will premiere—care of the entire world—at General Assembly in Copenhagen at upcoming post-Kyoto climate change talks, essentially bringing the entire world to the event.

Plan For The Planet Bins (Full List)

| ICON | ICON | ICON | ICON |
| Solutions | Impacts | Causes | Effects |

Log In

Username: [        ]
Password: [        ]
☐ Remember Me
[Log In]
Lost Password?
Register

Plan For The Planet

| Project Media |
| Project Cuts |
| All Project Bins |
| Project Permissions: |
| Submit Clips – Yes |
| Price Limit - $1.00/sec |
| Submit Cuts - Yes |

Upload Media

P4P-09

Upload Media

Featured Bin

ICON

Flooding

Project's Studio

CGS

CITIZEN'S GLOBAL STUDIO
CGS

Figure 14

CGS
CITIZEN'S GLOBAL STUDIO

Studios  Projects  Bins  Media  Cuts  Members | Upload  Submit  Edit

Search
Type: [All ▼]
Sort: [New to Old ▼]
[Update Results]

| ICON | Solutions<br>Every one of us who share this planet can and must make changes in our own lives – big and small – to reduce our contribution to climate change. Government and industry have a big role to play, but as individuals we too can really make a difference. |

Current Studio

[ ] CGS
Media  Cuts  All Bins

Project Bin: Solutions (Go To Root)

| ICON | ICON | ICON | ICON | ICON | ICON |
|------|------|------|------|------|------|
| Environment Solutions | Water Solutions | Govt. Solutions | Business Solutions | Energy Solutions | Economic Solutions |

| | | | | | ICON |
|---|---|---|---|---|------|
| | | | | | Lifestyle Solutions |

Current Studio

[P4P-09] Plan For The Planet
Media  Cuts  All Bins
[ICON] Causes
[ICON] Effects
[ICON] Impacts
[ICON] Solutions

Solutions Media

| ICON | People's Grocery in Oakland, CA is changing the community through wholesome organic food |
| ICON | People's Grocery in Oakland, CA; empowering the health and economics of West Oakland through local organic foods |

People's Grocery P. seven
By: PeoplesGrocery
Clips: 1  More Info

People's Grocery P. Six
By: PeoplesGrocery
Clips: 2  More Info

| ICON | Community food project improving the health and economics of West Oakland, CA |
| ICON | |

People's Grocery P. 5
By: PeoplesGrocery
Clips: 1  More Info

People's Grocery part four
By: PeoplesGrocery
Clips: 1  More Info

Solutions Media

| ICON | People's Grocery in West Oakland, providing urban poor with fresh, organic food |
| ICON | B-roll of West Oakland, the Neighborhood where The People's Grocery is located. |

People's Grocery part

The People's Grocery

Log In
Username: [          ]
Password: [          ]

Figure 15

Export Settings – Format, Frame Size, Frame Rate, Data Rate – Recorded in Database Close or Esc Key Please select from the settings below for what type of High Definition cut you would like to export. Once you press the "Export" button, it will take some time for the cut to generate, also all previous HD versions of this cut will be removed from the server.

Format: [MPEG-4] — 1801

Frame Size: [1280x720 HD] — 1802

Frame Rate: [24] — 1803

Data Rate: [500 kbits/sec] — 1804

Export HD Cut

Database 2

| Export ID | Cut ID | Export Settings |
|-----------|--------|-----------------|
| 23 | 1 | .mp4, 1280, 720, 24, 500 |

Figure 18

Step ② Audio Components
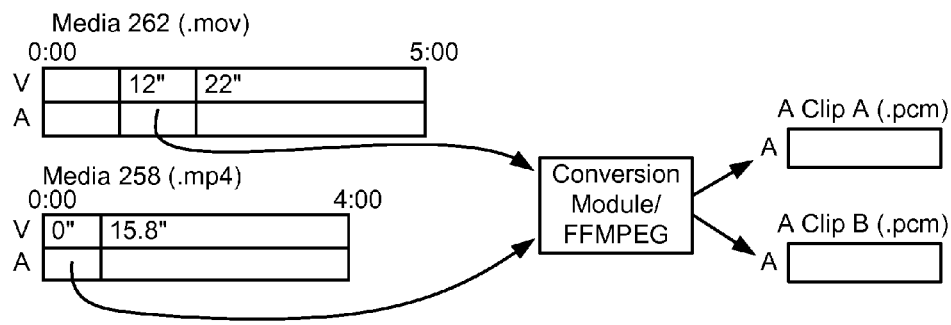
Step ③ Video and Audio Re-Assemble
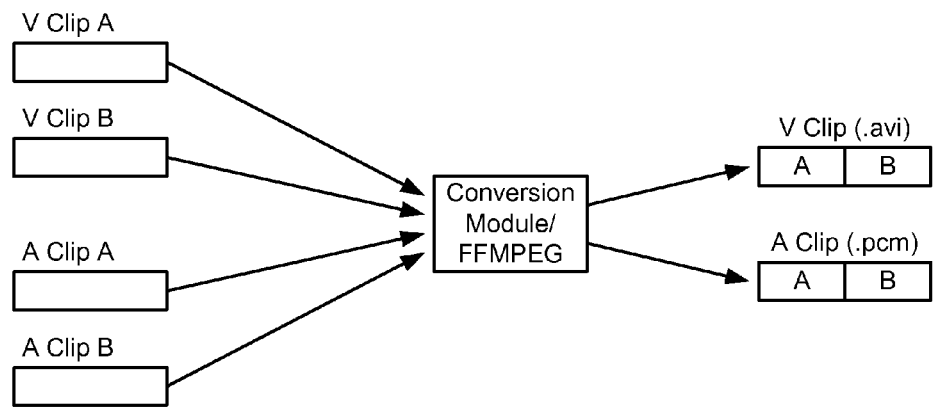
Step ④ Video and Audio Re-Attached
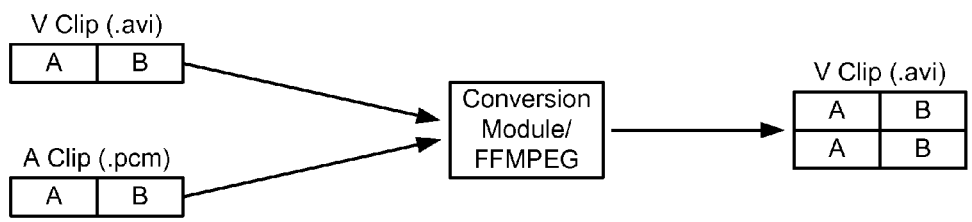
Figure 20

CGS
CITIZEN'S GLOBAL STUDIO

Studios  Projects  Bins  Media  Cuts  Members | Upload  Submit  Edit

Current Studio

☐ CGS
Media  Cuts  All Bins

Current Project

P4P-09  Plan For The Planet
Media  Cuts  All Bins
[ICON] Causes
[ICON] Effects
[ICON] Impacts
[ICON] Solutions

My Stuff

My Wire
My Profile
My Media
My Studios
My Projects
My Bins
My Cuts
My Messages
Media Submits

My Studios

☐ CGS

---

Submit to: Project Bins  My Bins

1. Choose a Studio:
   ☐ CGS

2. Choose a Project:
   P4P-09 | Plan For The Planet

3. Choose a Bin:
   Go Back

| [ICON] | [ICON] | [ICON] |
| Causes | Effects | Impacts |
| ☐ Select | ☐ Select | ☐ Select |

[ICON]
Solutions
☐ Select

Plan For The Planet
Project, accepts media for up to $1.00 per second

PLAN FOR THE PLANET, the world's first collaborative film event -- upload, share and edit the community's media into your stories about environmental solutions and climate change stories to be part of the world's first participatory film! It will

---

Bins & Media

[ICON] My Media
[ICON] My Bins

Refresh      Back to Opened Media

---

Seva Café (Part 3)                         0:00.0 / 1:09.4

-1   -1F   △   +1F   +1  IN  OUT  CLIP

Figure 23

Create & Edit Clip  In: 0:06  Out: 0:26

Clip: New Clip
In: 0:00
Out: 0:00

Title:

Description:

Keywords:

(tags) separated with commas

Back    Save Clip

---

Clip: New Clip    0:26.6 / 1:09.4

0:06.4                 0:26.6

-1    -1F    △    +1F    +1    IN    OUT    CLIP

Figure 24

SYSTEMS AND METHODS FOR CONTENT AGGREGATION, EDITING AND DELIVERY

CROSS REFERENCE

This application claims the benefit of U.S. Provisional Application No. 61/230,662, filed on Jul. 31, 2009, which is incorporated herein by reference in its entirety.

This application is related to co-pending U.S. Non-Provisional application Ser. No. 12/847,070, filed Jul. 30, 2010.

This application is related to co-pending U.S. Non-Provisional application Ser. No. 12/847,081, filed Jul. 30, 2010.

This application is related to co-pending U.S. Non-Provisional application Ser. No. 12/847,098, filed Jul. 30, 2010.

This application is related to co-pending U.S. Non-Provisional application Ser. No. 12/847,114, filed Jul. 30, 2010.

This application is related to co-pending PCT Application No. PCT/US2010/043903, filed Jul. 30, 2010.

This application is related to co-pending PCT Application No. PCT/US2010/043935, filed Jul. 30, 2010.

INCORPORATION BY REFERENCE

All publications, patents, and patent applications mentioned in this specification are herein incorporated by reference to the same extent as if each individual publication, patent, or patent application were specifically and individually indicated to be incorporated by reference in its entirety.

BACKGROUND

The ready availability of digital cameras has generated a vast community of content creators who are able to capture video, audio and other media. Such content creators are constantly seeking avenues for sharing their content with others—either individually or over a community or network of users. Current tools for sharing, editing and delivering such video, however, are often limited in the quality, resolution or formats of results that they are able to produce. Further, current systems generally do not allow other users to utilize or organize media or content in meaningful ways. In addition, current systems for editing video may not allow multiple users to collaboratively edit video, may be frustrating and time consuming for a novice user and can delay significantly or even preclude the production of any meaningful results.

Further, viewers of media and content today are presented with various options with respect to formats for viewing such content. Users are able to view media and content on various types of devices from large screen televisions and personal computers and monitors to PDAs, cell phones and other mobile devices. When content creators and video project producers seek avenues for sharing their content with others, they are often faced with challenges with accommodating the various quality, resolution and formats across a variety of these devices.

SUMMARY

Embodiments of the invention provide systems and methods for content aggregation, editing and delivery. Various aspects of embodiments of the invention described herein may be applied to any of the particular applications set forth below. Embodiments of the invention may be applied as a standalone system or as a component of an integrated solution content aggregation, editing and delivery. The invention can be optionally integrated into existing business and video editing or aggregation processes seamlessly. It shall be understood that different aspects of the systems and methods described herein can be appreciated individually, collectively or in combination with each other.

In one embodiment, a method for editing, receiving and processing video is provided. The method may include: receiving media submissions from remote devices associated with a plurality of users; storing media received from the remote devices associated with the plurality of users and at least a copy of the media received from the remote devices associated with the plurality of users, in a format for easier access; converting the media submissions for storage on a server into the format for easier access; providing a data organization structure including a mechanism for providing sets of folders, the sets of folders configurable based on input from a user, the sets of folders for media received from remote computer systems associated with the plurality of users; displaying a representation of the data organization structure including the sets of folders; organizing media submissions into the respective folders designated by the users based on user input in response to the display of the representation of the data organization including the sets of folders; displaying media from the storage to users creating a media product based on one or more media submissions; and creating the media product based on one or more media submissions based on user input in response to the displayed media from the storage, wherein the created media product is created based on media stored in the storage.

Other concepts relate to unique software for implementing the systems and methods for content aggregation, editing and delivery as described herein. A software product, in accord with this concept, includes at least one machine-readable medium and information carried by the medium. The information carried by the medium may be executable program code, one or more databases and/or information regarding content or media.

Various other methods and systems are included as described in the following description, and as claimed in the claims. Various goals and advantages of the invention will be further appreciated and understood when considered in conjunction with the following description and accompanying drawings. While the following description may contain specific details describing particular embodiments, this should not be construed as limitations to the scope of the invention but rather as exemplary descriptions of embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1-B illustrates a more detailed architecture of the system, in accordance with an embodiment of the invention FIG. 1-C illustrates an architecture of the hardware of the system, in accordance with an embodiment of the invention.

FIG. 1-D illustrates an overall architecture of a system in relation to various users and platforms, in accordance with an embodiment of the invention.

FIG. 13 illustrates a screenshot of a studio page, in accordance with an embodiment of the invention.

FIG. 14 illustrates a screenshot of a project page, in accordance with an embodiment of the invention.

FIG. 15 illustrates a screenshot of a folder page, in accordance with an embodiment of the invention.

FIG. 18 shows how export settings may be customized, in accordance with an embodiment of the invention.

FIGS. 19-21 illustrate an architecture of the process by which footage which has been viewed, aggregated and modified using low-resolution flash copies may be exported into the user's desired format, in accordance with an embodiment of the invention.

FIG. 23 shows a screenshot of a page in which a user may select certain media to create clips in order to submit media/clips to a project, in accordance with an embodiment of the invention.

FIG. 24 shows a larger view of a screenshot of a page in which a user may create a clip from a selected media file, in accordance with an embodiment of the invention.

DETAILED DESCRIPTION

Figure 1A:
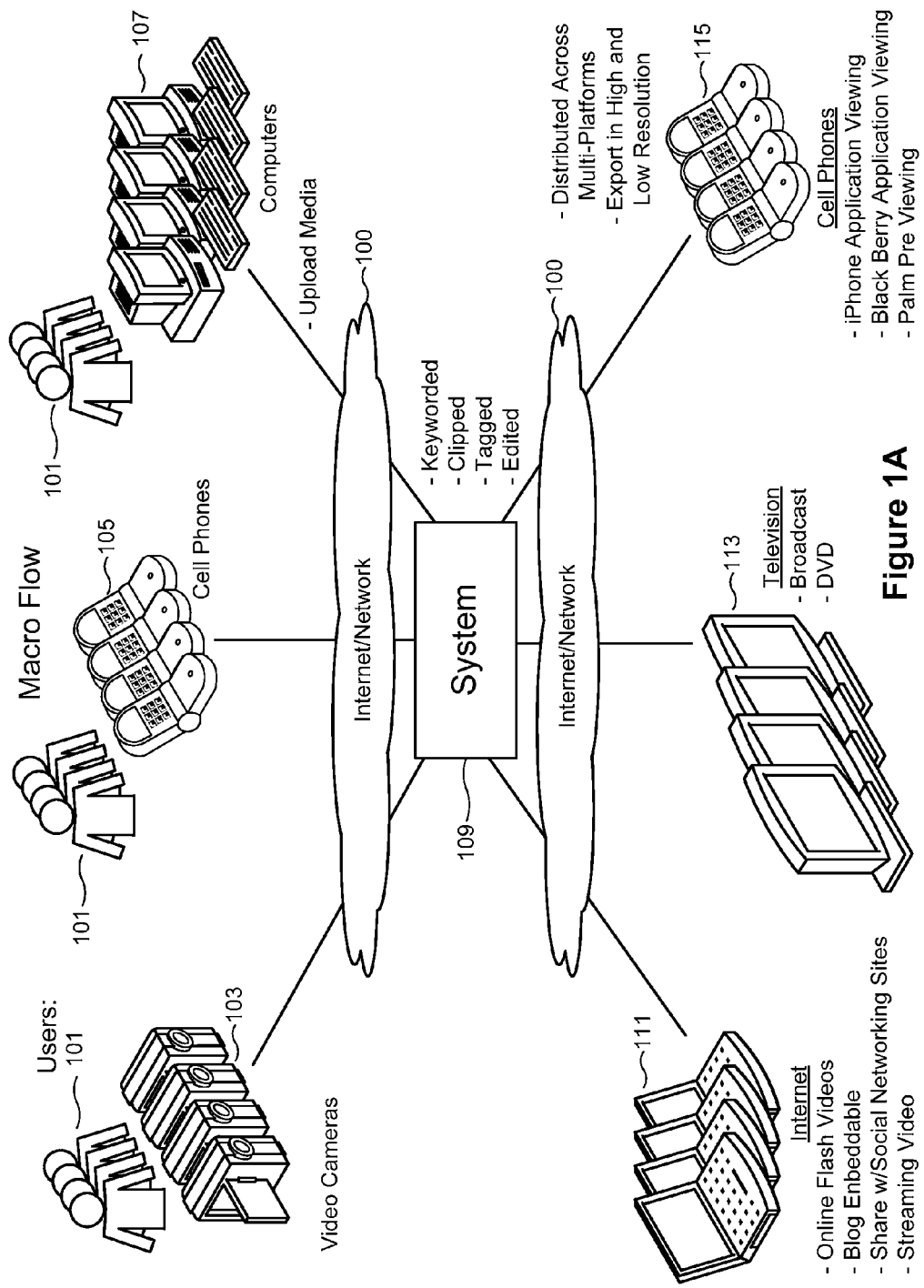
FIG. 1-A describes the overall architecture of a system, in accordance with an embodiment of the invention.
Figure 1B:
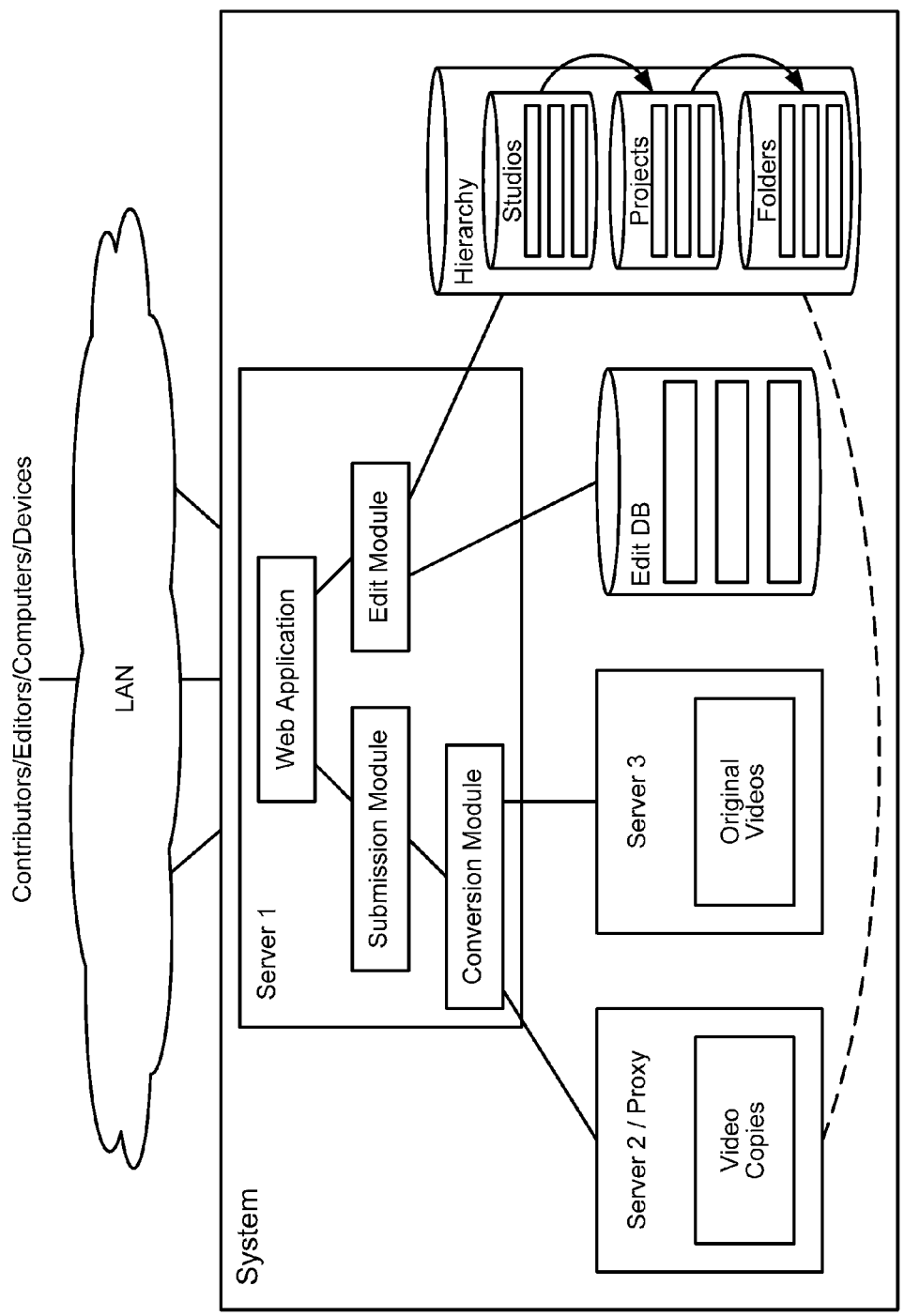
Figure 1C:
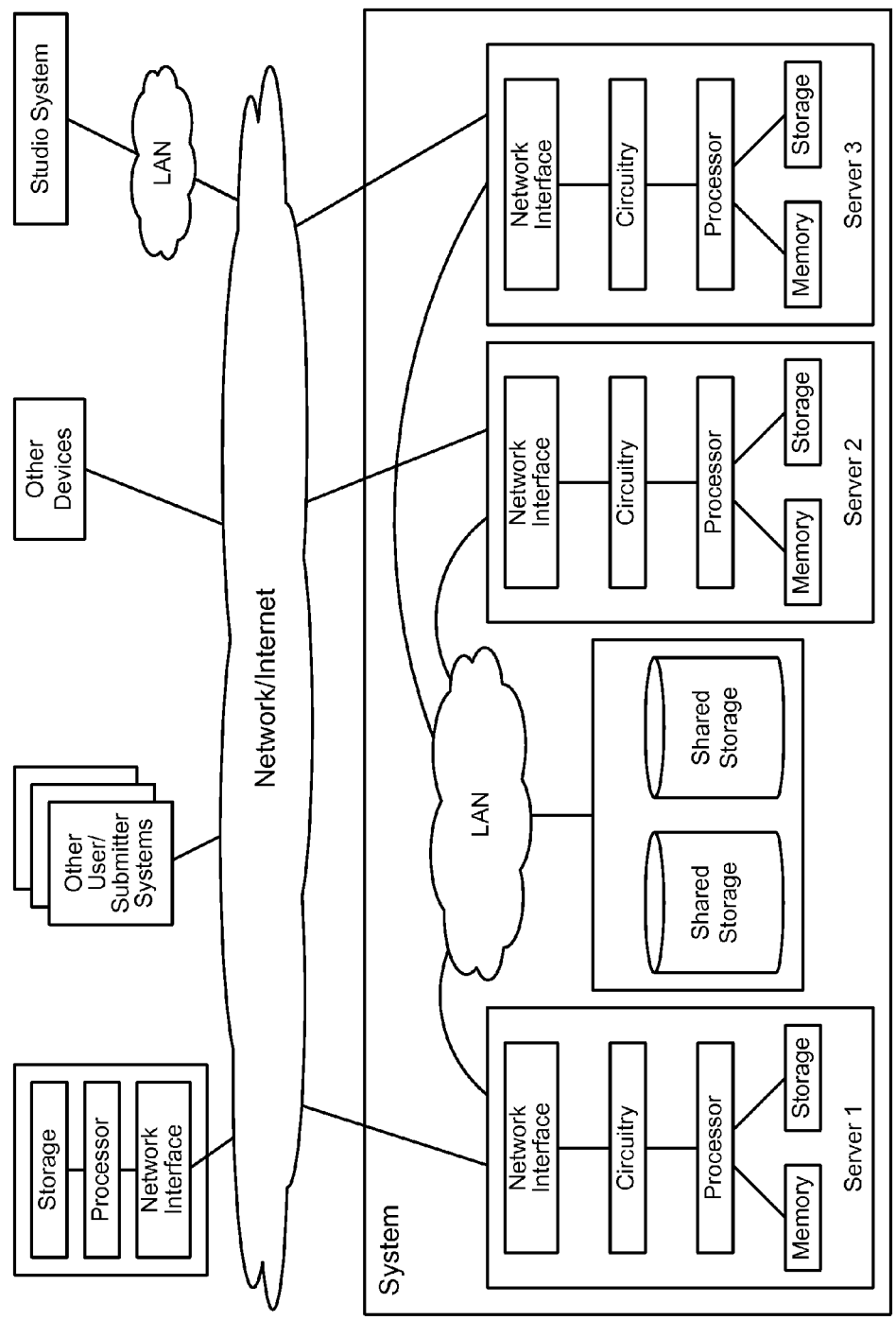
Figure 1D:
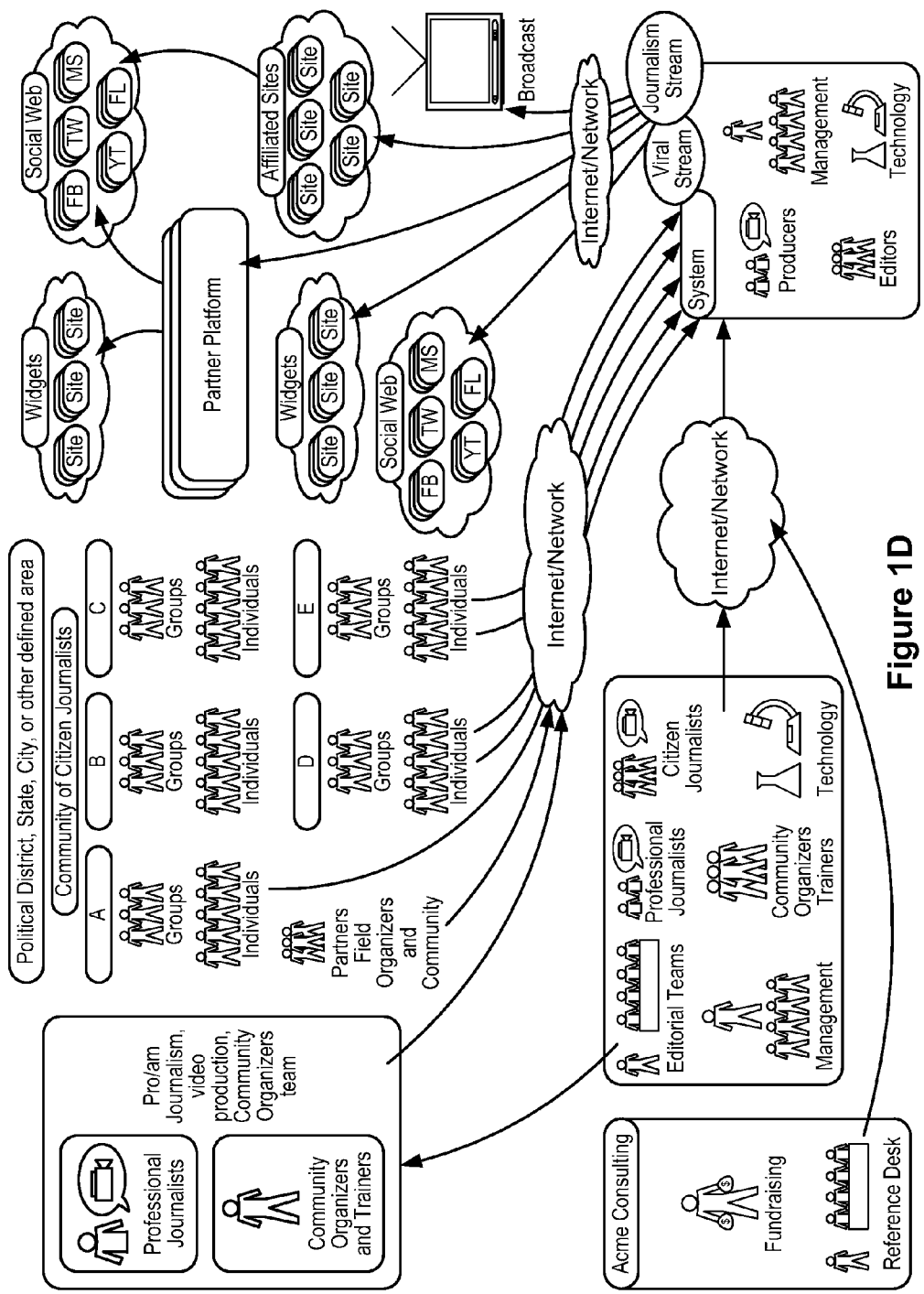

Methods and systems for content aggregation, editing and delivery are described herein. According to one embodiment, high-quality programming can be created with online content, in connection with a user navigating a community that is structured around "projects" for the purposes of getting, shaping, stringing out and remixing clipped selections from user footage from a variety of sources and editing such clips online into a high resolution (e.g., broadcast quality) presentation for television commercials, news, music video, public service announcements, reality programming, broadcast events, etc. Users may be individuals or institutions seeking to create high quality media for any event (including conference, school project, film festival, submission, news release, political campaign) or professional broadcasters and television and other studios (including HBO, CNN, or BBC) seeking to inter-cut storylines generated from edited selections of user footage around the world into their broadcasts.

Through embodiments of the methods and systems described herein, citizen journalists or other users may upload footage in response to a call for an issue or a story put out by another journalist or other user. This footage may be cut, selected, edited, mixed and remixed with other submitters' footage according to the specifications of the journalist that is hosting the story or other project. The journalist can either direct the edit himself if he or she is so inclined, turn to volunteers from the user community to do it with him/her, or to a colleague who is provided certain access to his account to do the editing work for him. Furthermore, while the platform engages citizen journalists in a style and manner that allows them individual journalistic enterprise, it also can help maintain direct editorial control over a product or story in which the citizen has been directly engaged. One can only imagine the impact innovations such as the methods and systems described herein might have on the reach and scope of the news, but also on the next generation of journalists who might consider film training as part of their oeuvre to write news.

Thus, various types of users around the world may utilize the system in a variety of ways. For example, users may upload videos captured with high quality video cameras, or personal home video cameras, or even cell phones. Users may upload videos which have been converted from other media files and that have been stored on their computers. The system may create an environment for users to aggregate, store, edit, and organize their media files, and newly created or edited media may be viewed by users from around the world on a variety of formats as well, including over the Internet, via a television, or even delivered to users on their cell phones or mobile devices.

FIG. 1-A describes the overall architecture of a system, in accordance with an embodiment of the invention. As shown in FIG. 1-A, users 101 may access the system 109 through various means and formats, including over a network such as the Internet 100. The system may allow users 101 to upload videos that have been created using users' video cameras 103, on users' cell phones 105, or users' computers 107. As may be expected, video/media captured by video cameras, cell phones, or other devices and stored on computers may vary in quality and format. Users may utilize the system 109 to aggregate these various media files of varying formats, content and quality, may organize the video files and associate them with certain keyword tags, may clip the video files, may edit the video files, may aggregate the video files, may combine several video/media files into a larger video/media file, or may add special effects or transitions to such video/media files. Media which has been associated with keywords, clipped, tagged, edited, or aggregated may also be distributed across multiple platforms by the system 109. These media files may be exported in both high and low resolution formats, which may be suited for the Internet 111, television 113, cell phones 115, or any other device or medium. For example, the system may export videos in formats for the Internet 111, including online flash videos, blog embeddable videos, videos for sharing on social networking sites, or videos suitable for streaming. The system may also export high-resolution videos suitable for television 113, including high-resolution videos which are of broadcast quality or which may be burned onto a DVD. In addition, the system may export in resolution suitable for videos for cell phones 115, or for smart phones with display devices and operating systems for running applications, such as videos for iPhone application viewing, videos for Blackberry application viewing, or videos for Palm Pre Viewing, or other devices.

FIG. 1-B illustrates a more detailed architecture of the system, in accordance with an embodiment of the invention. The system may include a server, Server 1, with a web application, a submission module, a conversion module and an edit module. The system may also include a second server Server 2, a proxy server, which stores video copies, and a third server, Server 3, which stores original video files. Alternatively, the video copies may be stored on a CDN (content distribution network) or a network of servers. For example, the CDN may be services such as those provided by Akamai and CloudFront. Any kind of distributed computing platform for global Internet content and application delivery is contemplated, and is not limited to those provided by Akamai and CloudFront. The system may include an edit module, which may interact with an edit database, and a hierarchy database, which may include database tables for studios, projects and folders.

As described herein, media or video may be video of physical objects or other real-world images, as well as artificial images. Various types of media are contemplated. For example, the video may comprise a video of any multitude of objects such as a video of a bicycle race, a birthday cake, an industrial machine running, heart surgery, animals and/or natural scenery.

As shown in FIG. 1-B, the system receives media (such as video, images, audio/sound files, effects or other media such as narration or voice over in the form of audio files) from various users, who may be contributors, editors, and the like, in the system's servers, databases, etc. Server 1 may include a web application, which includes a submission module which enables users to upload media files to the system's various databases. Flash copies, or low-resolution copies of the media files may be created by a conversion module and stored on a server, such as Server 2, while the original high-resolution files may be stored on Server 3. When a user uploads a media file to the system's databases, an identifier of the low-resolution media file may be stored in the hierarchy database, and be associated with a studio, a studio's projects, or a project's folders and subfolders. Thus, the low-resolution media file may be accessed by the edit module via the system's various databases. The system may allow users to edit the media files, aggregate the media files, and create clips of the media files through the edit module on Server 1. Media clips may comprise video and/or other media. The media files may be edited via an editing interface on the edit module, and changes to media files, transitions, an edit decision list (EDL), and other metadata may be stored in an edit database. Various media clips comprising video and/or other media may be combined to create an edited media product with portions of various media in an edited and combined fashion. Thus, the system may facilitate the creation of new media which is created from various clips and uploaded media files, which may be concatenated or otherwise combined together along with effects and transitions, and through the conversion module, the new media may be converted to various formats, as designated by various users.

For example, a local news studio may have a project to collect footage relating to the Borneo Rainforest. This project combined with the studio's other projects are collectively associated with a single "studio" in the hierarchy shown in FIG. 1-B. The studio may make a call for footage, or for other users to upload footage to submit to the project. Within the project, the various media may be organized in different folders and subfolders associated with the project. For example, one folder may be for interviews relating to the topic. Another folder may be for background scenes. Within a folder, such as the background scenes folder, there may be subfolders for winter, spring, summer, and fall, or daytime and nighttime. Other folders may include other subfolders such as subfolders for rain, trees, sunshine, wildlife, plants, animals, etc. Folders may also be related to topics such as interviews, animal sounds, or other categories. Folders may be created for organizational purposes such as videos uploaded in May, videos uploaded last week, this week, last month, etc. The same studio may have other unrelated projects, each with its own set of folders and subfolders. For example, a studio who has put out a call for a project on the Borneo Rainforest may also have other calls for other projects, such as for Melting Ice Caps, Drought in China, Beetle Bark Fires, Global Famine, etc. The web application may allow uploads of media files to the various folders and subfolders in the hierarchy database through the submission module. The conversion module enables storage of the original videos on Server 3, and a low-resolution copy of the original videos on Server 2, an application or proxy server. Alternatively, low resolution copies of the original videos may be kept on a CDN (content distribution network) or a network of servers. The edit module enables editing of the media files, and information related to the editing may be stored in the edit database.

It can be appreciated that various architectures of servers, databases, and interfaces may be employed to accomplish the goals of embodiments of the invention, and that the embodiments are not limited to the specific examples described herein. For example, a studio may be started by a politician in order to create projects around his/her political campaign. This politician would set up projects such as "Health Care", "Immigration" and "Social Security". In the "Immigration" project, for example, would be created a hierarchy of folders with the top level folders being "Mexico," "Canada," "Central America" and "Europe." Inside the "Mexico" folder could be subfolders such as "Illegal Border Crossing," "Employment," "Children" and "Civil Rights." The politician could put out calls for media in the "Employment" folder and the politician's constituents, fans and supporters would upload and submit their media to these folders in support of the candidate. A musician may create a studio and set up projects that are music videos for his/her songs. Fans of the musician could submit their media to the folders in these projects based on the lyrics of each song (project) to be considered in the music video product.

FIG. 1-C illustrates an architecture of the hardware of the system, in accordance with an embodiment of the invention. As shown in FIG. 1-C, the various components of the system, including Server 1, Server 2, and Server 3, and the databases or shared storage, may be connected over a LAN or other type of local area network, or may be connected via a larger public network such as the Internet. It can be appreciated that any type of network or connection may be utilized by the system. A user may access the system through a mobile device, computer, or by another device via the Internet. In addition, users may access the system through a LAN or other type of network. Each server of the system may include a network interface, circuitry, processor, memory and storage components. In addition, there may be additional shared storage components which may be accessed by each of the servers. All or various components on the system may be facilitated using one server, or multiple servers may be used for various components alone or in combination, for a variety of architectures. In the event that there are multiple servers, each server may serve to perform a different function, or each server may perform multiple functions in various combinations. Accordingly, various combinations of server and storage functions and allocations are contemplated herein.

FIG. 1-D illustrates an overall architecture of a system in relation to various users and platforms, in accordance with an embodiment of the invention. As shown in FIG. 1-D, various members of a community of citizen journalists may access a system, through the Internet, or another type of network, such as a LAN. The users may include various groups or individuals. In addition, users may include professional or amateur journalists. The users may include members who are dedicated to organizing various users, or may include members who are dedicated to training various users how to use the system, or members involved in video production or otherwise involved in the community of creating media. For example, users may include editorial teams, or editors individually, professional journalists, or community organizers or trainers. Users may include individuals involved in management of other users or teams, or individuals who can facilitate users' use of technology in relation to the system. Users may also include various laymen, or citizen journalists, who may contribute to the media base, offer suggestions, ideas, or even provide editing or other services, or otherwise contribute to various media projects. Certain community organizers, journalists or other individuals, entities or groups may be recruited to participate in the creation, contribution, collaboration or editing of media based on expertise, previous involvement, geographical area, or other criteria as desired by users. Other users of the system may include consulting groups, such as a consulting firm (shown in the figure as "Acme Consulting"). Various consulting services may be provided in relation to users' use of the system including fund-raising efforts to raise money for certain media projects, or a reference desk to act as a resource for questions or comments on the system, a project, or other questions related to the creation of media.

As described further below, the system may utilize various contributions and efforts of producers, editors, management and technology to facilitate the editing and creation of new media, the organization of media, and the collaboration of editors on projects, etc. Various users may upload and edit media via the system, and the media may be organized and made available to a community of users via the system. The media may be organized through events or topics, and various users may be encouraged to upload media based on certain events, calls, topics or stories which are being explored by other users. The system may interact with other sites via widgets or direct affiliates. The system may interact with various social networks. In addition, certain elements of the system, or the system as a whole, may interact with other partner platforms, or other third party websites, which may interact with other sites via widgets or which may interact with social networking sites. The system may further facilitate the distribution of media on various platforms, to various types of devices, and in various formats, as described below, via viral streams to social networks, to other platforms or other websites, or journalism streams via broadcast, to other platforms, through other websites or through social networks.

Referring to FIG. 1-D, various citizens, as groups or individuals, may capture content through various devices and upload such media (such as video or other media) through these devices or using their computers to the system. The user's device may communicate with the system over various types of networks, such as the Internet or a LAN. Other professional journalists or citizen journalists, or community organizers or trainers may utilize such media and organize and edit such media for their projects via the system. Such users may collaborate with each other or in teams, to produce and edit various media for certain projects. The media that is edited and produced may be distributed via a network, such as the Internet, to various other websites, affiliated sites, over social networks, to partner platforms, or to user devices via broadcast or via a network. Various types of networks are contemplated herein.

For example, a professional journalist or a news studio may have a project to collect footage relating to the Borneo Rainforest, as discussed above. With reference to FIG. 1-D, the professional journalist may submit the call via the system by a communication over a network, such as the Internet. Other users, producers, citizen journalists, etc. may respond to the call by uploading and submitting their own footage that they have captured to the system via the Internet. In addition, other users may actively shoot or create new footage to be uploaded to the project on the system, via a network such as the Internet. Other professional journalists, editorial teams, amateur editors, or any other user may be able to then edit the footage submitted by various users relating to the project call, such as footage relating to the Borneo Rainforest, via the system, using interfaces made available via a network, such as the Internet. Edited footage may then be distributed via a network, such as the Internet, to various other websites, affiliated sites, over social networks, to partner platforms, or to user devices via broadcast or via a network. Various types of networks are contemplated herein.

Thus, in some embodiments, the system includes a module that receives uploaded media submitted over a computer network from groups of distributed devices associated with groups of distributed users. The distributed devices could be recording devices, or computer systems. The media could be media that is captured on devices other than computer systems, such as portable video cameras, for example. The system may also include a user interface module that provides for separate accounts and access for various users among the distributed groups of distributed users. The system may include a module that manages a set of different projects associated with the different media products in progress associated with different groups of distributed users. The media may be organized using a data structure of folders which are configurable by a user for organizing submissions in a project into different categories. The system may include a module that provides a user a project interface for creating an edited media product based on submissions from other distributed users. Thus, there may be an editing interface that allows multiple users to provide edits to a single project associated with a single media product. Different users may have different forms of access, for example, some users may be contributing users, some users may be non-professional editors, and some users may be professional editors. There may also be a journalism stream for the media products that are created in the system, and modules for communication with social networks or other platforms.

Alternatively, using cloud computing, the system can exist as instances across a network of servers and scale up or down based on demand and usage. Additionally, the scripts can run on multiple servers and access data from a shared database, media content distribution network and storage space or be set up to pull data from an autonomous database, media content distribution network and storage space.

Figure 2:
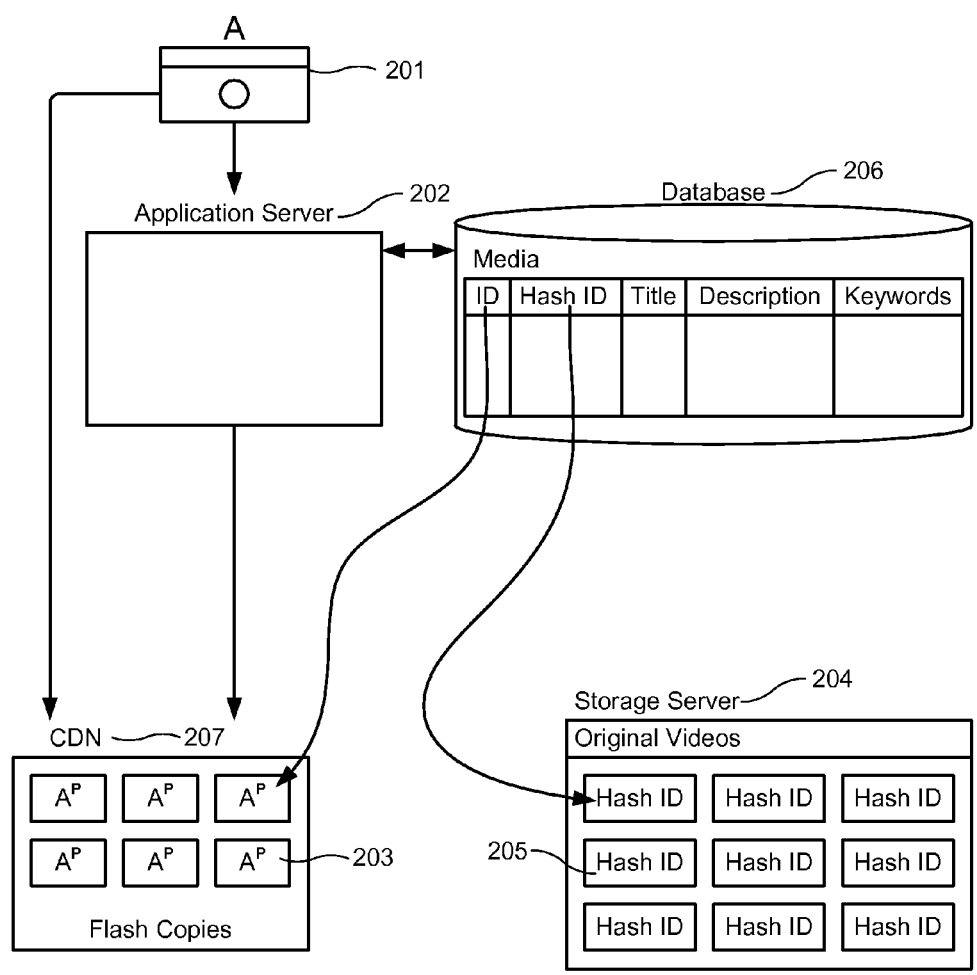
FIG. 2 illustrates a process by which videos may be uploaded by a user to the system, in accordance with an embodiment of the invention.

Upload Process:

In order to utilize videos or other media which have been captured by users, or in a user's possession, the system may allow the user to upload a media file to the system. FIG. 2 illustrates a process by which videos or other media may be uploaded by a user to the system, in accordance with an embodiment of the invention. A user may wish to make video A 201 available on the system. The video A may be uploaded through a user interface by a user. When the user uploads the video, a flash copy $A^P$ 203 of the video is generated on an application server 202. In one embodiment, the flash copy $A^P$ 203 may be stored on a CDN (or content distribution network) 207 or a network of servers. The flash copy $A^P$ 203 may be generated on an application server 202 or generated directly on a CDN 207 or a network of servers. The original video file, which may be a high resolution file, is sent to a storage server 204. The hash ID 205 may correspond to and identify the original video file of video A 201. In addition, the system may allow the user to assign a title, description or certain keywords to be associated with the video A 201. This information, or other additional information, may be included and stored in database 206. The database 206 may include information such as a unique media ID which identifies the flash copy $A^P$ 203 of the video, the hash ID which identifies the original video file stored on storage server 204, and other identifying information such as the title, description, geotags, length and keywords of the video file. The uploaded file's format, codec, frame size and frame rate are recorded in the database in order to display video/audio/image quality information. Various types of identifiers, or unique identifiers, may be used to identify the various types of video files, and the embodiments of the invention are not limited to the specific examples described herein.

Additionally, the methods, systems and approaches described herein with respect to videos apply to various and any types of video, audio and images. This includes video formats codecs, frame rates and frame sizes and audio formats and codecs. For example the video and audio formats include, but not limited to: E 3g2, E 3gp, D 4xm, D MTV, D RoQ, D aac, DE ac3, E adts, DE aiff, DE alaw, DE amr, 3gpp, DE asf, E asf stream, DE au, DE audio, DE avi, D ays, E crc, D daud, D dsicin, D dts, DE dv, D dv1394, E dvd, D dxa, D ea, DE ffm, D film_cpk, DE flac, D flic, D flv, E framecrc, DE gif, DE gxf, DE h261, DE h263, DE h264, D idcin, DE image2, DE image2pipe, D ingenient, D ipmovie, DE m4v, D matroska, DE mjpeg, D mm, DE mmf, E mov, D mov, mp4, m4a, 3gp, 3g2, mj2 QuickTime/MPEG4/Motion JPEG 2000 format, E mpg, DE mp3, E mp4, D mpc, DE mpeg, E mpeg1video, E mpeg2video, DE mpegts, D mpegvideo, E mpjpeg, DE mulaw, D mxf, D nsv, E null, D nut, D nuv, DE ogg, E psp, D psxstr, DE rawvideo, D redir, DE rm, E rtp, D rtsp, DE s16be, DE s16le, DE s8, D sdp, D shn, D smk, D sol, E svcd, DE swf, D tiertexseq, D tta, DE u16be, DE u16le, DE u8, D vcl, E vcd, D video4linux, D video4linux2, D vmd, E vob, DE voc, DE way, D wc3movie, D wsaud, D wsvqa, D wv, and DE yuv4mpegpipe. Video and audio codecs that are included but are not limited to: D V 4xm, D V D 8bps, D V VMware video, DEA aac, D V D aasc, DEA ac3, DEA adpcm__4xm, DEA adpcm_adx, DEA adpcm_ct, DEA adpcm_ea, DEA adpcm_ima_dk3, DEA adpcm_ima_dk4, DEA adpcm_ima_qt, DEA adpcm_ima_smjpeg, DEA adpcm_ima_wav, DEA adpem_ima_ws, DEA adpcm_ms, DEA adpcm_sbpro__2, DEA adpcm_sbpro__3, DEA adpcm_sbpro__4, DEA adpcm_sw, DEA adpcm_xa, DEA adpcm_yamaha, D A alac, DEA amr_nb, DEA amr_wb, DEV D asv1, DEV D asv2, D V D ays, DEV bmp, D V D camstudio, D V D camtasia, D V D cays, D V D cinepak, D V D cljr, D A cook, D V D cyuv, D A dca, D V D dnxhd, D A dsicinaudio, D V D dsicinvideo, D A dts, DES dvbsub, DES dvdsub, DEV D dvvideo, D V dxa, DEV D ffv1, DEVSD ffvhuff, DEA flac, DEV D flashsv, D V D DEVSD flv, D V D fraps, DEA g726, DEV gif, DEA gsm, D A gsm_ms, DEV D h261 DEVSDT h263, D VSD h263i, EV h263p, DEV DT h264, DEVSD huffyuv, D V D idcinvideo, D A imc, D V D indeo2, D V indeo3, D A interplay_dpem, D V D interplayvideo, EV jpegls, D V kmvc, EV libtheora, EV ljpeg, D V D loco, D A mace3, D A mace6, D V D mdec, DEV D mjpeg, D V D mjpegb, D V D mmvideo, DEA mp2, DEA mp3, D A mp3adu, D A mp3on4, D A mpc sv7, DEVSDT mpeg1video, DEVSDT mpeg2video, DEVSDT mpeg4, D A mpeg4aac, D VSDT mpegvideo, D VSDT mpegvideo_xvmc, DEVSD msmpeg4, DEVSD msmpeg4v1, DEVSD msmpeg4v2, D V D msrle, D V D msvideo1, D V D mszh, D V D nuv, DEV pam, DEV pbm, DEA pcm_alaw, DEA pcm_mulaw, DEA pcm_s16be, DEA pcm_s16le, DEA pcm_s24be, DEA pcm_s24daud, DEA pcm_s24le, DEA pcm_s32be, DEA pcm_s32le, DEA pcm_s8, DEA pcm_u16be, DEA pcm_u16le, DEA pcm_u24be, DEA pcm_u24le, DEA pcm_u32be, DEA pcm_u32le, DEA pcm_u8, DEV pgm, DEV pgmyuv, DEV png, DEV ppm, D A qdm2, D V D qdraw, D V D qpeg, D V D qtrle, DEV rawvideo, D A real_144, D A real_288, D A roq_dpcm, D V D roqvideo, D V D rpza, DEV D rv10, DEV D rv20, D A shorten, D A smackaud, D V smackvid, D V D smc, DEV snow, D A sol_dpcm, DEA sonic, EA sonicls, D V D sp5x, DEV D svq1, D VSD svq3, DEV targa, D V theora, D V D tiertexseqvideo, D V tiff, D V D truemotion1, D V D truemotion2, D A truespeech, D A tta, D V D ultimotion, D V vc1, D V D ver1, D A vmdaudio, D V D vmdvideo, DEA vorbis, D V vp3, D V vp5, D V vp6, D V vp6f, D V D vqavideo, D A wavpack, DEA wmav1, DEA wmav2, DEVSD wmv1, DEVSD wmv2, D V wmv3, D V D wnv1, D A ws_snd1, D A xan_dpcm, D V D xan_wc3, D V D x1, EV xvid, DEV D zlib, DEV zmbv. The system can also ingest any frame rate, from 1 frame per second (fps) to 100 fps, and any frame size, from 1px×1px to 3000px×3000px.

The keywords may be utilized by users to identify the video as a whole, or certain parts of a video. For example, if the video is of a cooking show of how to make a spaghetti dinner, then the user may associate the video with keyword "spaghetti" or "dinner." The user may also include other keywords such as "organic" or "child" or "chef." Another user who is doing a show on organic food may later find the video via a keyword search. Another example is a video which is about a child's soccer game. The keywords of this video could be "soccer," "children" and/or "kids" but there might also be a baseball game in the background of the video. Therefore the user adds the keywords "baseball" and "sports" to the list, and someone who searches "baseball" will be able to view the specific part of the video that pertains to baseball.

Figure 3:
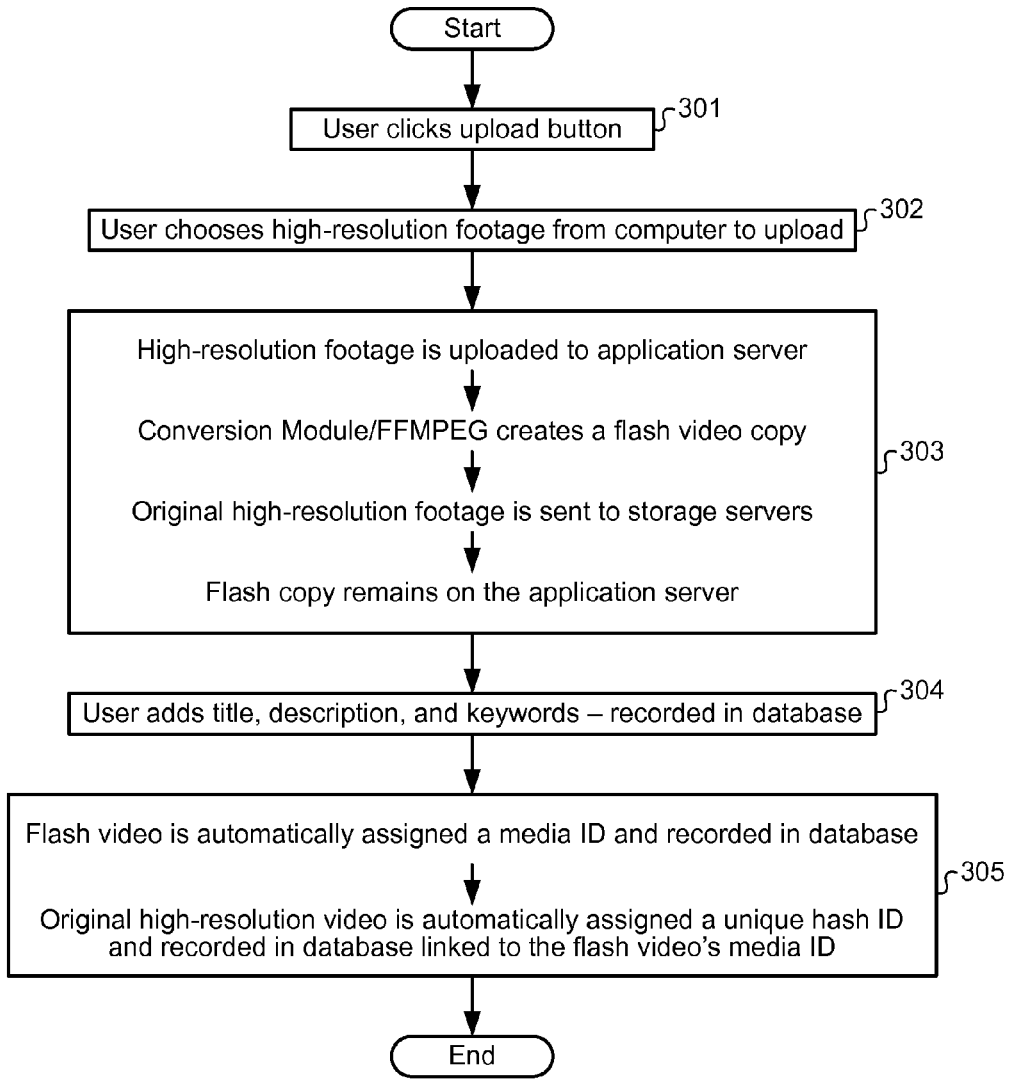
FIG. 3 illustrates a flowchart of a process by which videos may be uploaded by a user to the system, in accordance with an embodiment of the invention.

In order for videos to be utilized by users via the system, the videos are uploaded by users to the system. These videos may be videos captured by users via professional video equipment, home video cameras, video capturing devices on a cell phone or other mobile device, or by any other video capture means. Referring to FIG. 3, a flowchart of a process by which videos may be uploaded by a user to the system, in accordance with an embodiment of the invention, is illustrated. In step 301, the upload process may be initiated by the user by the click of an upload button, for example. In step 302, the system may allow the user to choose certain high-resolution footage from his or her computer to upload. In step 303, the high-resolution footage is uploaded to the application server. A flash copy of the video may be created and stored on the application server. The flash copy may be created by FFMPEG or some other translation or conversion mechanism. The original high-resolution footage may be stored on a storage server, and identified by the hash ID number. In addition, as shown in step 304, the system may allow the user to include a title, description or keywords to be associated with the video, which may be recorded in a database. In step 305, the flash video may be assigned a media ID which is also recorded in the database. Further, in step 305, the original high-resolution video file may be assigned a unique hash ID which is recorded in the database, and associated with the video's media ID. Thus, the media ID may identify the flash copy of the video file stored on an application server, and the hash ID may identify the original high-resolution video file stored on a storage server.

The lower resolution footage has a lower resolution than the higher resolution footage. The relation between high resolution and low resolution may take different forms according to different embodiments. For example, according to one embodiment, lower resolution footage may have a lower resolution to the degree of at least 1% less than higher resolution footage through its conversion into lower data rate, smaller frame size, lower frame rate and/or more compressed media codec/format. Instead of 1%, in respective different embodiments, the degree may be also 5% less, 10% less, 20% less, 30% less, 40% less, 50% less, 60% less, 70% less, 80% less, or 90% less than the higher resolution footage, or any range in between 0% and 100%. In addition, other ranges as are possible, according to various embodiments. In an embodiment, the lower resolution may be converted into flash video format with a lower data rate, 640×360 pixel frame size and 15 frames per second. Other pixel frame sizes and other ranges of frames per second are possible according to different embodiments of the invention.

Storage devices may be utilized to store the various media files, including the original media or video files, clips of the video files, as well as flash copies of various video files, and additional information regarding the media such as the title, description, keywords associated with the video, or organizational tools for organizing and storing the media files. The storage devices may comprise computer memory, disks (including arrays of disks) or other electronic or computerized devices alone or in various combinations, including redundant and non-redundant, for storing data and/or media. Such information may be stored in database tables within a storage device.

Figure 4:
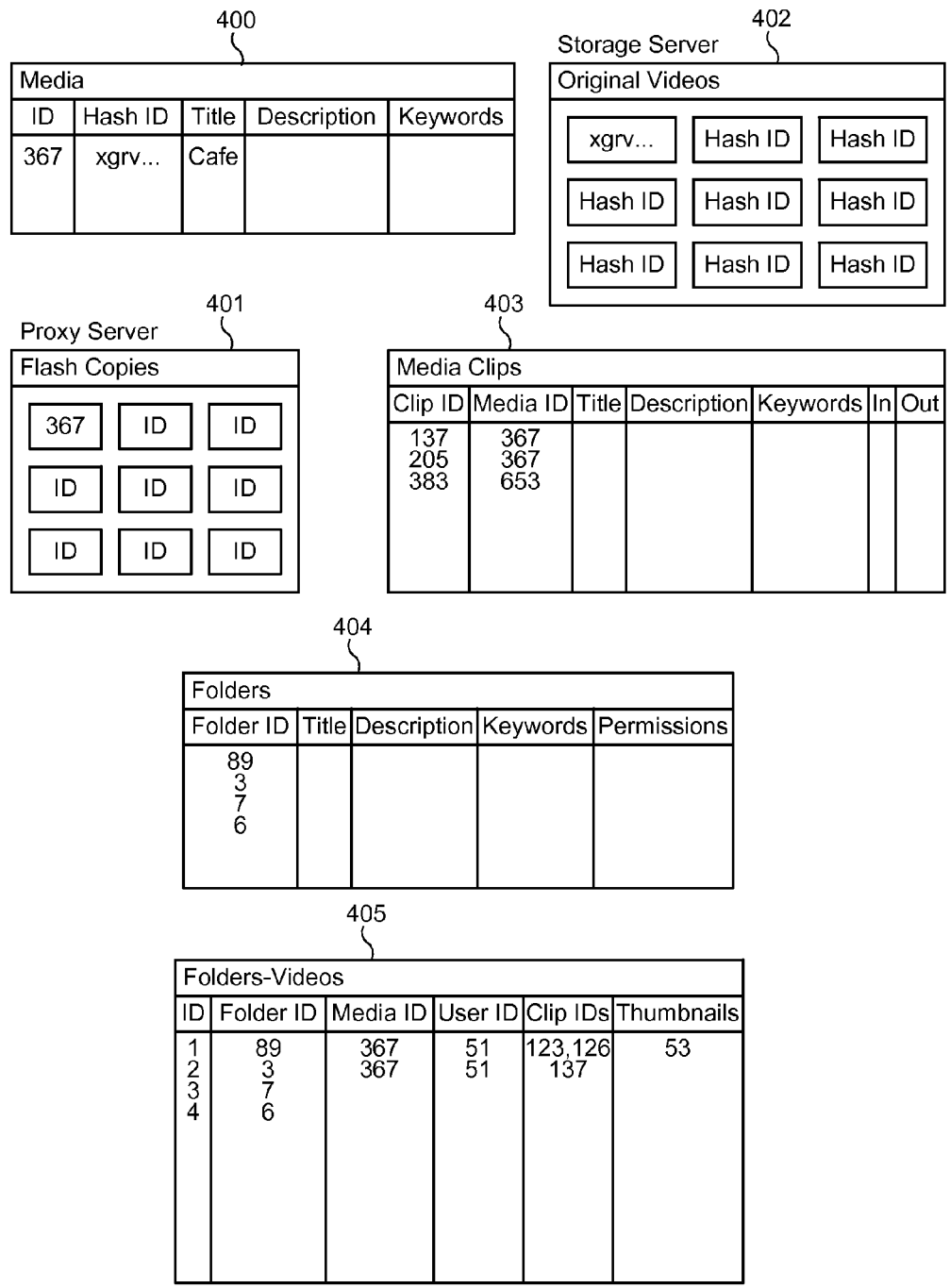
FIG. 4 illustrates one example of an organization of database tables, in accordance with an embodiment of the invention.

FIG. 4 illustrates one example of an organization of database tables, in accordance with an embodiment of the invention. In FIG. 4, in media table 400, the table may include fields such as the media ID which corresponds to a flash copy of the video file stored on an application or proxy server 401. For example, in the row shown in FIG. 4, the media ID "367" corresponds to the flash copy stored on the proxy server with media ID "367." The media table 400 may also include a field which contains a video file's hash ID, which may correspond to original video files on a storage server 402. For example, in the row shown in FIG. 4, the hash ID "xgrv . . . " corresponds to the original video on storage server 402 with hash ID "xgrv . . . ". Thus, a low-resolution version of the video file may be stored as a flash copy on a proxy server 401, while the original high-resolution version of the video file may be kept on a storage server 402. Alternatively, low resolution copies of the original videos may be kept on a CDN (content distribution network) or a network of servers. The media table 400 may reference each of these files with the appropriate ID numbers, and may also contain other information associated with the video file such as the title, description or keywords associated with the video. In addition, clips or portions of the video file may be made by the user, and stored in media clip table 403. The media clip table 403 may include a unique clip ID number, and also the media ID which references the original video file from which the clip is captured. The media clip table 403 will also include the clip's IN and OUT point. Thus, as will be further explained below, the clip will include an "in" point and an "out" point which references time points of the video identified by the media ID. The clip ID then references a clip of a larger video file which is identified by the media ID. The clip itself may also be assigned a title, description or keywords.

For example, if a video is uploaded via the application server (202 in FIG. 2) it will first receive a media ID in the database and a hash ID reference number. The original video will then be processed to create a flash copy of the video. This copy will be sent to the content distribution network and labeled with the media ID. The original video is then sent to the storage server and labeled with the hash ID. Therefore any time alterations are made using the flash copy on the system the database will work to link this flash copy's media ID back to the original file using the associated hash ID in the database.

For example, the "spaghetti dinner" video may be stored in a folder with the title "Education" because it is an educational video about how to make a spaghetti dinner. If there is a short clip showing a lemon pie as part of the spaghetti dinner, a user may create a clip of just the footage with the pie, and then provide keyword tags "lemon pie" to the clip. The clip of "lemon pie" may also fall within other categories and may be included in other folders such as a folder for desserts, or perhaps a folder for the color yellow. The whole media file may also be stored in a folder for "Humor" if, for example, there are jokes told in the video. Each video or clip may fall within multiple folders. A variety of organizational structures is contemplated herein.

The media clip IDs and media IDs may be organized and categorized via folders, which represent categories of videos. The folders may be organized in a table in a database 405. Each media ID may be placed in a folder. In the database, a row in the folder table 405 may include the folder ID, the media ID, a user ID, clip IDs, and perhaps a thumbnail ID. The thumbnail ID may refer to a thumbnail file which is created of the video (either the flash file or the original file). Another table 404 may include information about each folder, such as the title of the folder, description or keywords, or even permissions information such as whether the folder is set as public or private or limited to certain users. The permissions information may also include information related to whether the folder is accessible for view by certain users or whether the folder is accessible to edit and modify by certain users.

The system may provide various levels of users who each have a unique level of permissions. For example, one embodiment provides four levels. The basic level may be the "general user" level. The general user can get engaged in projects put on by studios on the system, upload/submit media to projects, set prices on media for purchase by the project and take part in editing of videos if the project permits. The next level could be the "project editor." A project editor is assigned by a studio administrator and has the abilities of a general user but can also partake in private level folders attached to projects, creating notes on media submitted to the project he/she is an editor of, create/delete folders, put footage calls out on the system, pay for and download media submitted to the project he/she is an editor of, edit media in the project and export high-resolution copies of edit videos for the project. The next level may be the "studio administrator." A studio administrator is assigned by a super administrator and has the abilities of a general user and project editor but can also create new projects in a studio, modify the design of a studio and project and assign editors to the project he/she owns. The next level may be a "super administrator." A super administrator may be an administrator of all studios on the system. There may only be a few accounts assigned a level of super administrator to manage the system.

Process of Creating a Clip:

Embodiments of the invention assist users in creating clips of the original video files, to be used in editing or creating a finished product, to be associated with different keywords, or to be stored in various folders or organized in various ways.

Figure 5:
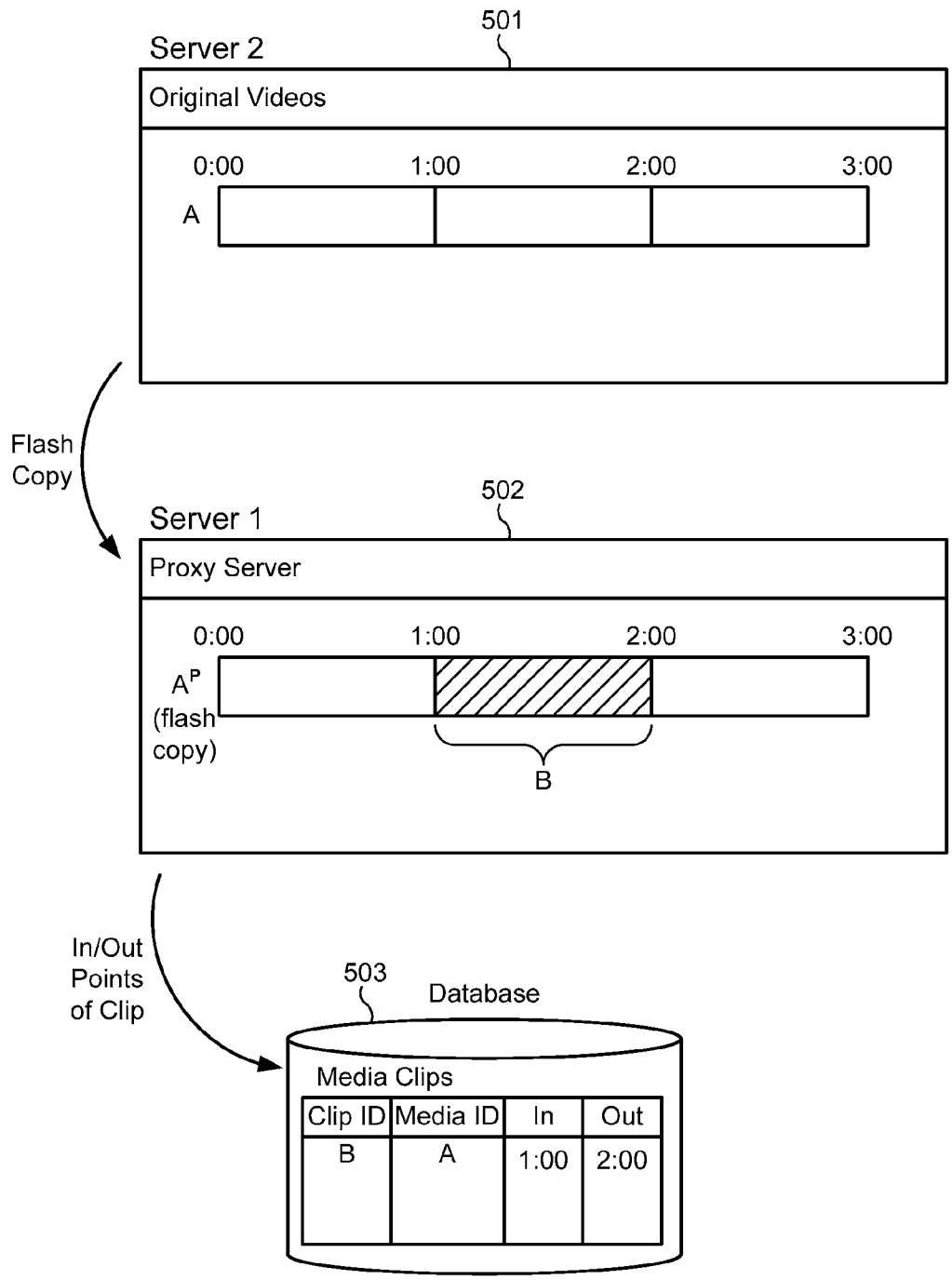
FIG. 5 illustrates the process by which a clip of a video may be created and saved, in accordance with an embodiment of the invention.

Referring to FIG. 5, the process by which a clip of a video may be created and saved, in accordance with an embodiment of the invention, is illustrated. When a user uploads an original video file A, the original video file, which may be a high-resolution video file, may be stored on a storage server 501. A flash copy $A^P$ of the original video file may be created and stored on a proxy server 502. Alternatively, low resolution copies of the original videos may be kept on a CDN (content distribution network) or a network of servers. The system may allow the user, through a user interface, to mark IN and OUT points within the flash copy $A^P$. In FIG. 5, the system may allow the user to mark "1:00" as the IN point and "2:00" as the OUT point. Thus, clip B is created from video A, which is stored in a table in a database 503 in a media clip table. The media clips table may contain a Clip ID, Media ID, IN and OUT points, and other information such as the title, description and keyword of the clips. Thus, in the example shown, Clip ID "B" is stored in the media clip table, and is created from media ID "A", having IN point "1:00" and OUT point "2:00". The clip then is stored as a row in a database, which contains the Clip ID, a reference to a Media ID which references the media file that the clip is taken from, and the IN and OUT points which represent the portion or part of the original media file that is contained in the clip. In addition to the IN and OUT points being recorded, the media's format, codec, frame rate and frame size may be noted in the database. All clips of an original media are linked back via the Media ID to both allow the user to link back to the original media for viewing purposes and for the system to reference the original source video when exporting in high-resolution.

Edit Decision Lists:

Users of the system may also want to create new media. Embodiments include methods and system that edit, cut, mix, remix, add audio layers, narration, music, transitions, etc. for a user in creating new media, using the various media files, clips, etc. created and uploaded by other users. Embodiments of the invention help users to make clips, or shorter versions, of longer video files, so as to organize those clips in more specific folders, or to associate those clips with more specific keywords, for example.

Figure 6:
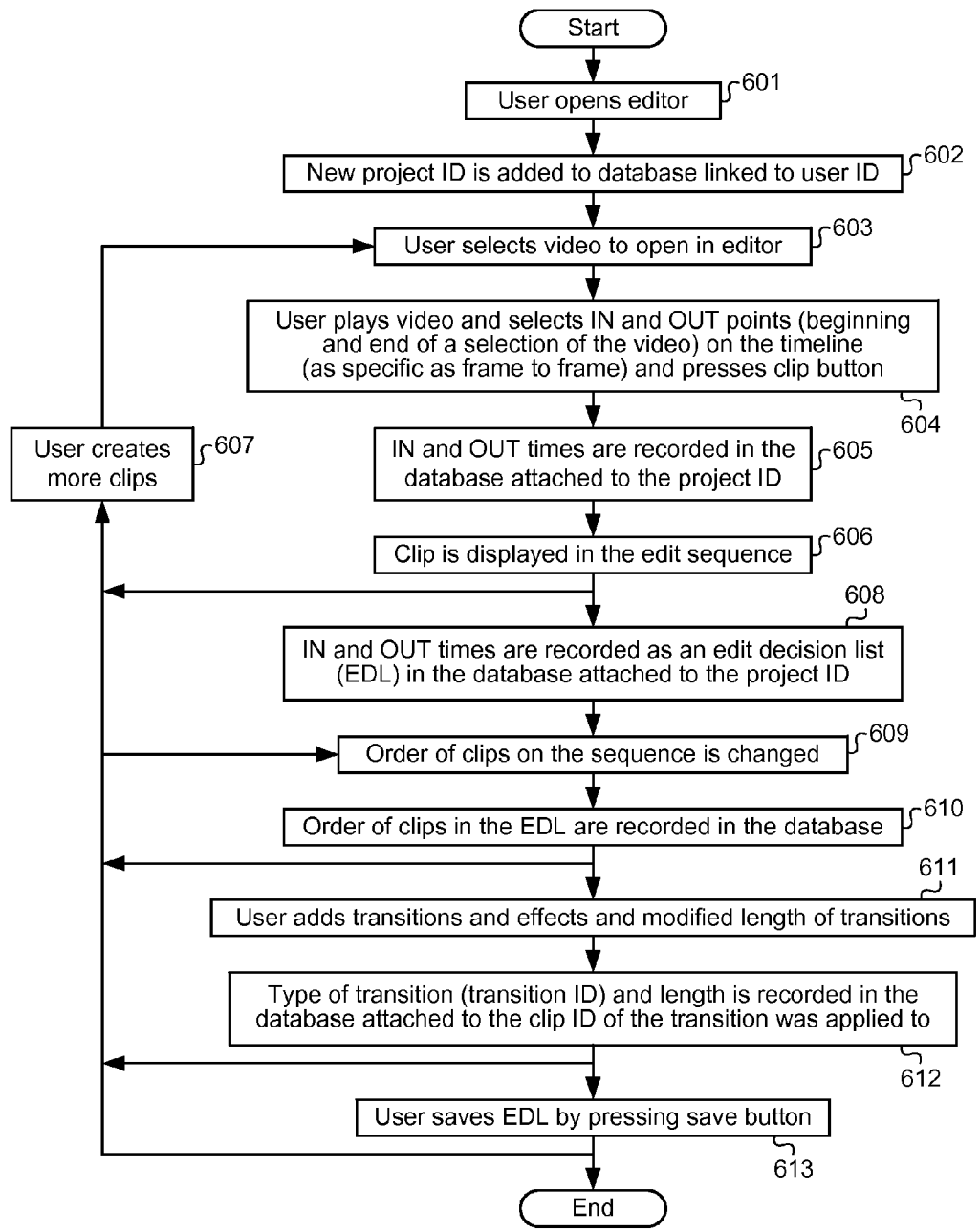
FIG. 6 illustrates a flowchart by which clips are created and recorded in an edit decision list, in accordance with an embodiment of the invention.

In FIG. 6, a flowchart is illustrated by which clips are created and recorded in an edit decision list, in accordance with an embodiment of the invention. In FIG. 6, the system may allow the user to use the editor module to create clips, and ultimately to create an edit decision list, which pieces together various clips as well as adding transitions and effects. The system may allow the user to initiate the process of using the editor module in FIG. 6 by opening the interface to the editor. Upon opening the editor in step 601, a new Project ID may be added to the database and linked with the user's ID in step 602. In step 603, the system may allow the user to select a video to open in the editor. In step 604, the system may allow the user to play the video file and review the video file (which would be the flash copy $A^P$) and select IN and OUT points which correspond to the beginning and end of a selection of the video on a timeline and press the "CLIP" button. In step 605, the IN and OUT times may be recorded in the database and attached to a Project ID. In step 606, the clip may be displayed in an edit sequence. The system allows the user to continue to create more clips in step 607 by repeating steps 603 through 606. In step 608, the IN and OUT times of the various clips that are created within this Project ID are recorded as an edit decision list (EDL) in a database and are associated with the Project ID. In step 609, the system may allow the user to change the order of the various clips selected or created in the EDL. In step 610, as the user changes the order of the various clips in the sequence, the order is updated and recorded in a database. In step 611, the system allows the user to add transitions and effects to various clips or in between various clips, and also may modify the length of the transitions added. In step 612, the type of transition (transition ID) and length may be recorded in a database and associated with a clip ID of the clip that the transition was applied to. In step 613, the system may allow the user to press a save button to save the changes made to the EDL in a database.

In addition, the videos may be layered and the timing of the videos may overlap and such changes may be recorded in a database. For example, a shorter clip C may be layered over a longer clip B. Thus, video B may play, and then video C may play (with video B continuing but being invisible to the viewer), and when video C has ended, then the user can view video B for the remaining period. Because the editor utilizes the proxy files to perform the editing and the edit decisions are made with the proxy files or flash copies of the original video files, the editor records the changes as metadata, which includes the IN and OUT points of certain media IDs, and the order of the clips in the edit sequence.

Figure 7:
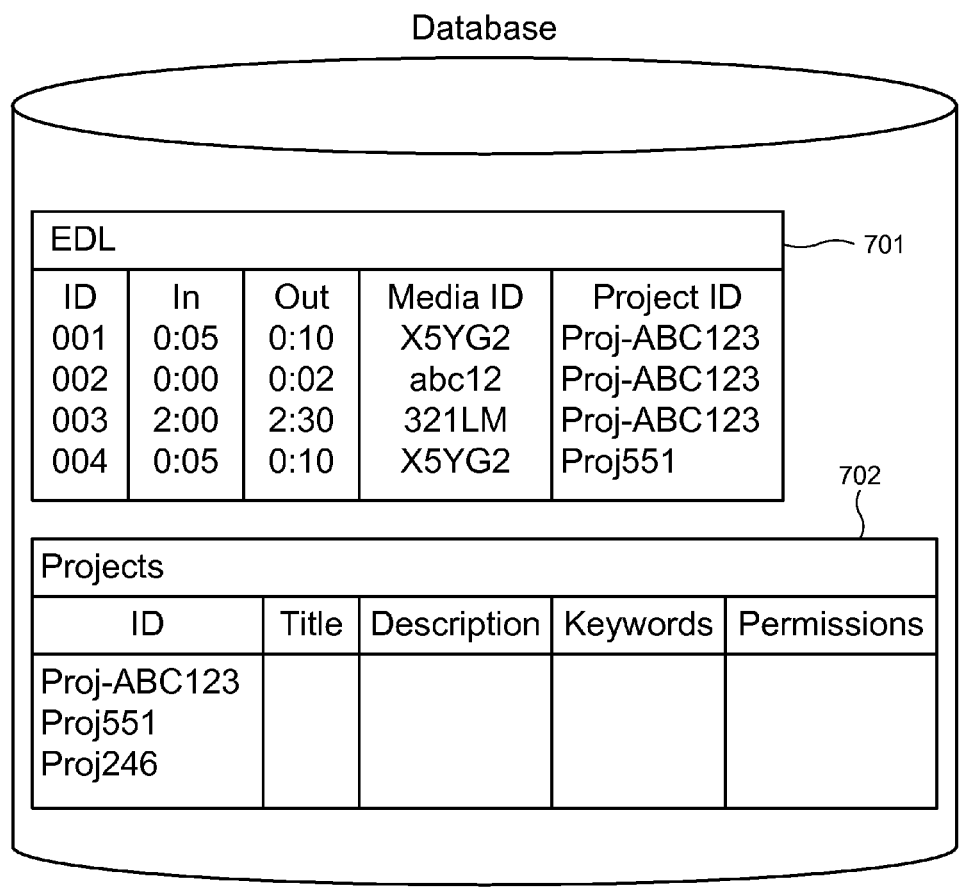
FIG. 7 illustrates a database table of an edit decision list (EDL), in accordance with an embodiment of the invention.

The edit decision list (EDL) may be stored in storage, in a database table. FIG. 7 illustrates a database table of an EDL, in accordance with an embodiment of the invention, which includes information relating to the IN and OUT points of certain media IDs used in the edit sequence, and the order of the clips in the edit sequence. The EDL database table 701 may include an EDL ID which corresponds to the order of the clips and transitions in the EDL for the particular Project ID specified. Each clip ID may include a media ID which corresponds to the flash copy file $A^p$, which is the video from which the clip is made. Thus, in the example shown, the EDL table 701 shows two separate projects that a user is working on "Proj_ABC123" and Proj551. Each Project ID may correspond to additional information in projects table 702, which contains information about the title, description, keywords and permissions of the project. The permissions may include who is allowed to view the project or contribute to the project or other security permissions information.

In the example shown, EDL ID 001 is the first clip in the sequence of the edit sequence of Project_ABC123, EDL ID 002 is the second clip displayed in the edit sequence, and EDL ID 003 is the third clip displayed in the edit sequence. EDL ID 004 is the first clip in Proj551, in the example shown. Thus, one example of how the order of clips in an edit sequence for each project is illustrated herein, but it is understood that the invention is not limited to the particular embodiments shown herein. The EDL table may also include information regarding transitions that have been applied to the clips.

Thus, as a user or editor is selecting various media files or clips, and adding them to the EDL, the various clips may be displayed in a timeline, as a representation of the clip as an IN and OUT point. In the example shown, the editor of Project_ABC 123 may first view Media ID X5YG2 and decide that he would like to include a clip of Media ID X5YG2 from 0:05 to 0:10. This clip will be added to the timeline. The editor may then choose to view Media ID abc12 and decide to use a clip from 0:00 to 0:02 of that media file, and add it to the EDL. This clip will then be added to the timeline, and so on. The databases can record the IN and OUT points, along with the Media IDs as metadata in the database, which represent the EDL.

Figure 8:
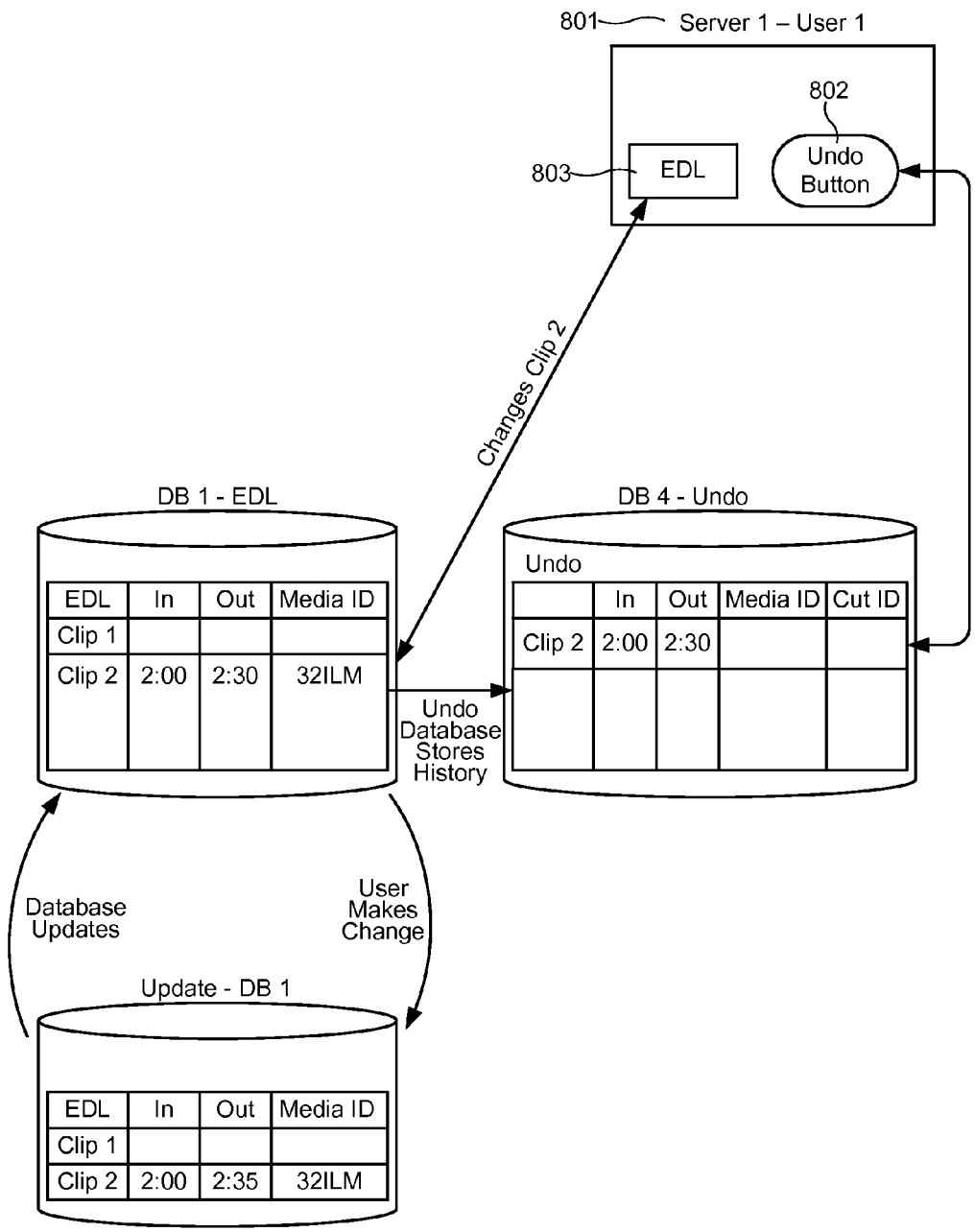
FIG. 8 illustrates how changes to an EDL may be reverted or undone, in accordance with an embodiment of the invention.

At various points in the editing process, users may want to revert to an older version of the editing product, or to undo certain changes that have been made to the finished product. Referring to FIG. 8, one approach to how changes to an edit decision list (EDL) may be reverted or undone is shown, in accordance with an embodiment of the invention. A user, while utilizing the editor on a server 801 may be making changes to the EDL 803, as described above. For example, the current EDL 803 may reflect that Clip 2 is taken from Media ID 321LM with IN point at 2:00 and OUT point at 2:30. The user may desire to make the change to update Clip 2 to add 5 seconds to Clip 2. Thus, DB1 may be updated to reflect the change to Clip 2. Meanwhile, DB4 may store a history of transactions, such that should the user desire to "UNDO" the action and press the Undo Button 802, DB4 may serve as a reference of a history of actions which have been made. An EDL may be stored in accordance with the following protocols or formats: MySQL database metadata, dynamic XML files, Final Cut Pro XML Interchange Format, OMF, AAF, MXF, CMX and GVG.

Content Aggregation Network and Organization:

The content aggregation network provides a new way of organizing media online. Various folders may be created so as to organize footage accordingly, by title, subject, thread or keywords. The system accepts footage uploaded from users directly into the various folders that have been created, by other users, by themselves, by producers, by editors, etc.

The methods and systems described for content aggregation and organization may be applied to other aspects of the system or may operate independently. Additionally, other aspects of the system (e.g., uploads, editing interface, multiple format delivery or collaborative editing) may be used in combination with the methods and systems for content aggregation and organization or other aspects, or may be provided independently.

Embodiments of the invention provide organizational tools that allow producers and other users the capacity to solicit, mine, clip, aggregate, organize, and search submitted footage. These tools include: studios, projects, and folders, methods to submit or upload media and methods to create clips from uploaded media. Studios, projects and folders exist in a hierarchical relationship in order to arrange various media files. Producers may own studio pages and create projects and folders (storage folders inside projects) using administrative customization tools. Folders and subfolders help provide a hierarchy of folders created by producers that are accessible by the public for the purpose of submitting media to a particular project. Methods for submitting or uploading media and creating clips from media permit users to efficiently submit their media to project folders. With regard to creating clips from uploaded media, the interface may utilize a flash based player with buttons that allow frame-by-frame movement through a media file and buttons that allow the insertion of marked IN and OUT points on the media timeline for the purpose of extracting clips from a media file. Interfaces or tools other than those described herein may be used accordingly with the various embodiments. Additionally there may be a note taking functionality that is private to the administrators of studios which allows an administrator to select a point on a video or audio timeline and insert text that is tagged at this point. The time of the point, say 1:00, and the text associated with this point are recorded in the database. An administrator may also have the ability to manage the placement of media that has been submitted to studios that they own. An administrator can move media from one folder to another folder or subfolder, copy media to another folder or subfolder or remove media from a folder. The changes can be recorded in the database using the folder IDs.

Clips may be virtual meaning that editing may be accomplished through metadata stored in a database or other storage device as opposed to creating new video files of the clip. Each clip may be assigned its own unique tags and keywords for the purpose of being autonomously searched. The system may provide a graphical representation of the relationships between different tables of the database. Items may be organized, clipped, labeled and submitted using metadata which is recorded in these tables of the database.

Each clip may be autonomously searchable meaning that each clip may exist separate and apart from the parent footage from which was created, and separately retrievable. Each clip (virtual or actual clip) may be a separate item, associated with a title, description and keyword fields, and organized in certain folders or subfolders, and searched, grabbed and aggregated. The clip may also be associated with the parent footage from which it was created, and the parent footage is thus searchable and retrievable in part (with reference to its clips) or in sum (with reference to the whole video in its entirety).

Figure 9:
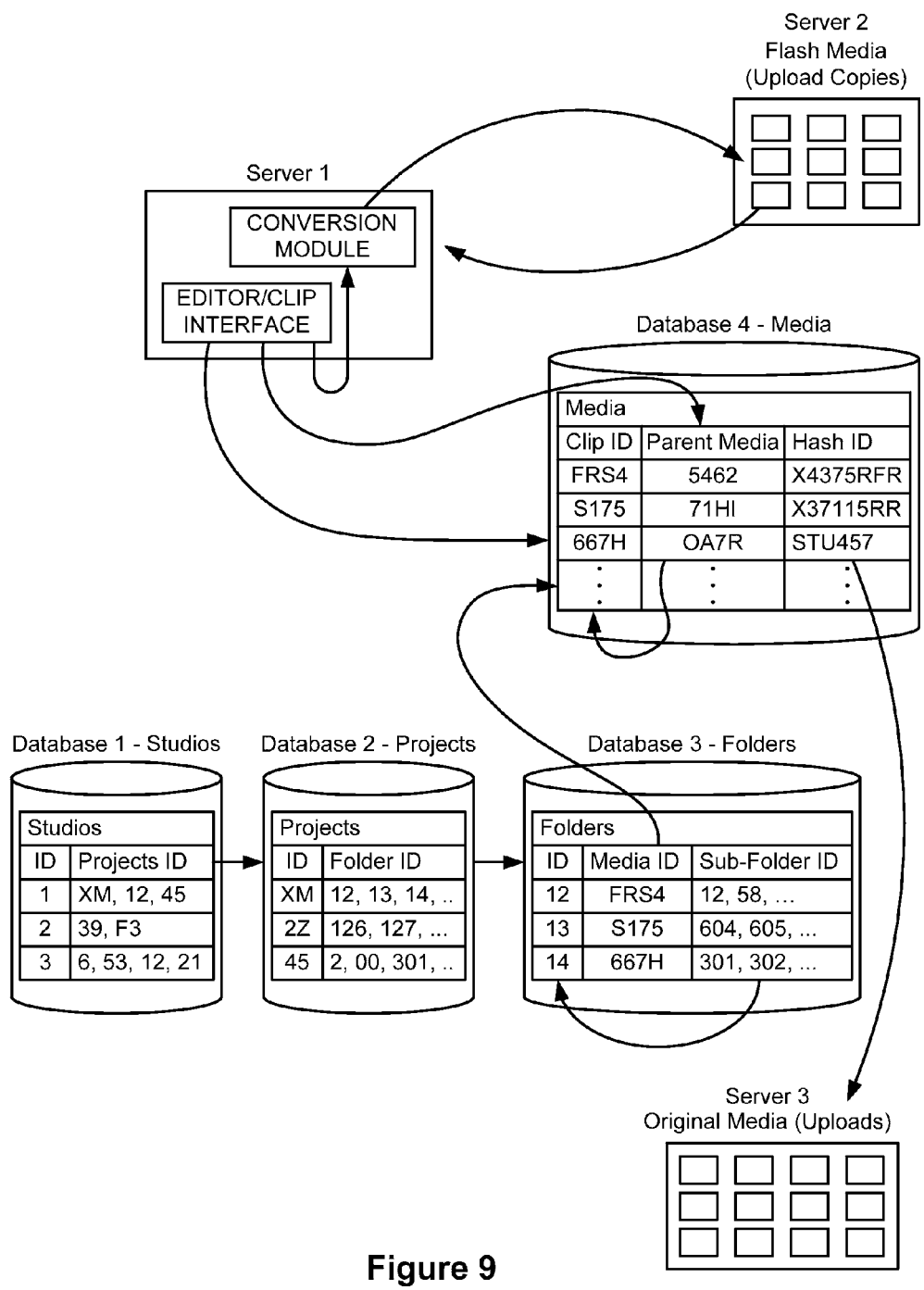
FIG. 9 illustrates an overview of the organizational hierarchy and storage of media on the system, in accordance with an embodiment of the invention.

FIG. 9 illustrates an overview of the organizational hierarchy and storage of media on the system, in accordance with an embodiment of the invention. Upon upload of a video file, a conversion module on Server 1 creates a flash low-resolution copy of the original video file to be stored on Server 2. The original video file, which may be a high-resolution video file may be stored on Server 3. When the user creates a clip from a video file, the Clip ID, along with the media ID of the parent media file may be stored in a Database 4. The media ID corresponds to the low-resolution flash copy of the video file stored on Server 2. Each media ID may also be associated with a hash ID which corresponds to a high-resolution original video file stored on Server 3. Each clip ID may belong to one or more folders, which may be categories of videos. Each folder may belong to one or more projects, which are owned by studios. The information relating to each studio, project or folder may be stored in database tables. Thus, each studio may own a number of projects, and each project may include a number of folders which contain various links to media files.

Figure 10:
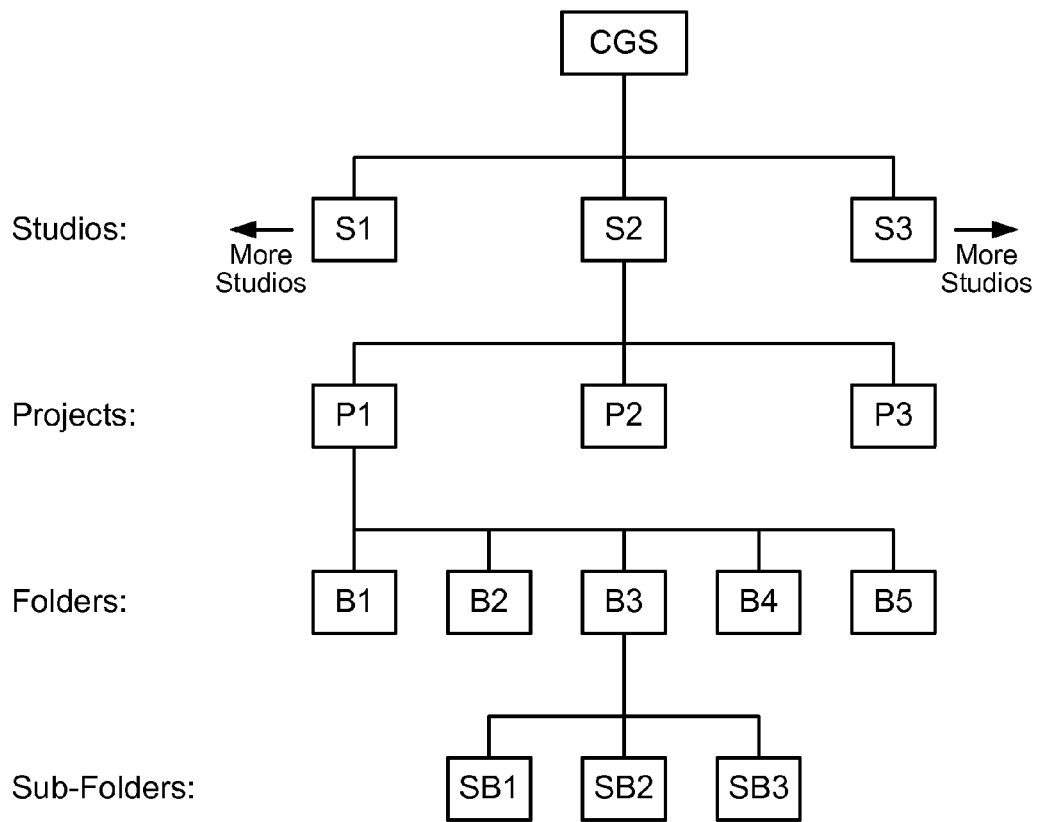
FIG. 10 illustrates a hierarchy of folders which may be used to organize media files, in accordance with an embodiment of the invention.

The organizational hierarchy may be organized into various folders (or bins) which represent categories of content. FIG. 10 illustrates a hierarchy of folders which may be used to organize media files. The folders enable a unique capacity to solicit, mine, clip, aggregate, organize and search submitted footage, and to arrange such footage around a theme or series of themes using a flexible portfolio of folders. The folders may organize footage for a particular project, and users may be presented with various folders for each project for the purpose of focusing uploads to be specific to a project host's needs. Referring to FIG. 10, various studios S1, S2 and S3 may utilize the system. Examples of studios may include "HBO," "Radiohead" or "World Bank." Each studio may have several projects P1, P2 and P3. Under each project, the studio may create various folders B1, B2, B3, B4 and B5. The information on folders that is available to a user may be different than the information on the folder available to an administrator. For example, a folder may be "Causes Global Warming Changes" for users, but for the administrator, the folder may have a title such as "Monday's work 2-5." Thus, the administrator of the folder may utilize the folder for organizational purposes. In addition, certain folders may appear to the administrators or internal users of a project in one form, and may have a different outward appearance. Thus, while the administrator may view the folder as "Monday's work 2-5," other users may view the folder as "Causes Global Warming Changes" but the same media may be available in the folder. Administrators of studios can also create folders that are only visible to that studio's administrators and can only be submitted to and managed by studio administrators. These types of folders can be, referred to as "Editor Folders." Further, each folder may further have subfolders, such as SB1, SB2 and SB3.

When a studio owns a project, the studio may, through the project, make a "call" which will alert different users within the project's network as to requests of the studio. For example, a studio may request videos on "wind energy," and other users within the project's network may have the opportunity to submit and make available various media files to the studio by answering the project's "call."

Figure 11A:
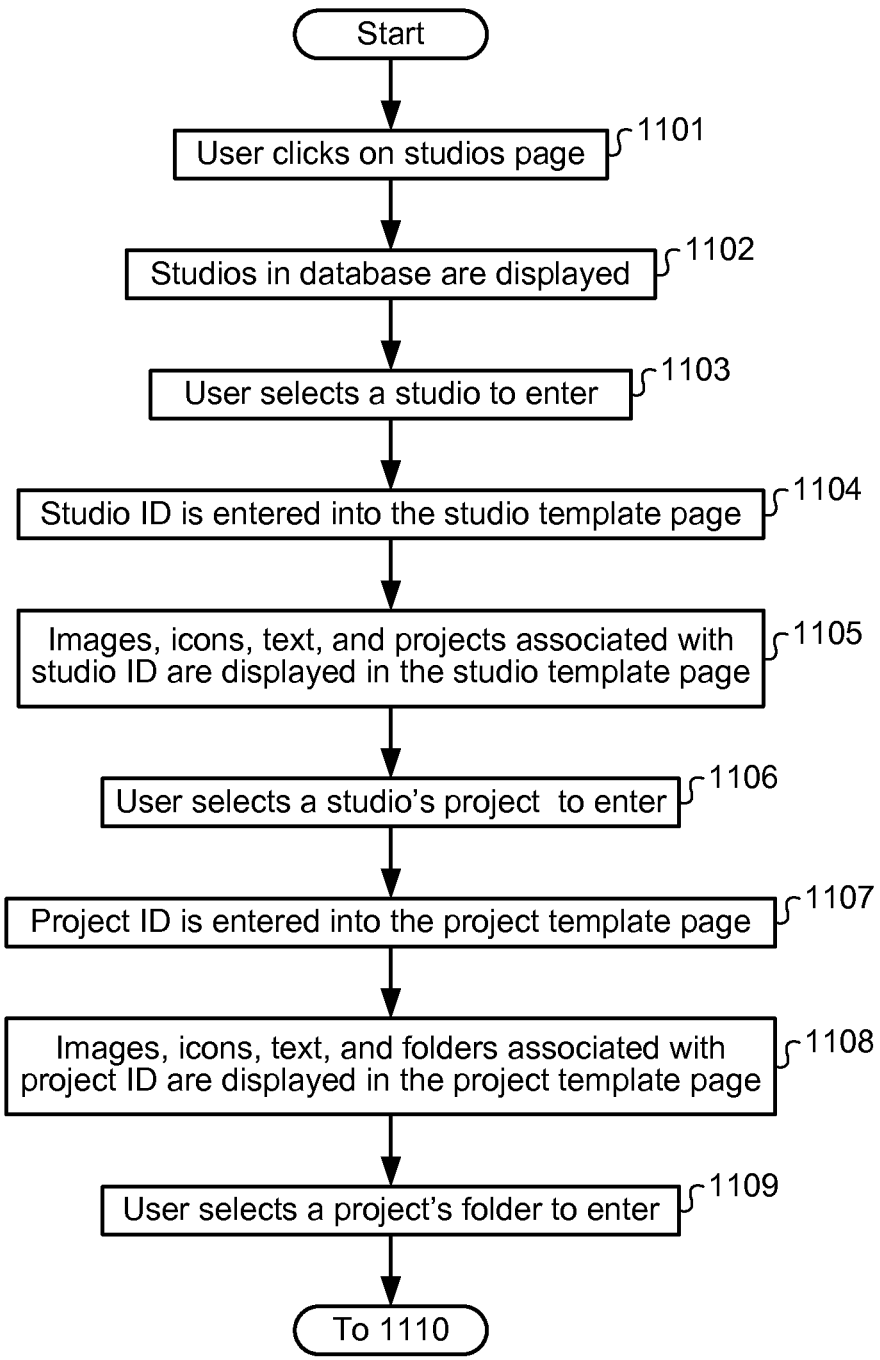
FIGS. 11A and 11B illustrate how a user may browse media located within folders on the system, in accordance with an embodiment of the invention.
Figure 11B:
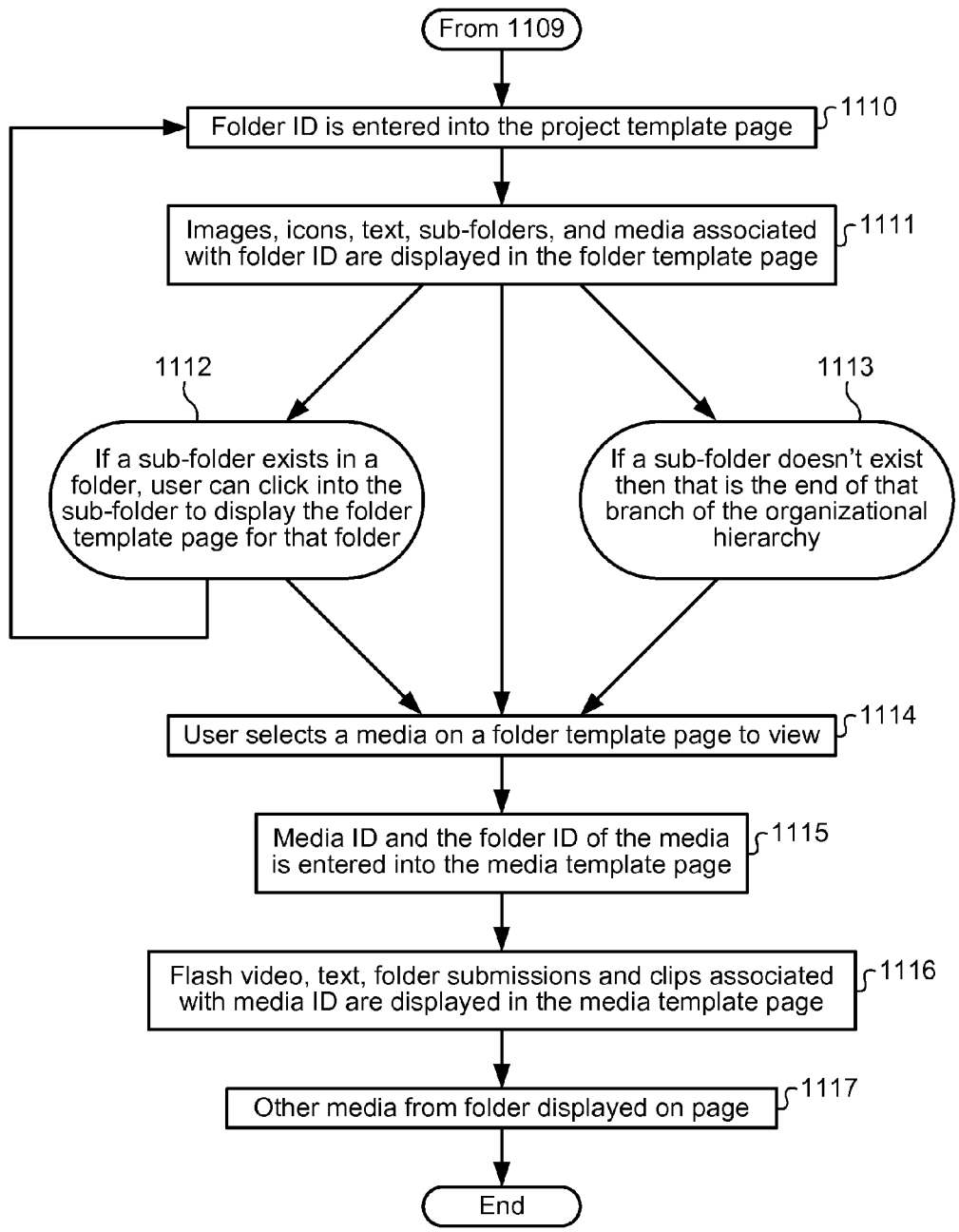

Referring to FIGS. 11A and 11B, one way for a user to browse through folders is illustrated. The user may click on the studio page in step 1101, and all of the studios in the database which the user has permission to view may be displayed in step 1102. The system receives the user's selection of a studio to view in step 1103. In step 1104, the system may capture the studio ID of the studio that the user selects, and in step 1105, images, icons, text and projects associated with the studio ID may be displayed on a studio template page. Each studio may have projects within it, and the user may select a studio's project to view in step 1106. In step 1107, the system may capture the Project ID of the project that the user selects, and in step 1108, images, icons, text and folders associated with the Project ID may be displayed on the project template page. Each project may have folders within it, and the user may select a project's folder to view in step 1109, the folder may be entered into in step 1110, and in step 1111, images, icons, text and subfolders and media associated with the Folder ID may be displayed on the folder template page. If a subfolder exists in the folder selected, then the user may click on the subfolder to display the folder template page for that folder, in step 1112. If a subfolder does not exist and it is the end of that branch of the organizational hierarchy in step 1113, then the user may move forward to step 1114 to select media on a folder template page to view. The user may also select media on a project's folder page without selecting any of the subfolders to view. In step 1115, the media ID and the Folder ID that the media is clicked from is entered into a media template page, and the flash video, text, folder submissions and clips associated with the media ID are displayed in the media template page in step 1116. In addition, other media from the folder is displayed on the page for the user's view in step 1117.

The organization of the folder and media may be such that full length media may be in a higher-level folder while clips of the full length media may be in subfolders, but various types of organization are contemplated and within the scope of the invention. An administrator of a project may control the folders and have settings to share the folders or make them private as well. The user may also have access to a video media player which allows the user to play media located in each folder to view the content of each media file.

Figure 12A:
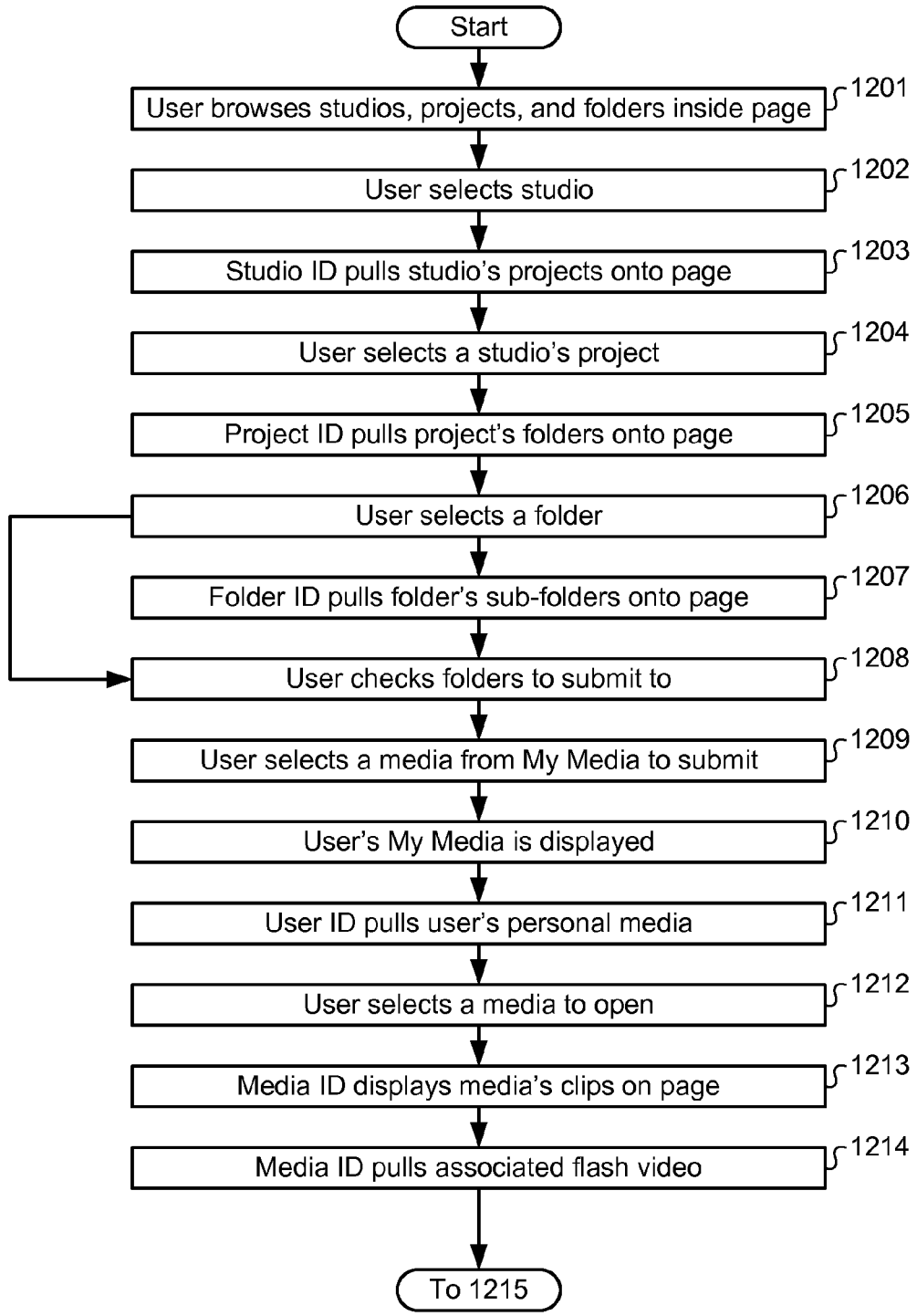
FIGS. 12A and 12B illustrate how a user may submit media to a certain project in accordance with an embodiment of the invention.
Figure 12B:
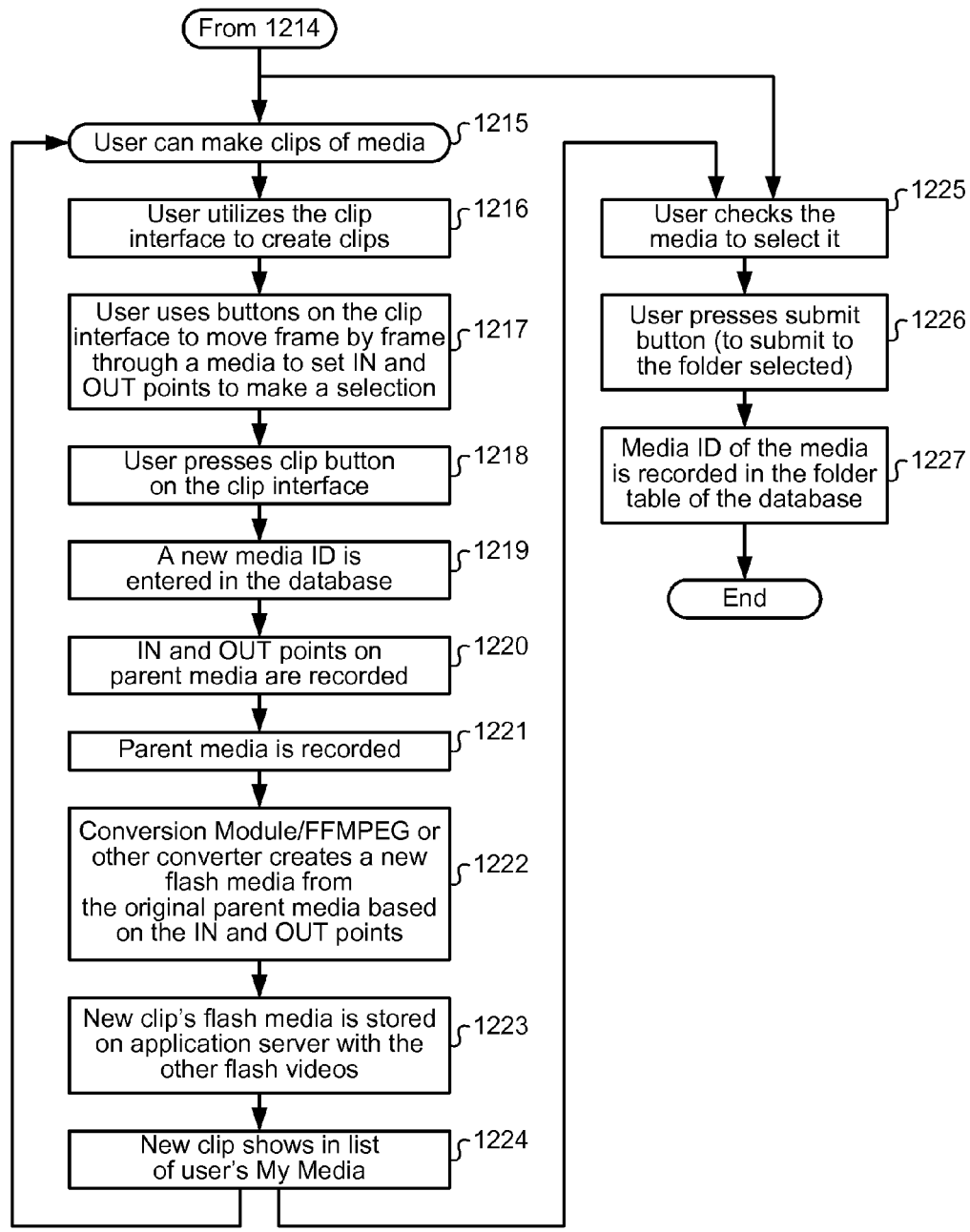

Referring to FIGS. 12A and 12B, the system may enable a user who is answering a project's "call" may submit media to a certain project through the steps illustrated in the flowchart. The system may allow a user to first browse studios, projects and folders within a page in step 1201. The system may then allow a user to select a studio in step 1202, the studio's projects may be pulled onto a page in step 1203, and then the user may select a studio's project in step 1204, the project's folders may be pulled onto a page in step 1205, and then the user may select a folder within the project in step 1206 or subfolders in step 1207 to submit media to. After the user selects a folder to submit the media to in step 1208, the system may allow a user to select from clips or videos from their uploaded media to submit to the project in step 1209. The user may utilize an interface in which their media is displayed in step 1210. The system may pull the user's personal media which has been uploaded by the user and associated with the user's ID in step 1211, the user may select a particular video to open in step 1212, and the system may display the various clips associated with the video that have been created by the user in step 1213. The system will also access the flash video associated with the particular media ID in step 1214.

In step 1215, the system may allow the user to make additional clips of the media selected. The user may utilize the Clip Interface in step 1216 to create the additional clips of the media selected. Buttons provided on the Clip Interface allow the system to play the media or display the media frame-by-frame in response to user action on the buttons to allow the user to set IN and OUT points to make a selection in step 1217. In step 1218, the user may press the clip button on the Clip Interface. In step 1219, a new media ID may be entered into a database, and new IN and OUT points on the parent media may be recorded in step 1220 along with the parent media ID in step 1221. In step 1222, FFMPEG or another conversion module may create a new flash media file from the original parent media based on the IN and OUT point recorded. In step 1223, the new clip's flash media file may be stored on an application server, and in step 1224, the new clip may be added to a list of the user's media files. In steps 1225 and 1226, the user may select certain clips or whole media or multiple clips of media to the folder within the project, which was previously selected in step 1205. In step 1227, the media ID of the selected clip or media is recorded in a table in a database. Thus a studio who makes a "call" for a project may be able to see the media that is submitted by users to certain folders within projects. When creating clips to submit, a user may associate the particular clips with a title, description or keywords as described above.

In addition, the system may keep a record of the history of a particular media or clip to show where the media has been previously submitted or by what users it has been submitted or viewed. Further, the user who owns the media or clip being submitted may also be able to offer it to be used by studios for certain rates, or under certain terms and conditions. Alternatively, a studio who makes a call may allow submissions to projects only on certain terms, or in exchange for certain rights or payments. There are a number of mechanisms for exchange or viewing of media between various users and a studio which are within the scope of embodiments of this invention.

The conversion module described herein may include media ingestion, conversion and editing software solution to record, convert and stream audio and video. Some examples include libavcodec, an audio/video codec library containing decoders and encoders for audio/video codecs; libavformat, a library containing demuxers and muxers for multimedia container formats; and libavdevice, a library containing input and output devices for grabbing from and rendering to many common multimedia input/output software frameworks, including Video4Linux, Video4Linux2, VfW, and ALSA. Thus, the conversion module may be able to handle an array of format standards including standard and institutional formats for online, commercial and broadcast mediums. In addition, the formats may vary over a wide range, depending on the source of the media which may include a variety of sources such as consumer cameras, cell phones, professional cameras, Standard Definition, High Definition, digital media, and streaming cameras, etc.

FIG. 13 illustrates a screenshot of a studio page, in accordance with an embodiment of the invention. As can be seen in FIG. 13, the studio "CGS" has two projects: 1) Plan for the Planet, and 2) THEM. Each project has a thumbnail associated with the project, as well as a project description. If a user would like to view the details of a certain project, they may click on the link of the project title, for example, which would allow them to view the project page, which may provide details of the studio's project.

The user interfaces shown herein may be used in the systems and methods described herein (such as within a system with the upload process, the hierarchy of studios, projects and folders, multiple format delivery, and/or collaborative editing, in various combinations and embodiments), alone or in combination with other user interfaces or other elements. Alternatively, the systems and methods described herein may be used with different user interfaces or independently.

FIG. 14 illustrates a screenshot of a project page, in accordance with an embodiment of the invention. In FIG. 14, the details of the studio's project "Plan for the Planet" may be viewed. As shown in FIG. 14, the studio's project has several folders within the project, including "Solutions," "Impacts," "Causes," and "Effects." Also, as shown on the right, certain terms and conditions for submitting, viewing or using media within the project are shown. For example, in this project, users may submit clips and cuts to the project. If a user would like to view what media is included in the project's "Solutions" folder, for example, the user may click on the "Solutions" folder to view its contents. Displayed on the page may also be the price limit that the project accepts. This refers to the maximum price per second of media that the project will accept submitted to them. The administrator will set what is the threshold maximum that the producers will pay for footage used. Options are the project will accept only free media, a threshold such as $1.00 per second, or any priced media. Media is not paid for until it used by the project: exported from the editor or downloaded from the site in high-resolution. The project only pays for the selections (by the second) that it uses.

FIG. 15 illustrates a screenshot of a folder page, in accordance with an embodiment of the invention. In FIG. 15, the description of the folder is displayed, as well as various subfolders within the folder, including "Environment Solutions", "Water Solutions", "Govt. Solutions", "Business Solutions", "Energy Solutions", "Economic Solutions" and "Lifestyle Solutions." In addition, various media files are organized within the folder "Solutions" as shown by the various media submitted by user "PeoplesGrocery." The various media files contained within the "Solutions" folder, may also be included in various subfolders within the folder.

Multiple Format Delivery System:

Users may also utilize the system by uploading and storing high-resolution footage, and then viewing, aggregating and modifying the footage efficiently using low-resolution copies of the media files. Users may create new media through editing, modifying and aggregating the low-resolution copies, and then export the final product in various formats, including high-resolution broadcast quality media, media suitable for viewing over the Internet, or low-resolution media for example, viewing on a user's mobile device or cell phone or other device.

The system may enable high-resolution footage to be uploaded and stored on the system while creating low-resolution online flash copies of this footage to be viewed, clipped, aggregated and modified using the systems and methods described herein. Modifications and edits may be applied to the flash copies to be transferred to the high-resolution footage. As the flash copies are being clipped and edited, the system may record these modifications using metadata in a database. When an edit made in the editing interface is exported, the system allows the user to select the exported video's export settings, such as the format, frame size, frame rate and data rate. Scripts then apply the modification metadata onto the high-resolution files, combine these files into one media file and then convert the file to the appropriate export settings for download.

Within the overall system, the delivery component interacts with the submission module, edit module, and conversion module to create a final exported product with a user's desired export settings. Videos which are uploaded using a submission module, and then edited using an edit module, are finally exported via a conversion module. Thus, the delivery component utilizes editing decisions as stored in an edit database and accesses high-resolution media files stored on a storage serve, and low-resolution media files stored on a proxy or application server, to create a final exported product.

The methods and systems described for multiple format delivery may be applied to other aspects of the system or may operate independently. Additionally, other aspects of the system (e.g., uploads, content aggregation and organization, editing interface, or collaborative editing) may be used in combination with the methods and systems for multiple format delivery or other aspects, or may be provided independently.

Figure 16:
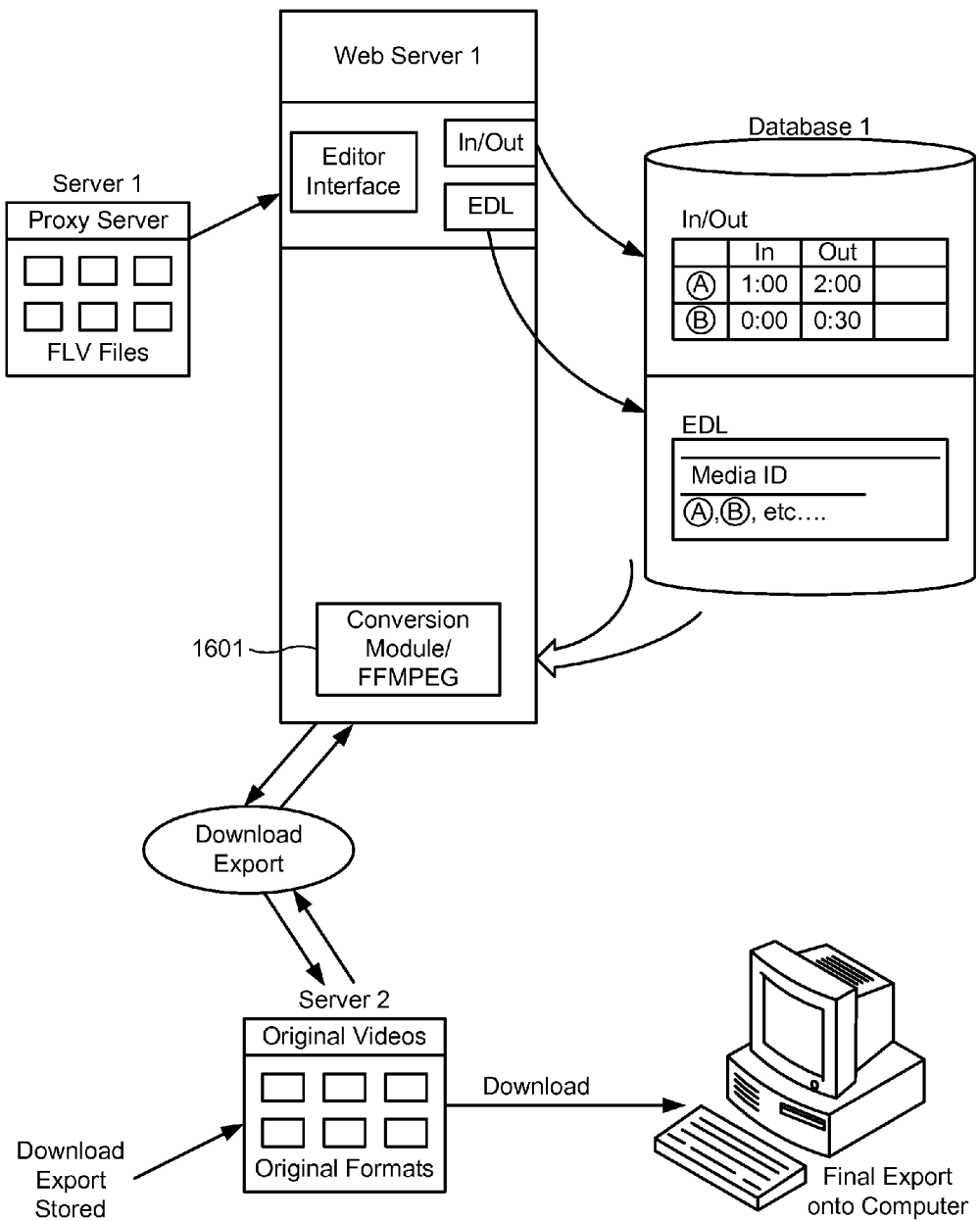
FIG. 16 illustrates an overview of a process by which high-resolution footage may be uploaded and stored, and then viewed, aggregated and modified using low-resolution flash copies, in accordance with an embodiment of the invention.

FIG. 16 illustrates an overview of a process by which high-resolution footage may be uploaded and stored, and then viewed, aggregated and modified using low-resolution flash copies. As the flash copies are being modified, the changes may be stored via metadata, and alterations may be mirrored on the stored high-resolution copy and reflected in the high-resolution export. Referring to FIG. 16, Web Server 1 may include an Editor Interface, which allows a user to create clips, as described above. The system allows the user to select various media files, and in response, the system may display the flash or low-resolution copies of the media files stored on Server 1, which may be a Proxy Server. The system allows the user to create clips for this media by selecting various IN and OUT points for the media. As the Editor Interface plays the low-resolution media files, the system displays the low-resolution media files and allows the user to create clips by selecting IN and OUT point for the media, which may be stored in Database 1. A timeline of clips or an EDL, as described above, may be created and stored in Database 1. The system may allow the user to switch the order of clips, add transitions, etc. within the EDL, as described above. The system allows editing decisions to be made using low-resolution files, as the low resolution files are displayed, and the EDL is created in metadata stored in a database. When the low-resolution EDL is ready for export, the system allows the user to select a format for the final product. The system provides choices of creating a low-resolution video or flash video of the EDL, or a high-resolution video of the EDL, or videos of other formats and sizes.

If a low-resolution video or flash video of the EDL is selected, then the conversion module 1601 may refer to the IN/OUT database table as well as the EDL table. The conversion module 1601 may obtain the first video file A from Server 2 where the original video files are stored, and the respective IN and OUT points of the clip from Database 1, and parse the original video A appropriately and convert it to an .avi file or some other low-resolution format as specified. This .avi file or other low-resolution format file may be stored as a temporary file on web server 1 or some other server. Next, the conversion module 1601 may obtain the second video file B from Server 2, and the respective IN and OUT points of the clip from Database 1, and parse the original video file B appropriately and convert it to an .avi file or some other low-resolution format as specified. The conversion module 1601 may perform the same function for the audio portions of the clips in the EDL, and convert to a .pcm file or some other format. The conversion module may then consult the EDL table in Database 1 for the order of clips, and re-assemble the clips according to the EDL. The video files will be re-assembled in .avi format, the audio files will be reconstructed in .pcm format, and each stored in temporary files on the server. The audio and video files may then be combined in .avi format. Alternatively, the .pcm audio files may be converted into .mp3 format, or any other format which may be used for audio files.

Figure 17:
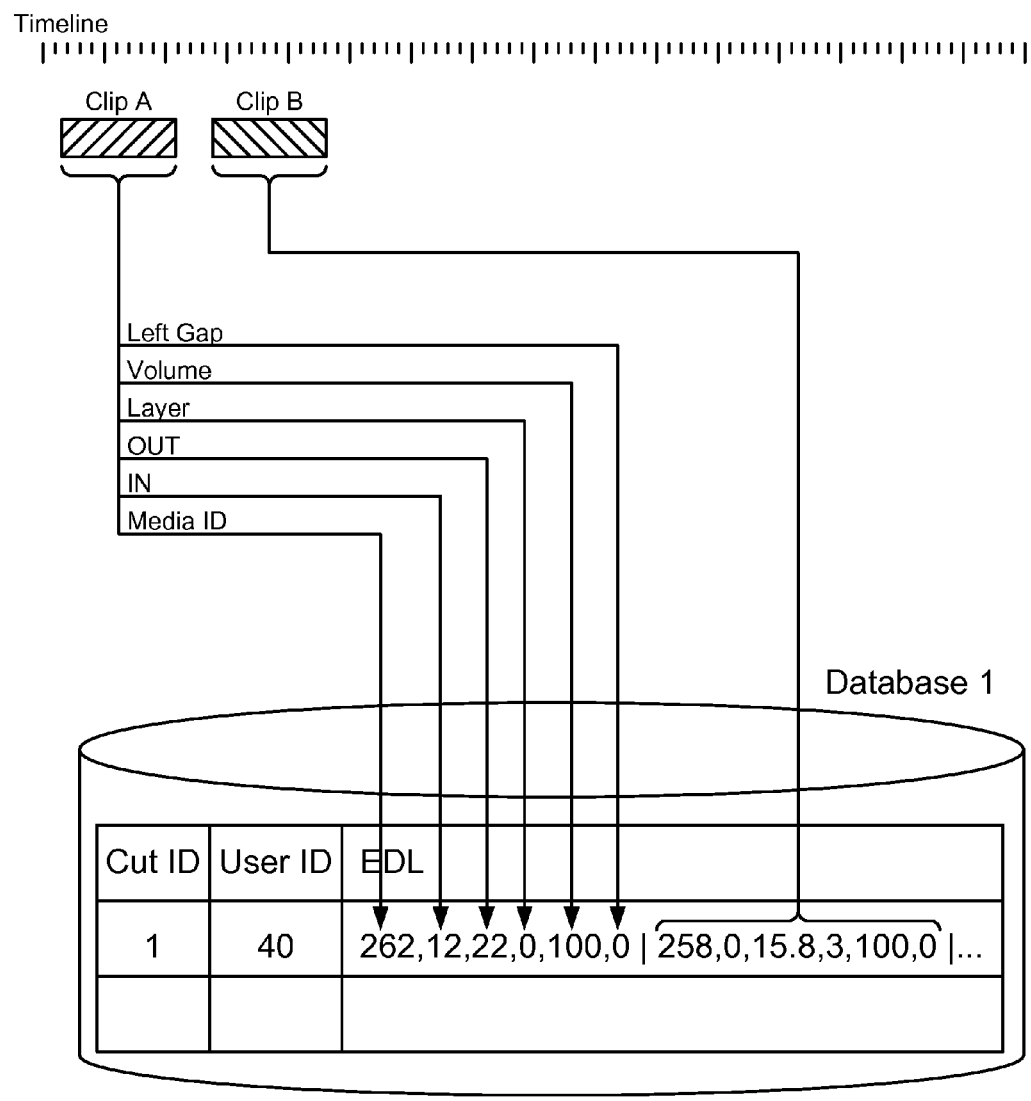
FIG. 17 illustrates the edit decision list (EDL) table in additional detail, in accordance with an embodiment of the invention.

The EDL may be stored in a database table. Referring to FIG. 17, the EDL table of Database 1 is shown in additional detail. When a user is creating an edit decision list, the current list may be assigned a Cut ID. In this example, the Cut ID is "1" and the User ID is "40". If the user wants to create a video which begins with Clip A and is next followed by Clip B, the user may create these clips in Database 1. Each clip will have a media ID which represents the parent media flash copy file, an IN point which represents a time stamp of the point in the parent media at which the clip beings, and an OUT point which represents a time stamp of the point in the parent media at which the clip ends. The clip may also include other information and data including a Layer, Volume of the sound, or Left Gap. Layer refers to the order in which videos in a top layer will play over other ones in layers underneath it. So, a clip in layer 2 that sits above layer 1 will show over the clip below it in layer 1. One example of the use of this would be if an interview was playing in layer 1 and the editor decided to show footage of what the interview subject was talking about. In layer 1 the interview subject talks about whales and in layer 2 the editor inserts footage of whales 5 seconds after the clip in layer 1 begins to play. This 5 second margin is called the Left Gap. The amount of time cushioned before a clip is recorded in the database as the Left Gap. The resulting play back of these two clips with the Left Gap of 5 seconds on the video in layer 2 is first seeing and hearing the interview subject and then when the clip in layer 2 was reached after the $5^{th}$ second in the timeline the video of the whales would be seen but the audio of the interview would still be heard. In the example shown, Clip A (having certain Media ID, IN, OUT, Layer, Volume and Left Gap values) occurs first in the EDL and is followed by Clip B (having certain Media ID, IN, OUT, Layer, Volume and Left Gap values), and so on. This information may be stored in database 1.

It is understood that conversion to various formats is contemplated and within the scope of the embodiments of the invention. For example, in one embodiment, the export file format may be a format which is compatible to be viewed on a mobile device or personal viewing device such as a portable video player, MP3 player with a video display or iPod. In addition, the file may be exported via an automated distribution vehicle and be exported in various formats to various locations simultaneously.

A user may choose to export the finished edited product in a variety of formats or with a variety of settings. FIG. 18 shows how export settings may be customized. Instead of exporting to a low-resolution video file, the user may choose to export a completed EDL to a high-resolution format. The user may customize a number of variables including the format 1801, frame size 1802, frame rate 1803 or data rate 1804. The format may be chosen from formats that include MPEG-4, or any other format available, including formats which allow users to view the exported video from their mobile device or cell phone, from the web, or even broadcast quality resolution. The frame size may be chosen from frame sizes such as 320×420, 1280×720, and 1920×1080. The frame rate may be chosen from frame rates such as 8 frames/sec, 24 frames/sec, 60 frames/sec, etc. The data rate may be chosen from data rates such as 100 kbits/sec, 500 kbits/sec, or 20,000 kbits/sec. It is understood that the invention is not limited to the specific examples described herein but contemplates a variety of formats, frame sizes, frame rates and data rates which are well known in the art.

As mentioned in the uploading parameters, the export methods, formats and specifications described herein with respect to videos apply to various and any types of video, audio and images export settings. For example the video and audio formats included in the export options, but not limited to: E 3g2, E 3gp, D 4xm, D MTV, D RoQ, D aac, DE ac3, E adts, DE aiff, DE alaw, DE amr, 3gpp, DE asf, E asf stream, DE au, DE audio, DE avi, D ays, E crc, D daud, D dsicin, D dts, DE dv, D dv1394, E dvd, D dxa, D ea, DE ffm, D film_cpk, DE flac, D flic, DE fly, E framecrc, DE gif, DE gxf, DE h261, DE h263, DE h264, D idcin, DE image2, DE image2pipe, D ingenient, D ipmovie, DE m4v, D matroska, DE mjpeg, D mm, DE mmf, E mov, D mov, mp4, m4a, 3gp, 3g2, mj2 QuickTime/MPEG4/Motion JPEG 2000 format, E mp2, DE mp3, E mp4, D mpc, DE mpeg, E mpeg1video, E mpeg2video, DE mpegts, D mpegvideo, E mpjpeg, DE mulaw, D mxf, D nsv, E null, D nut, D nuv, DE ogg, E psp, D psxstr, DE rawvideo, D redir, DE rm, E rtp, D rtsp, DE s16be, DE s16le, DE s8, D sdp, D shn, D smk, D sol, E svcd, DE swf, D tiertexseq, D tta, DE u16be, DE u16le, DE u8, D vc1, E vcd, D video4linux, D video4linux2, D vmd, E yob, DE voc, DE way, D wc3movie, D wsaud, D wsvqa, D wv, and DE yuv4mpegpipe. Video and audio codecs that are included but are not limited to: D V 4xm, D V D 8bps, D V VMware video, DEA aac, D V D aasc, DEA ac3, DEA adpcm_4xm, DEA adpcm_adx, DEA adpcm_ct, DEA adpcm_ea, DEA adpcm_ima_dk3, DEA adpcm_ima_dk4, DEA adpcm_ima_qt, DEA adpcm_ima_smjpeg, DEA adpcm_ima_wav, DEA adpcm_im_ws, DEA adpcm_ms, DEA adpcm_sbpro_2, DEA adpcm_sbpro_3, DEA adpcm_sbpro_4, DEA adpcm_sw, DEA adpcm_xa, DEA adpcm_yamaha, D A alac, DEA amr_nb, DEA amr_wb, DEV D asv1, DEV D asv2, D V D ays, DEV bmp, D V D camstudio, D V D camtasia, D V D cays, D V D cinepak, D V D cljr, D A cook, D V D cyuv, D A dca, D V D dnxhd, D A dsicinaudio, D V D dsicinvideo, D A dts, DES dvbsub, DES dvdsub, DEV D dvvideo, D V dxa, DEV D ffv1, DEVSD ffvhuff, DEA flac, DEV D flashsv, D V D flic, DEVSD fly, D V D fraps, DEA g726, DEV gif, DEA gsm, D A gsm_ms, DEV D h261 DEVSDT h263, D VSD h263i, EV h263p, DEV DT h264, DEVSD huffyuv, D V D idcinvideo, D A imc, D V D indeo2, D V indeo3, D A interplay_dpcm, D V D interplayvideo, EV jpegls, D V kmvc, EV libtheora, EV ljpeg, D V D loco, D A mace3, D A mace6, D V D mdec, DEV D mjpeg, D V D mjpegb, D V D mmvideo, DEA mp2, DEA mp3, D A mp3adu, D A mp3on4, D A mpc sv7, DEVSDT mpeg1video, DEVSDT mpeg2video, DEVSDT mpeg4, D A mpeg4aac, D VSDT mpegvideo, D VSDT mpegvideo_xvmc, DEVSD msmpeg4, DEVSD msmpeg4v1, DEVSD msmpeg4v2, D V D msrle, D V D msvideo1, D V D mszh, D V D nuv, DEV pam, DEV pbm, DEA pcm_alaw, DEA pcm_mulaw, DEA pcm_s16be, DEA pcm_s16le, DEA pcm_s24be, DEA pcm_s24daud, DEA pcm_s24le, DEA pcm_s32be, DEA pcm_s32le, DEA pcm_s8, DEA pcm_u16be, DEA pcm_u16le, DEA pcm_u24be, DEA pcm_u24le, DEA pcmu32be, DEA pcm_u32le, DEA pcm_u8, DEV pgm, DEV pgmyuv, DEV png, DEV ppm, D A qdm2, D V D qdraw, D V D qpeg, D V D qtrle, DEV rawvideo, D A real_144, D A real_288, D A roq_dpcm, D V D roqvideo, D V D rpza, DEV D rv10, DEV D rv20, D A shorten, D A smackaud, D V smackvid, D V D smc, DEV snow, D A sol_dpcm, DEA sonic, EA sonicls, D V D sp5x, DEV D svq1, D VSD svq3, DEV targa, D V theora, D V D tiertexseqvideo, D V tiff, D V D truemotion1, D V D truemotion2, D A truespeech, D A tta, D V D ultimotion, D V vc1, D V D vcr1, D A vmdaudio, D V D vmdvideo, DEA vorbis, D V vp3, D V vp5, D V vp6, D V vp6f, D V D vqavideo, D A wavpack, DEA wmav1, DEA wmav2, DEVSD wmv1, DEVSD wmv2, D V wmv3, D V D wnv1, D A ws_snd1, D A xan_dpcm, D V D xan_wc3, D V D xl, EV xvid, DEV D zlib, DEV zmbv. The system can also export any frame rate, from 1 frame per second (fps) to 100 fps, and any frame size, from 1px×1px to 3000px×3000px.

Figure 19:
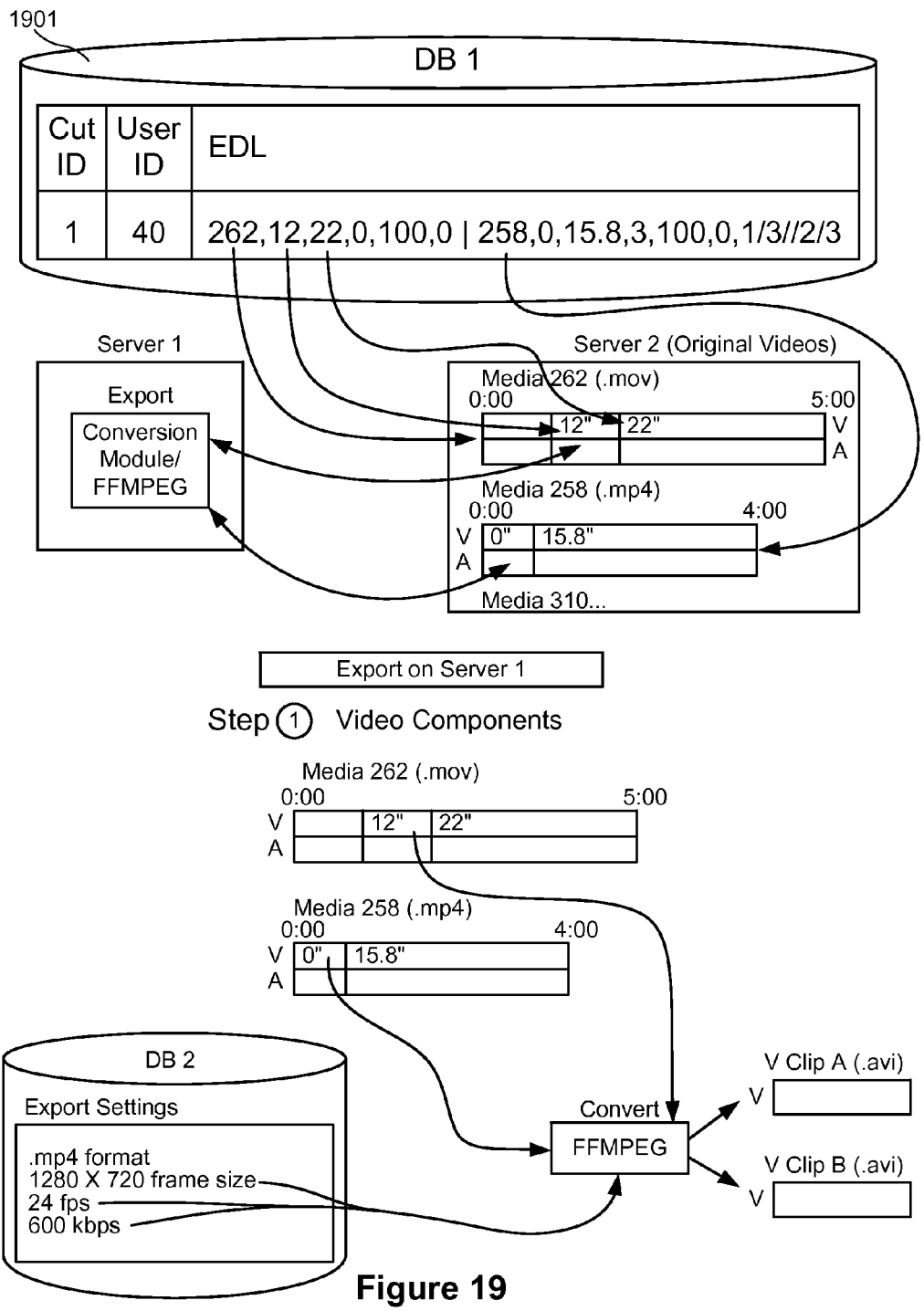
Figure 21:
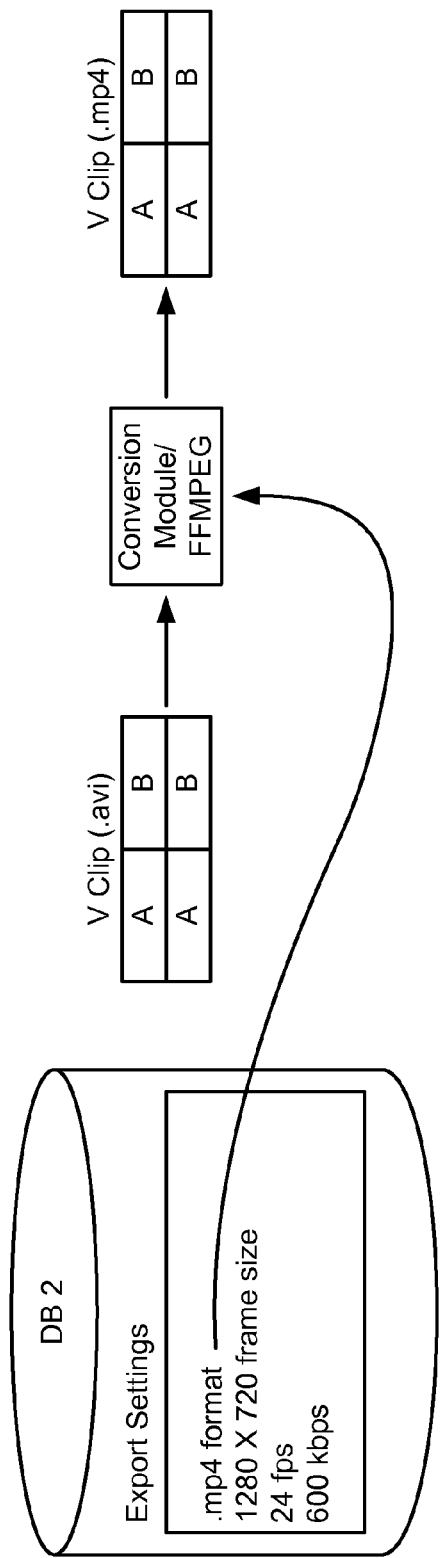

After the export settings are chosen, the settings may be recorded in a database and thereafter applied to multiple steps in the conversion process. A conversion module, such as FFMPEG or any other type of conversion module may be utilized in this process. FIGS. 19-21 illustrate the architecture of the process by which footage which has been viewed, aggregated and modified using low-resolution flash copies may be exported into the user's desired format. The user may press the export button from Server 1. In the example shown, the Conversion Module, FFMPEG, will process the export function. The export script may obtain the EDL metadata for the video component from Database 1. Thus, the export script may reference Database 1 for each clip's MediaID, and IN and OUT points in the EDL. FFMPEG may apply these IN and OUT points to the original high-resolution videos stored on Server 2. The MediaIDs in the EDL table in Database 1 may be compared to the hash IDs of the original media files. When the appropriate original high-resolution media file is located, the conversion module or FFMPEG may convert the clip of the media file in a different format, such as an .avi formatted media file with the frame size, frame rate and data rate as indicated in the user's desired export settings. FFMPEG may convert each clip included in the EDL using this same process. Thus, the result is that there will be several video files for each clip, each in the .avi format, such as V Clip A, and V Clip B as shown in FIG. 19.

Referring to FIG. 20, the conversion module may utilize an export script to obtain EDL metadata for the audio component of the final product from the information contained in Database 1 as well. Each audio of each clip included in the EDL may be separately converted into the .pcm format. Thus, each audio track may be converted into the .pcm format. The result may be that there will be an audio file for each clip in a .pcm format, such as A Clip A and A Clip B as shown in step 2 on FIG. 20.

Referring to step 3 on FIG. 20, the export script may then refer to the EDL metadata in the EDL table in Database 1 to join the video clips into one longer sequence. The conversion module may apply transitions to the appropriate clips, and join all of the .avi converted clip files together in the correct order into one .avi file (V Clip).

In one embodiment, in step 3, the conversion module may apply transitions to appropriate clips, as specified by a user. For example, a user may add a specific transition to a particular clip, and mark the transition time in the EDL in the database. When the conversion module applies the transition to the appropriate clip, the transition ID and time may be accessed from the database. The user's desired export settings may also be accessed from the database, including the frame size, frame rate, format, and data rate. The script may then obtain a portion of the media clip from the original video on the storage server, and utilize FFMPEG to break the clip into individual frames based on the desired frame rate of the export settings. The script may then access transition images corresponding to the transition ID in the transition library, and for example, access 50 images per transition. The script may calculate the length of the transition time proportionately over the number of frames of the video clip and the number of transition images, and then process each frame with the appropriate transition frame, and combine each frame with the appropriate transition frame. The script may utilize FFMPEG to assemble each new combined frame back into the video clip. Thus the combined frame, with the appropriate transition applied, may then be included in the final product. Thus, the transition may be applied to the appropriate clips, prior to having all of the .avi converted clip files joined together in the correct order into one .avi file (V Clip).

In one embodiment, a user may have applied video or image zooming and movement to the editing effects, which may have been recorded as metadata in the EDL table in Database 1. For example, the user may apply an effect which zooms in or out on an image, and the zoom or movement percentages may be marked and recorded in a database. These percentages may be accessed by the database during the exporting process, and the script may access the original video from the storage server, along with its frame size information from the database. The script may calculate the zoom percentage on the original frame size, and then calculate the movement percentage in relation to the zoom percentage on the original frame size. Based on the result of the calculation, if the clip was zoomed in on then the script may calculate which pixels of the frame to remove around the edges. Alternatively, if the clip was zoomed out on then the script may calculate which black pixels to be added as padding to the sides of the frame. The script may then utilize FFMPEG to produce the correct zoom and movement on the clip. Thus, the clip with the appropriate zoom and movement may be created, prior to having all of the .avi converted clip files joined together in the correct order into one .avi file (V Clip).

In addition, in step 3, the export script may also refer to the EDL metadata in the EDL table in Database 1 to join the audio clips into one longer sequence. In one embodiment, the export script may utilize FFMPEG to convert the audio file into the final desired audio format. Thus, the user may include several layers of audio while editing the media using the editing interface, and modify the order of the audio files, layering, and volume levels. This information may be recorded in a database as metadata, as described above. The export script may access this information from the database, and calculate the relationships between the audio files. The script may then divide the audio EDL from the database into separate segments, each starting and ending where there is a change or when a new file is added or removed, or there is a change in volume, for example. The script may access the original audio files from the storage server, and then utilize FFMPEG for each segment to create a .pcm formatted audio file with the necessary settings. The script may then utilize FFMPEG to combine all of these audio files in each segment, and then utilize FFMPEG to combine all of the various segments into one cohesive segment, and finally utilize FFMPEG to convert the resulting audio file into the final desired audio format. Thus, the conversion module may join all of the .pcm converted clips together in one longer sequence in the correct order into one .pcm file (A Clip) in step 3.

Figure 22:
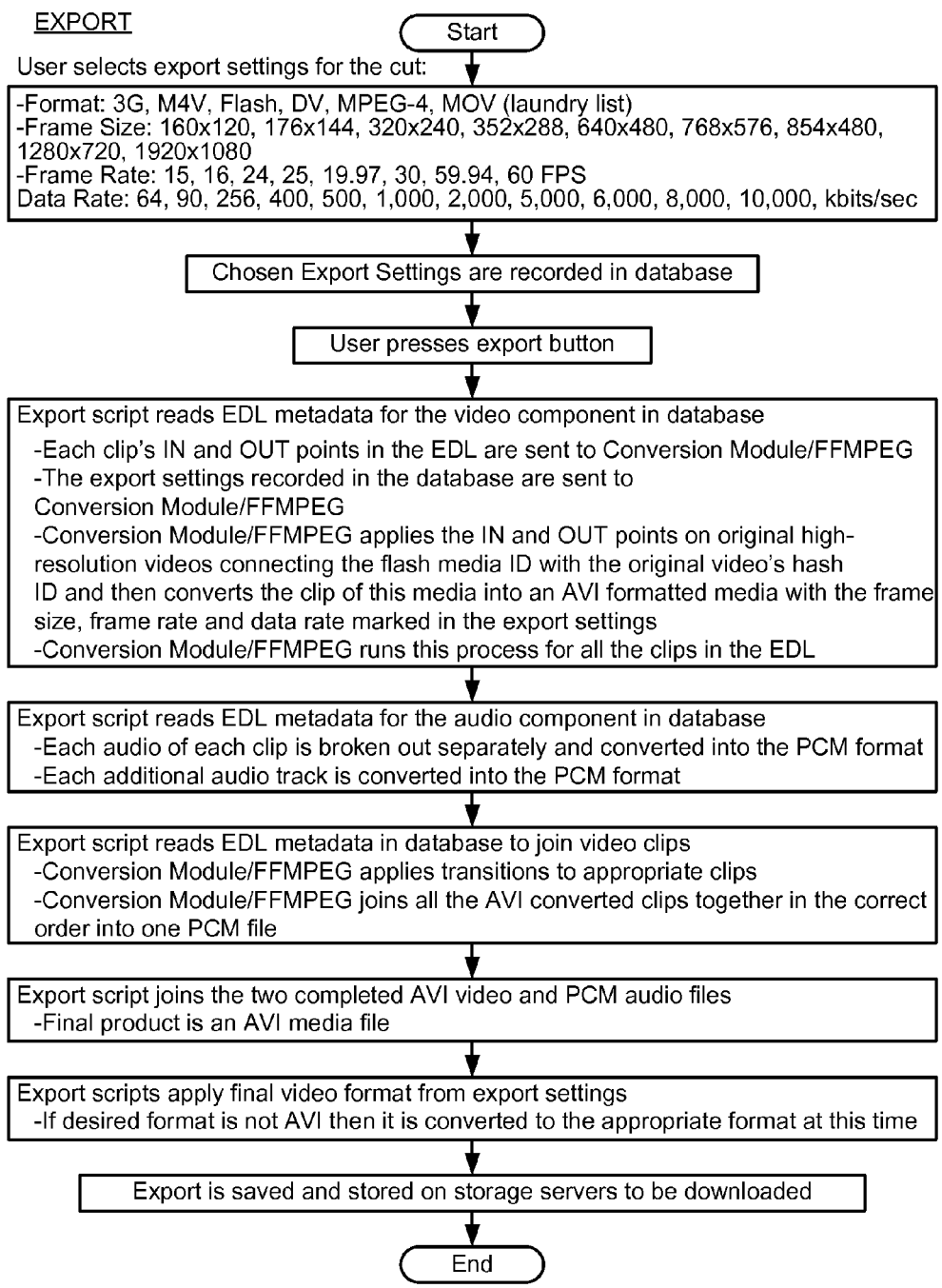
FIG. 22 illustrates a flowchart of the export process, in accordance with an embodiment of the invention.

Referring to step 4 on FIG. 20, the export script may then join the two completed .avi video and .pcm audio files in order to create the final exported product in an .avi media file format (V Clip). Referring to step 5 on FIG. 21, the export script may then apply the final video format from the export settings. Thus, if the user's desired export format is not .avi, then the export script may convert the .avi file into the correct media format, in this step. For example, if the user's desired format is .mp4 format, then the final conversion step in step 5 may convert the .avi media file into a .mp4 media file. The exported file may then be saved and stored on servers, or may be downloaded by the user. FIG. 22 illustrates a flowchart of the export process, as described above.

In one embodiment, the export script only converts the files once throughout the various parts of the process, in order to preserve the quality of the raw video. Thus, the export settings are first chosen by the user. Then, in step 1 on FIG. 19, the conversion module that is used does not convert the video clips into .avi format, but rather converts the video clips into the user's desired format for export. Similarly, in step 2 on FIG. 20, the audio files are converted into the user's desired format for export. In step 3 on FIG. 20, the video and audio clips are each joined together in the desired sequence as indicated by the EDL. In step 4 on FIG. 20, the audio and video clips are joined with one another to form one media clip with both audio and video. In step 5 on FIG. 21, no additional conversion is necessary because the media is already in the desired export format, as it was converted in the initial step.

The exported video, which may be a high-resolution video, is thus created from editing that was done in a low-resolution format, using low-resolution copies of the original videos along with metadata stored in various database tables. The exported video may be stored on a storage server such as Server 2, or may be downloaded and stored on the editor's computer as a local copy. Through this process, an efficient way of editing high-resolution video is utilized, as the original high-resolution video files are only manipulated upon export, and not while the editing is taking place.

FIG. 23 shows a screenshot of a page in which a user may select certain media to create clips and add to an EDL. FIG. 24 shows a larger view of a screenshot of a page in which a user may create a clip from a selected media file. The user may also provide a title, description and keywords to be associated with the clip.

Collaborative Editing Interface:

The platform may also include a robust online editing platform which allows users to access footage from the various folders in the content aggregation network and mix and remix video content. Editors and site administrators may be able to create folders and subfolders to organize footage for their own purposes. In addition, there may be a collection of server-side editing tools which include collaborative functionality. The platform may also allow for simultaneous editing from multiple locations. For example, a director, producer, and studio head may all be located at different locations around the world and participate in the same virtual editing suite. Rather than having professional edits being done offline and requiring cumbersome communications back-and-forth, or for the entire creative team to assemble in one room at one location, the platform enables various participants at various locations to simultaneously, through remote access, participate in the editing process. Thus, a cameraman may be in Bangladesh, a director in Miami, and a studio head in Los Angeles, and each may participate simultaneously, via the platform, in the editing process. The editing interface may enable interactive collaborative editing through an online editing platform which may deliver broadcast-quality resolution media or media in various formats. Through the collaborative editing interface, footage may be taken from folders to create various edited video sequences. Users may simultaneously edit the same video sequence from various locations through the collaborative editing interface.

Embodiments of the invention provide an online collection of server-side editing tools, which include timeline clip preloading for seamless video delivery, a library of transitions, effects and titles, and editing in various video layers and various audio layers, and collaborative functionality. Collaborative functionality in the editor includes multi-user viewing of the same editing interface (from different locations in the world), instant messaging communication, transferable editing controls between users and a media/idea suggestion portal. Multi-user viewing may be achieved via updates that are recorded in the database for version control between users and the ability to undo/redo edit decisions. A group of interrelated web development techniques used on the client-side to create interactive web applications or rich Internet applications may be used in accordance with an embodiment, to provide the updates. An approach may be used whereby web applications retrieve data from a server asynchronously in the background without interfering with the display and behavior of the existing page. Interactive animation on web pages and asynchronous mode may be used. Data may be retrieved using the XMLHttpRequest object. The use of JavaScript and XML is not required, nor do the requests need to be asynchronous. For example, AJAX (shorthand for asynchronous JavaScript and XML), may be employed to provide the updates. In addition, the collaborative editing interface may include a folder or media management interface which allows users to access various media files. Further, the system may allow users to create new cuts which may be stored in the various folders described above, and associated with studios, projects, folders or subfolders, as desired by a user.

Each collaborative user may be located remotely and thus the system includes methods for updating the EDL for each collaborative user on remotely located computer systems. A shared database may be synchronized by using the application server where the collaborative editors are connected to the system. The methods and systems described for collaborative editing may be applied to other aspects of the system or may operate independently. Additionally, other aspects of the system (e.g., uploads, content aggregation and organization, editing interface, or multiple format delivery) may be used in combination with the methods and systems for collaborative editing or other aspects, or may be provided independently.

For example, three users at different locations may access the collaborative editing interface. To illustrate, Users 1, 2, and 3 may access the editing interface. The system may enable each of the users in editing the same EDL, and through the collaborative editing interface, the system may facilitate simultaneous editing and collaborating capabilities. User 1 may be the editor and the moderator, and thus the system may allow editing capabilities, or the capability to modify and update the EDL. In addition, Users 2 and 3 may be collaborative users, but not editors, and although the system may allow Users 2 and 3 to view the changes being made to the EDL, the system may not allow Users 2 and 3 to modify the EDL. The system may allow Users 2 and 3, however, to utilize the Suggestions module and the TM module to participate in the editing process.

Figure 25:
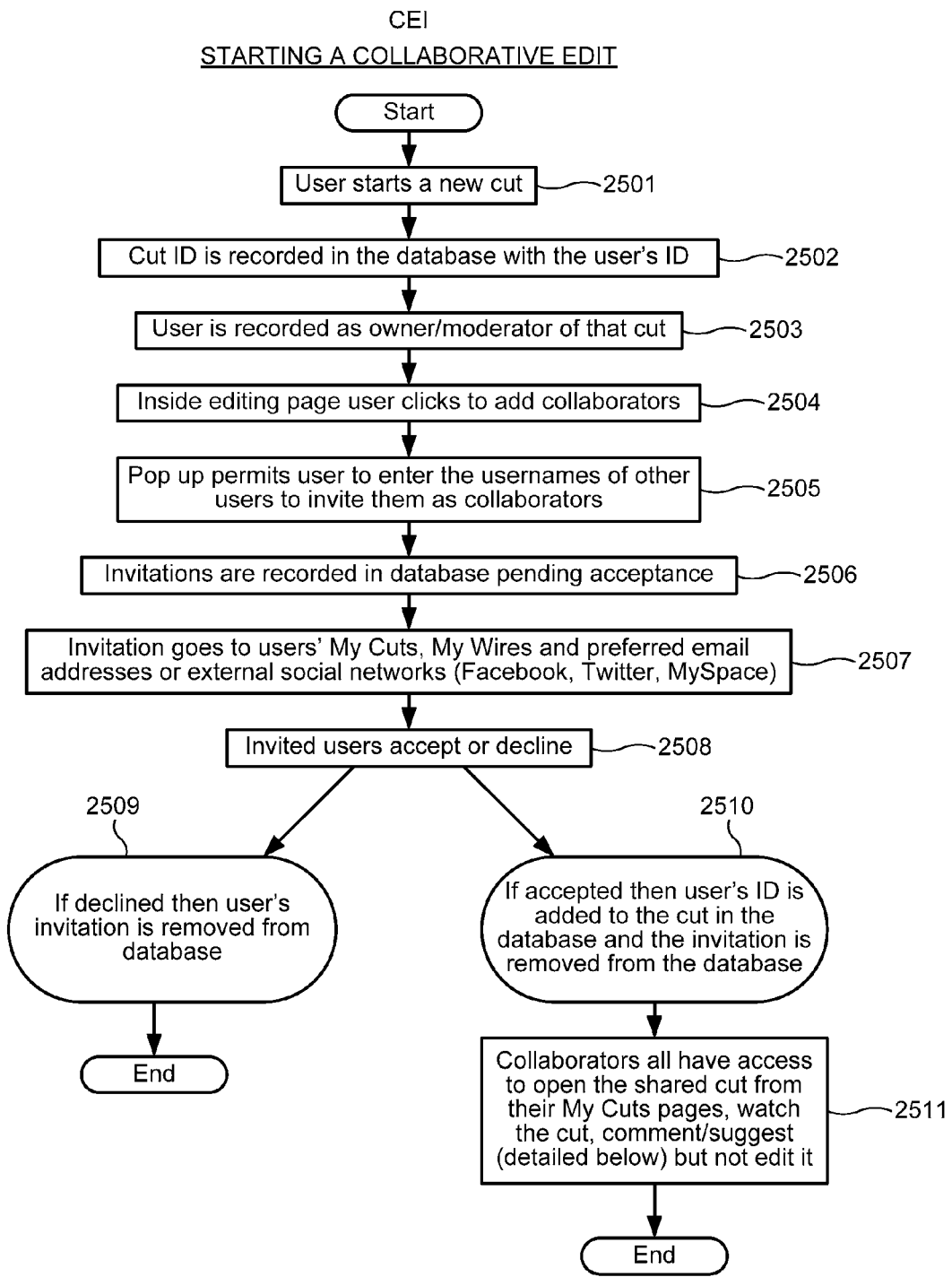
FIG. 25 illustrates a flowchart of how a collaborative edit may be initiated by a user, in accordance with an embodiment of the invention.

FIG. 25 illustrates a flowchart of how a collaborative edit may be initiated by a user. In step 2501, the user may begin a new cut or edited video sequence. In step 2502, the cut ID may be recorded in a database table with the user's ID (User 1). Each cut ID may be associated with a moderator ID (or a user ID which is the ID of the user who created the cut) in step 2503. In step 2504, the system may enable a user (User 1) to add collaborators to join the user in the editing "room" or in the editing process. In step 2505, a pop-up may be displayed on the invited-users' screens (Users 2 and 3) to invite them as collaborators in the editing process. In step 2506, the invitations may be recorded in a database table as pending acceptance. In step 2507, the invitations may be propagated to the users' various contact points, various pages within the interface such as a "My Cuts" or "My Wires" page, preferred email addresses or external social networks such as Facebook, Twitter or MySpace. In step 2508, the invited users may be displayed options to accept or decline the invitations. If the invited user declines the invitation, then in step 2509 the database entry for the user's invitation may be removed from the database. If the invited user accepts the invitation, then in step 2510 the invited user's ID may be added to a database table to indicate that the user is a collaborator, and the invitation may be removed from the database, and in step 2511 collaborators may all have access to open the shared cut from their "My Cuts" pages, watch the cut, make comments or suggestions but not edit the cut. Collaborators may be either collaborators who have permissions to edit, or they may be collaborators who only have permissions to view and provide suggestions or comments.

Figure 26:
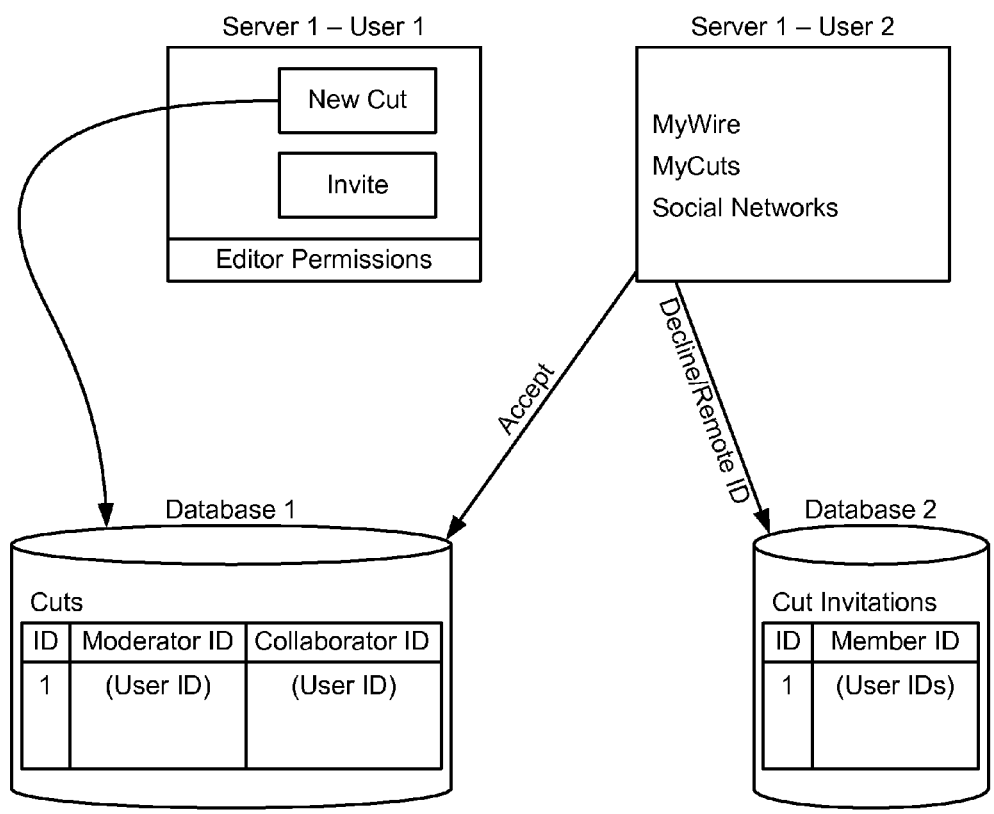
FIG. 26 illustrates changes to the database table which may be made when initiating a collaborative edit, in accordance with an embodiment of the invention.

FIG. 26 illustrates changes to the database table which may be made when initiating a collaborative edit. In FIG. 26, the system may enable User 1 to start a new cut. The Cut ID "1" may be recorded in Database 1, along with the user's ID. If User 1 starts the new cut, then User 1 is the moderator of the cut. The system may also enable User 1 to invite others to participate in the collaboration, or add other users as collaborators of the cut. For example, the system may enable User 1 to invite User 2 to be a collaborator. The invitation may be recorded in Database 2, as pending acceptance, along with the Cut ID for the particular cut that User 2 has been invited to participate in the editing of. The invitation may be displayed for User 2's viewing, and the invitation may be sent to User 2's internal system pages such as a MyWire and MyCuts page, or to external social networks such as the user's Facebook, Twitter, or MySpace accounts. The system may then give User 2 options to either accept the invitation or decline the invitation. If User 2's invitation is declined, then the invitation entry is removed from Database 2. If User 2's invitation is accepted, then User 2's ID is added to the cut in Database 1 as a Collaborator ID, and then the invitation is removed from the database. Thus, the system may designate User 2 as a collaborator to the cut, who has access to open the shared cut from the MyCuts page, watch the cut, view the edits that are being made to the EDL of the cut, and comment and make suggestions for the cut, but not to edit the cut. User 1 may have editing promoting capabilities, which are described further below.

Figure 27:
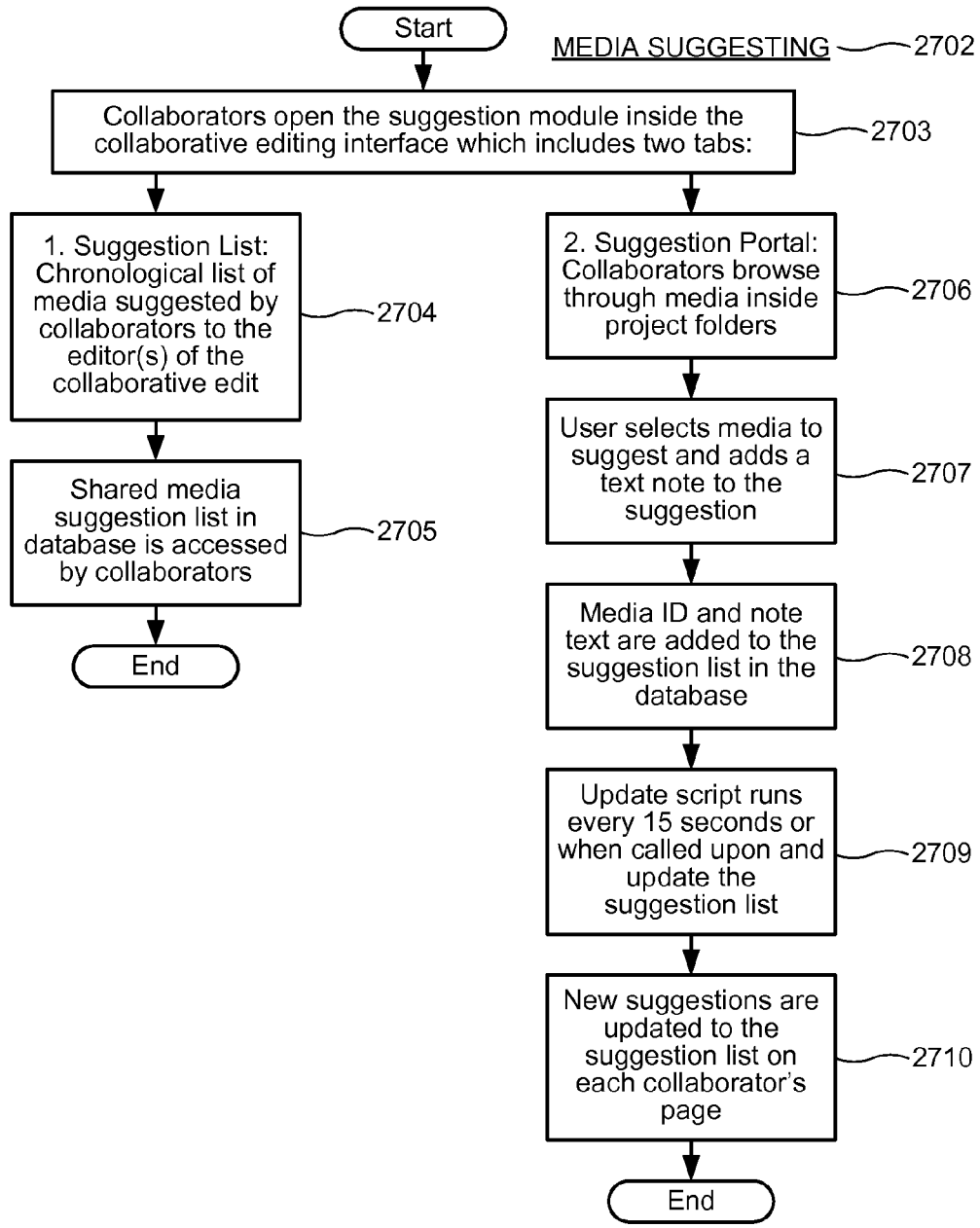
FIG. 27 illustrates a flowchart of the commenting and media suggesting processes by users of a collaborative editing interface, in accordance with an embodiment of the invention.

Referring to FIG. 27, users who accept their invitations as collaborators may make comments about the editing that is currently happening inside an instant messaging (IM) type chat interface, which may include all of the collaborators who are currently participating in the editing of the cut. The IM group chat may facilitate communication among the editors. Each user may have the ability to access the IM group chat interface, which may be a pop-up or a widget within the user's editing page, and the collaborators may transmit messages back and forth or to the group as a whole. The instant messages may be stored in a database table, which may record the IM ID, the time that the message is sent, the user ID of the user that sent the message, and the text of the message.

As shown in FIG. 27, in 2701, users who accept their invitations as collaborators may participate in commenting, which may occur inside the collaborative editing interface as an IM group chat. The IM group chat may include all collaborators currently participating in the editing of the cut. Thus, the IM group chat allows collaborators to communicate simultaneously while collaborating in the editing process. Users who accept their invitations as collaborators may also participate in media suggesting, in 2702. In step 2703, the interface allows collaborators to open a suggestion module inside the collaborative editing interface which may include two tabs. In step 2704, under the first tab "Suggestion List," a chronological list of media suggested by the collaborators to the collaborative editor(s) of the collaborative edit is displayed. The suggestion list then is a display for all of the collaborators of past suggestions, including such information as the time the suggestion was made, the user who made the suggestion, the media/video suggested, or the text of the suggestion. In addition, the suggestion list may show any comments that were made regarding the suggestion. For example, the interface may allow a user to make a suggestion of a certain media file with the text "hey Jim, I think this footage would be great for the sequence you're cutting right now." The system may enable another user to respond to the suggestion, or make a comment, such as "I second that idea." In step 2705, the shared media suggestion list in the database may be accessed by the collaborators.

In step 2706, under the second tab "Suggestion Portal," the collaborators may browse through media inside the project folders. Within the Suggestion Portal, collaborators may select various media files, and add them to suggestion lists. In step 2707, the system allows a user to select media to suggest and add a text note to the suggestion. In step 2708, the media ID of the selected media and the note text may be added to the suggestion list in the database. In step 2709, an update script may run every 15 seconds or when called upon to update the suggestion list. In step 2710, new suggestions may be updated to the suggestion list on each collaborator's page. Thus, the Suggestion Portal may serve as a way for a user to make new suggestions by browsing media within a project and submit it as a suggestion, or perform searches on media to find media to submit as a suggestion.

Figure 28:
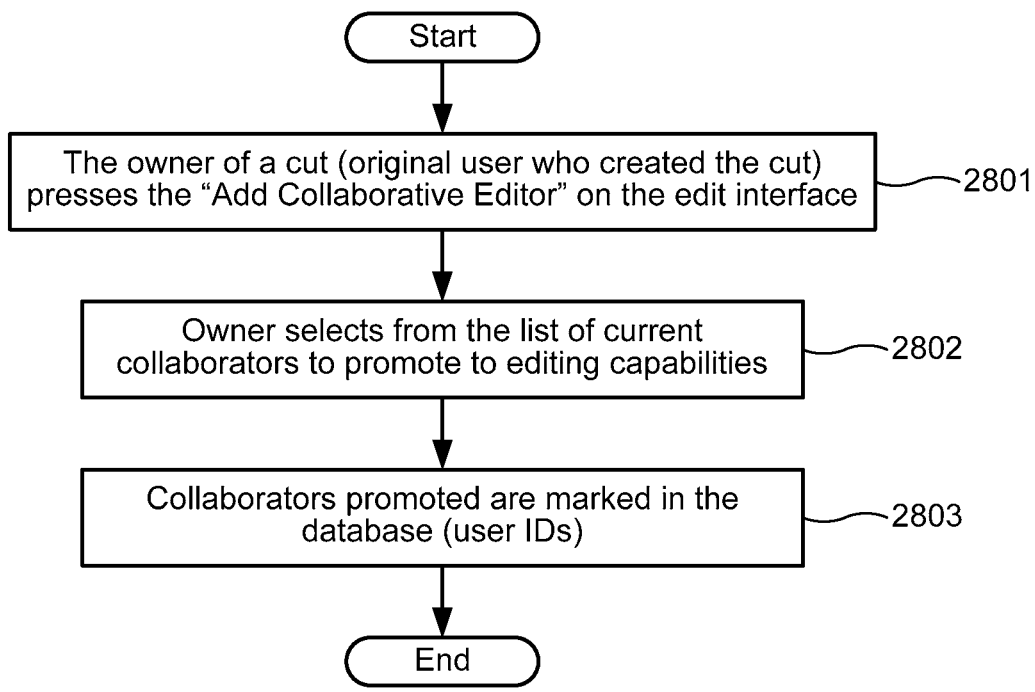
FIG. 28 illustrates a flowchart of how a user may be promoted to be a collaborative editor, in accordance with an embodiment of the invention.

FIG. 28 illustrates a flowchart of how a user may be promoted to be a collaborative editor, in accordance to an embodiment of the invention. The system allows a user who has started a new cut on the system, or the owner of a cut, to press the "Add Collaborative Editor" button on the collaborative editing interface in step 2801. The system then provides the user an option to select from the current list of collaborators to promote certain users to have editing capabilities in step 2802. The users that have been selected may then be marked in the database as having editing capabilities, and thus are promoted to collaborative editors in step 2803.

Figure 29:
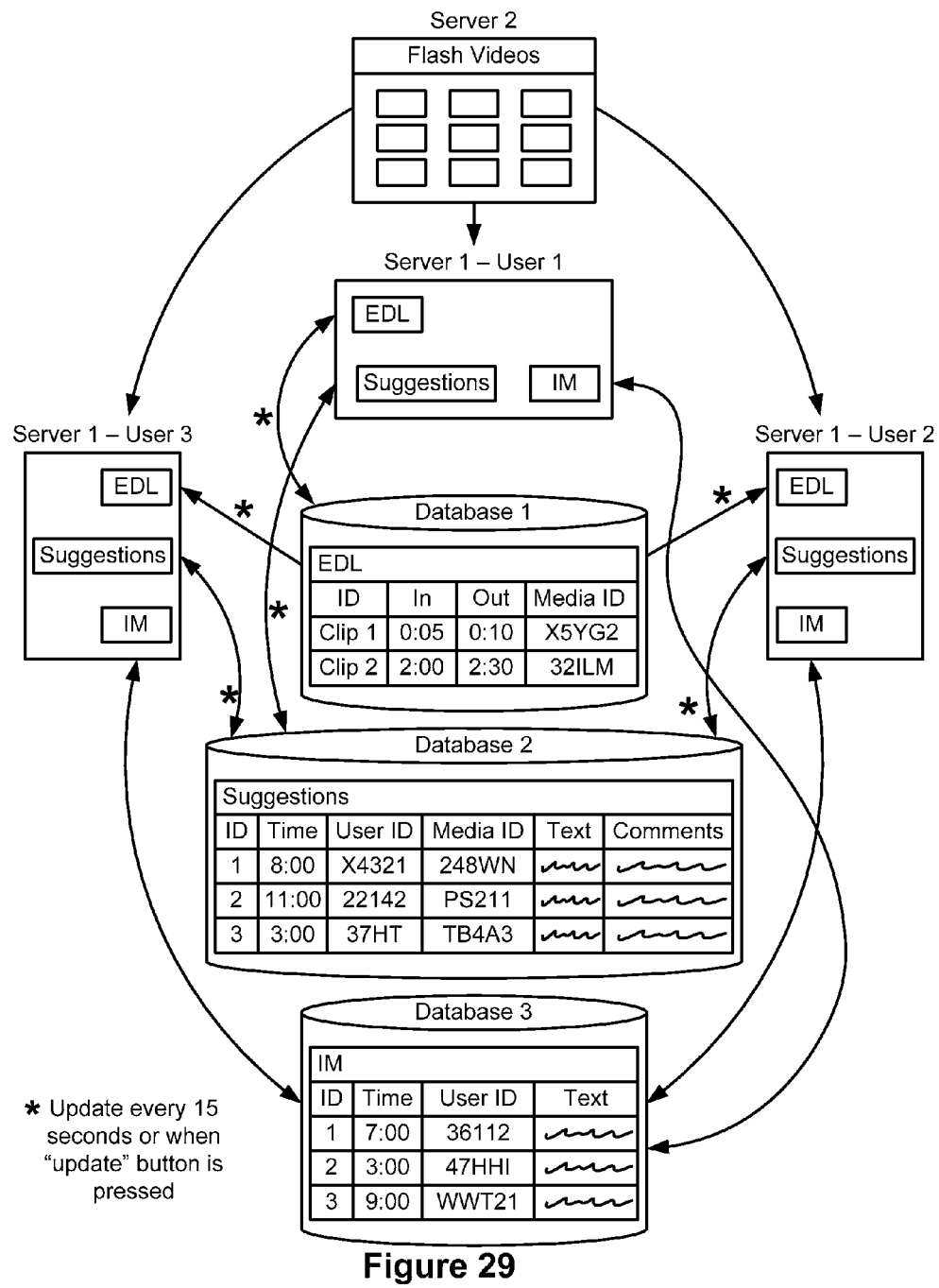
FIG. 29 shows an example of an architecture of the system in which User 1 is the initial owner of the cut, and also the user who is moderating the collaborative edit, while Users 2 and 3 are collaborators, in accordance with an embodiment of the invention.

FIG. 29 shows an example of an architecture of the system in which user 1 is the initial owner of the cut, and also the user who is moderating the collaborative edit, while Users 2 and 3 are collaborators. Users 2 and 3 are collaborators participating in the collaboration by viewing suggestions made on the Suggestion list, making new suggestions via the Suggestion Module, and participating in an IM group chat with the other collaborators. User 1 is making edits to the EDL on server 1, which updates the EDL table in Database 1. The system also displays and allows User 1 to make updates to the Suggestions table on Database 2, and also allows User 1 to participate in the group chat and make updates to the IM table on Database 3. The system displays to Users 2 and 3 the edits being made by user 1 to the EDL table on Database 1, but does not allow Users 2 and 3 to make edits or updates to the EDL table on Database 1. The system allows Users 2 and 3 to make updates to the Suggestions table on Database 2 and the IM table on Database 3. Each user's view of the EDL, Suggestion list, and IM group chat module may be updated periodically, such as every 15 seconds, or alternatively, when a button, such as an "update" button is pressed.

Figure 30:
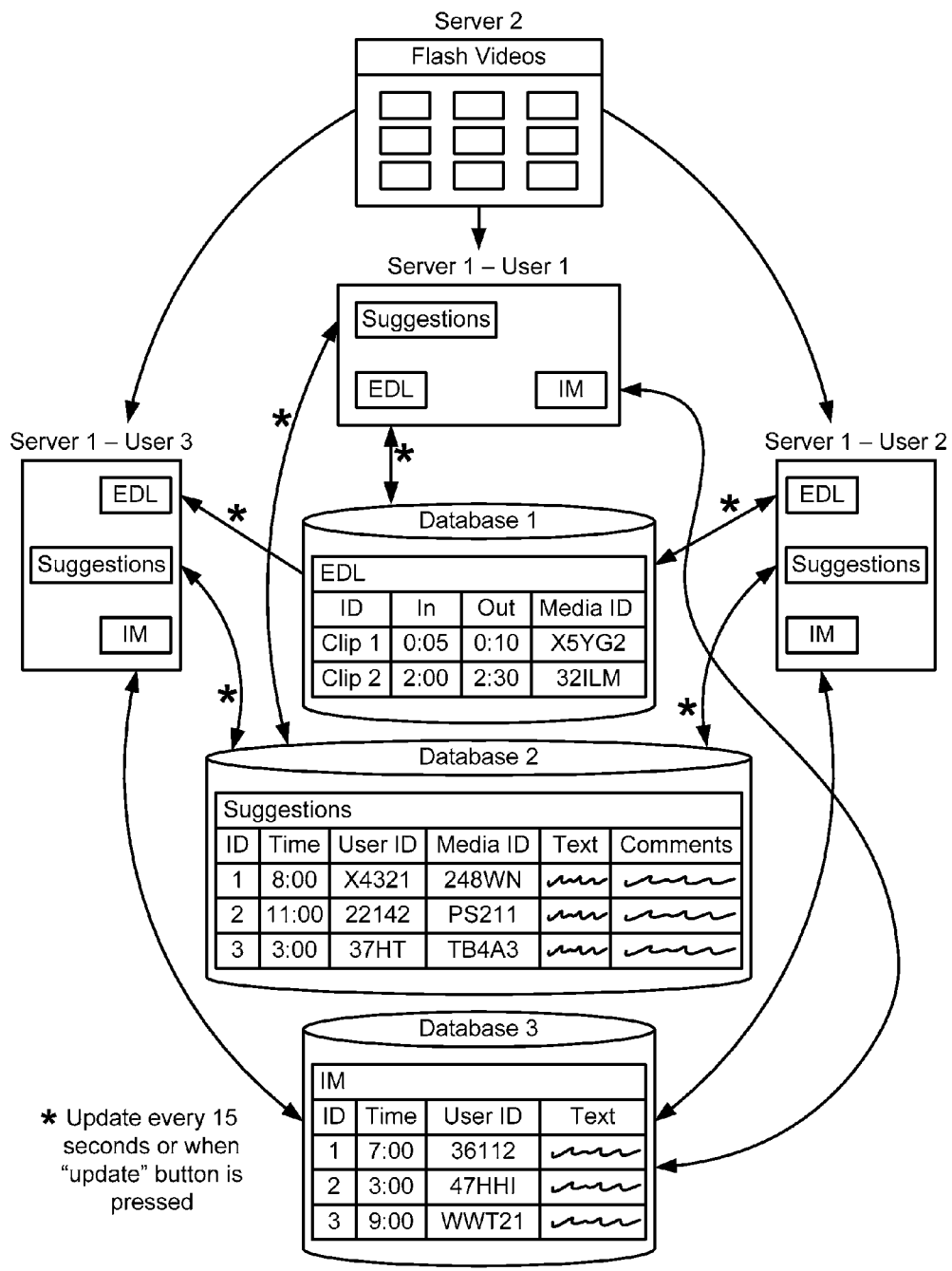
FIG. 30 shows an example of an architecture of the system in which User 1 is the initial owner of the cut, and also the user who is moderating the collaborative edit, User 2 is a collaborative editors, and User 3 is a collaborator with no editing permissions, in accordance with an embodiment of the invention.

FIG. 30 shows an example of an architecture of the system in which User 1 is the initial (or original) owner of the cut and an editor, and also the user who is moderating the collaborative edit, User 2 is a collaborative editor, and User 3 is a collaborator with no editing permissions. The system allows Users 1, 2 and 3 to each participate in the collaboration by displaying to each user suggestions made on the Suggestion list, and allowing each user to make new suggestions via the Suggestion Module and participate in an TM group chat with the other collaborators. Only Users 1 and 2, however, may make edits to the EDL on server 1, which updates the EDL table in Database 1.

Figure 31:
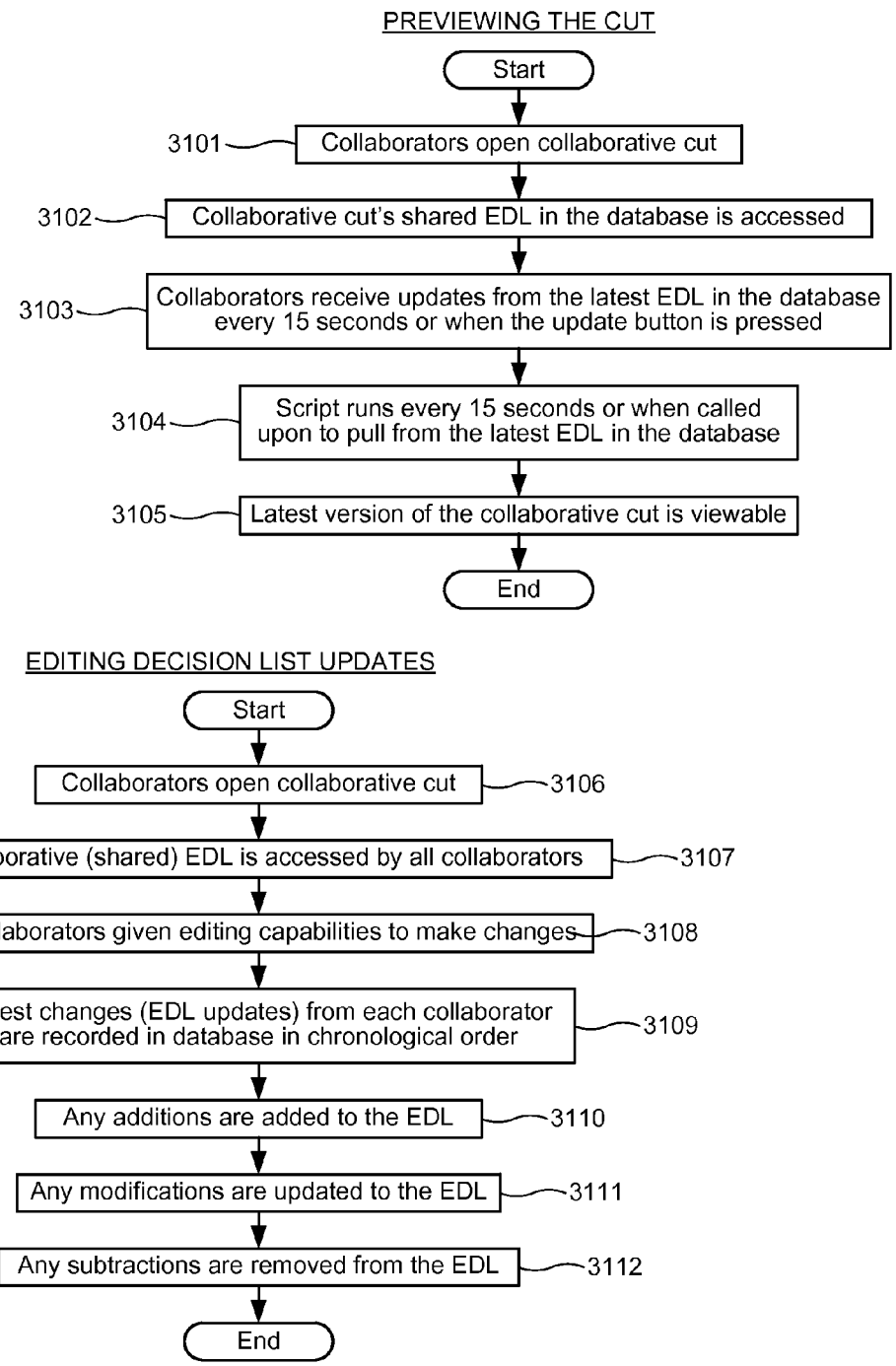
FIG. 31 illustrates a flowchart for how collaborators may view the progress of the collaboration and preview the cut, and a flow chart for how collaborators make view the progress of the collaboration by viewing the editing decision list (EDL) updates, in accordance with an embodiment of the invention.

While using the collaborative editing interface, the system displays to each user the progress of the collaboration by displaying the combined edited video at any time, at the user's option, with the most recent updates. FIG. 31 illustrates a flowchart for how the system allows collaborators to view the progress of the collaboration and preview the cut. In step 3101, the system allows collaborators to open the collaborative cut. In step 3102, the collaborative cut's shared EDL in the database may be accessed. In step 3103, the system sends to the collaborators updates from the most recent EDL in the database periodically, such as every 15 seconds, or when an update button is pressed. In step 3104, a script may run every 15 seconds or when called upon to pull the latest EDL from the database. In step 3105, the latest version of the collaborative cut may be displayed to the users.

In addition, while using the collaborative editing interface, the system may enable each user to view the revised EDL, or make edits to the EDL, depending on each user's permissions. FIG. 31 illustrates a flow chart for how the system allows collaborators to view the progress of the collaboration by viewing the editing decision list (EDL) updates. In step 3106, the system allows each of the collaborators to open the collaborative cut. In step 3107, the system grants access to the collaborative or shared EDL to all of the collaborators who have been invited to participate in the collaboration. In step 3108, some collaborators may be given editing capabilities to make changes to the EDL, the process of which is shown with reference to FIG. 27. In step 3109, the latest changes or updates to the EDL from each collaborator may be recorded in the database in the chronological order that they are made. In step 3110, a user's additions may be added to the EDL; in step 3111, a user's modifications may be made to the EDL; and in step 3112, a user's subtractions may be removed from the EDL.

Figure 32:
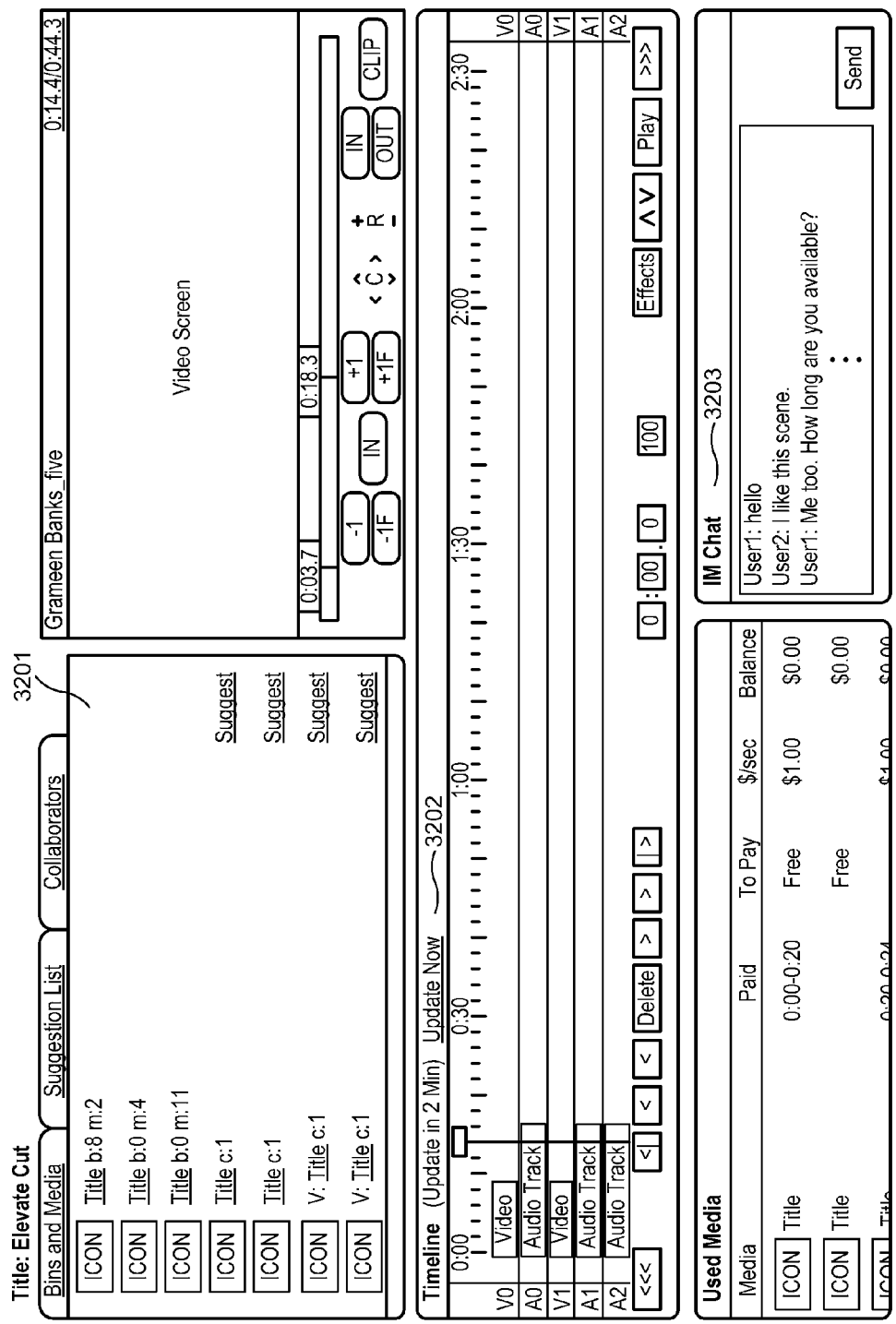
FIG. 32 illustrates a screenshot of a user's view and interaction with a collaborative editing interface, in accordance with an embodiment of the invention.

FIG. 32 illustrates a screenshot of a user's view and interaction with a collaborative editing interface. As shown in FIG. 32, in module 3201, the system allows a user to browse the bins and media for media to include in the EDL or to make suggestions to the EDL. The system also displays the timeline in module 3202, and displays edits to the EDL in real-time to various users. The system also facilitates group chats via an IM Chat in module 3203, amongst the collaborators who are participating in the collaborative editing process.

Figure 33:
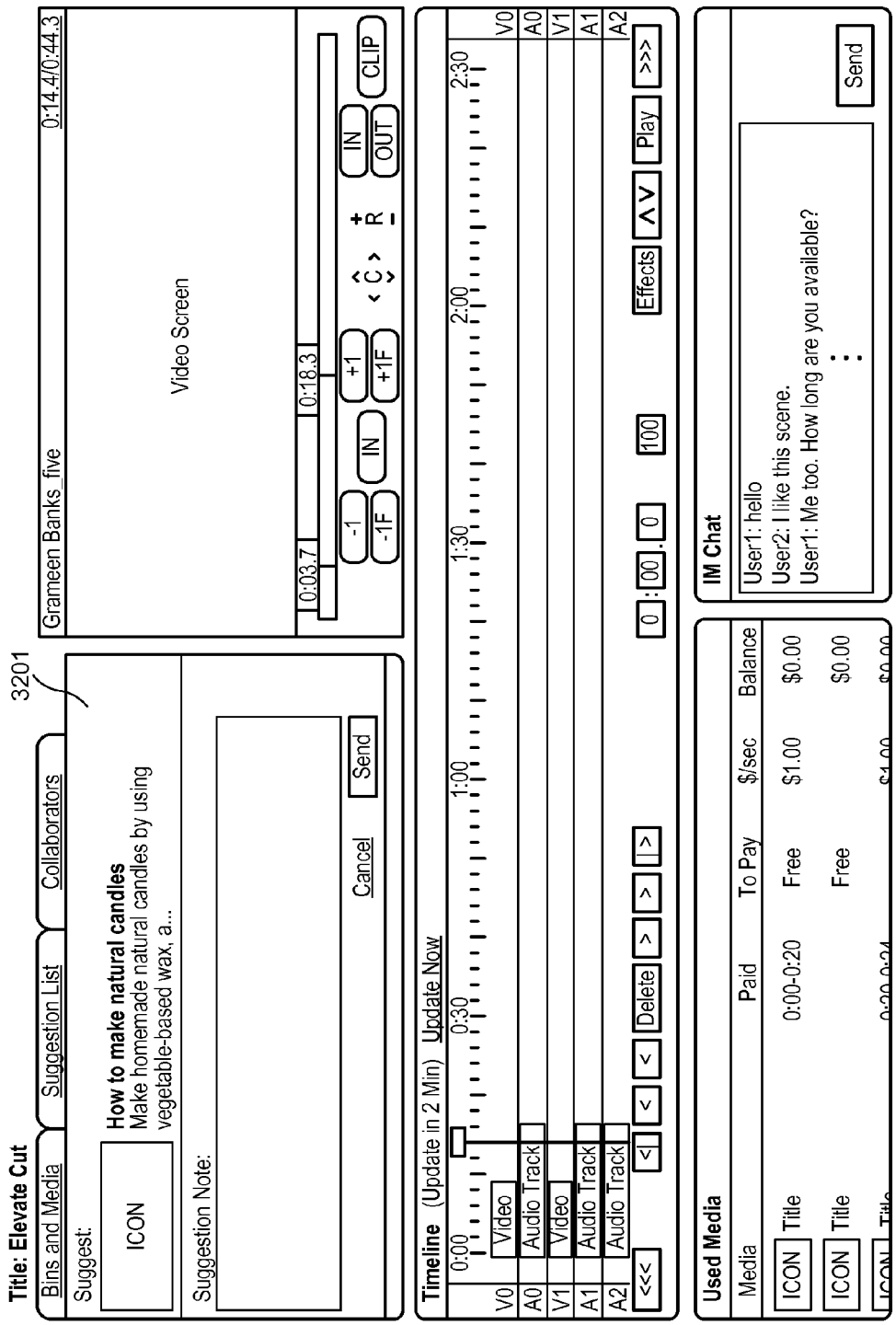
FIG. 33 illustrates a screenshot of the user's view of the suggestion page after selecting a media file to suggest and clicking on the "suggest" link, in accordance with an embodiment of the invention.

The system allows a user to browse folders (or bins) and media within each folder, and also allows a user to make suggestions to the moderator or other collaborative editors. The system may receive an input from the user for which media file the user desires to suggest and input via the user's click on a "suggest" link. FIG. 33 illustrates a screenshot of the user's view of the suggestion module (a close-up view of module 3201 from FIG. 32) after selecting a media file to suggest and clicking on the "suggest" link. The system may receive input from the user on which media to suggest, and also the note for the suggestion, which will be added to the "suggestion list."

Figure 34:
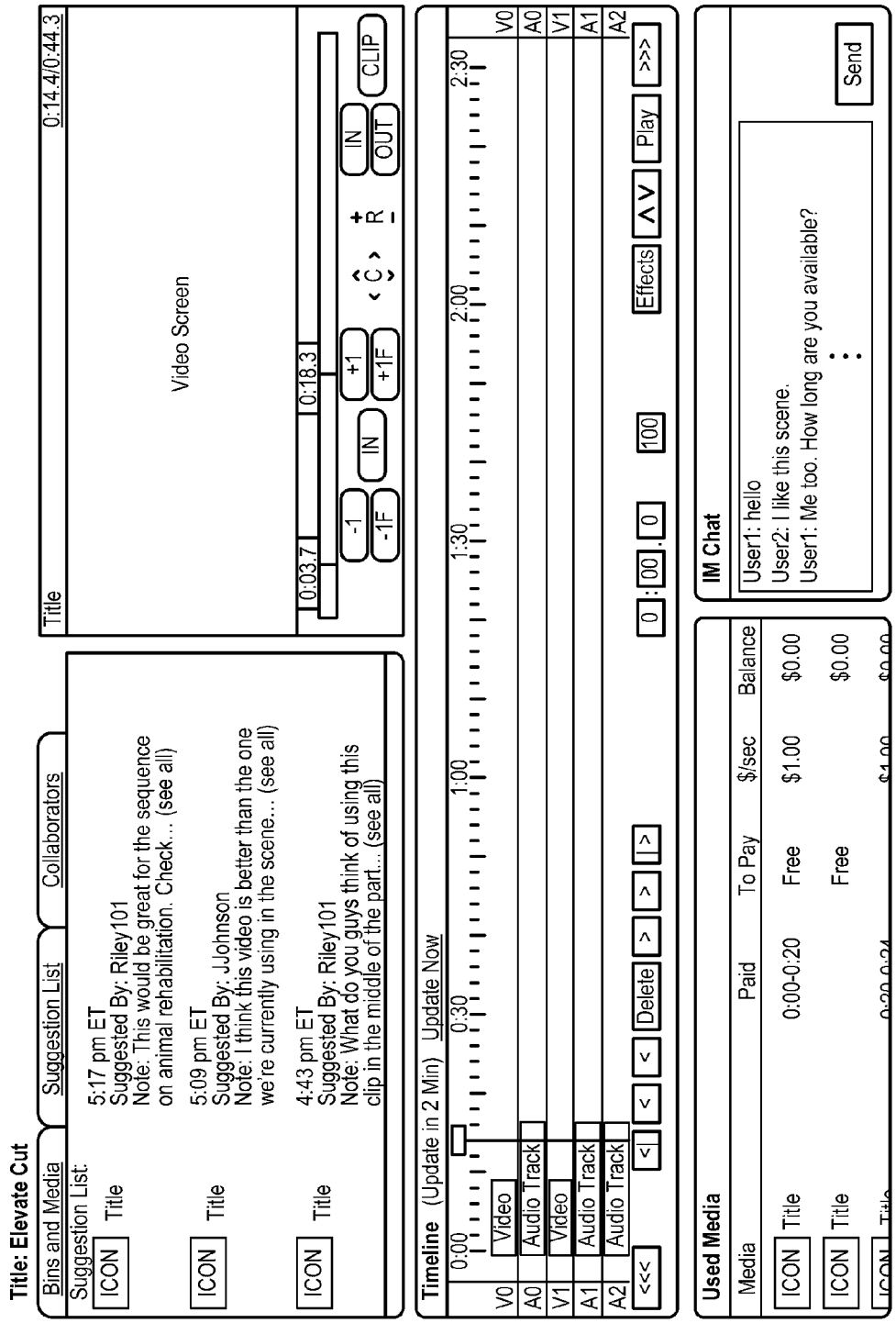
FIG. 34 illustrates a screenshot of a user's view and interaction with the suggestion list within the collaborative editing interface, in accordance with an embodiment of the invention.

FIG. 34 illustrates a screenshot of a user's view and interaction with the suggestion list (another close-up view of module 3201 from FIG. 32) within the collaborative editing interface. As shown in FIG. 34, the time that the suggestion is sent by users may be shown, as well as the user that made the suggestion, the title and perhaps a thumbnail of the media file suggested, along with the user's note accompanying the suggestion. These suggestions may be displayed real-time and collaborative editors may take these suggestions into account when adding to, deleting from, or otherwise modifying the EDL.

As shown by the above discussion, functions relating to the systems and methods for content aggregation, editing and delivery may be implemented on computers connected for data communication via the components of a packet data network, as described above. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. metadata used in editing. The software code may be executable by the general-purpose computer, for example, that functions as the storage server or proxy server described above, and/or that functions as a user's terminal device. In operation, the code may be stored within the general-purpose computer platform. At other times, the software may be stored at other locations and/or transported for loading into the appropriate general-purpose computer system. Execution of such code by a processor of the computer platform may enable the platform to implement the methodology, in the manner performed in the implementations discussed and illustrated herein.

Figure 35:
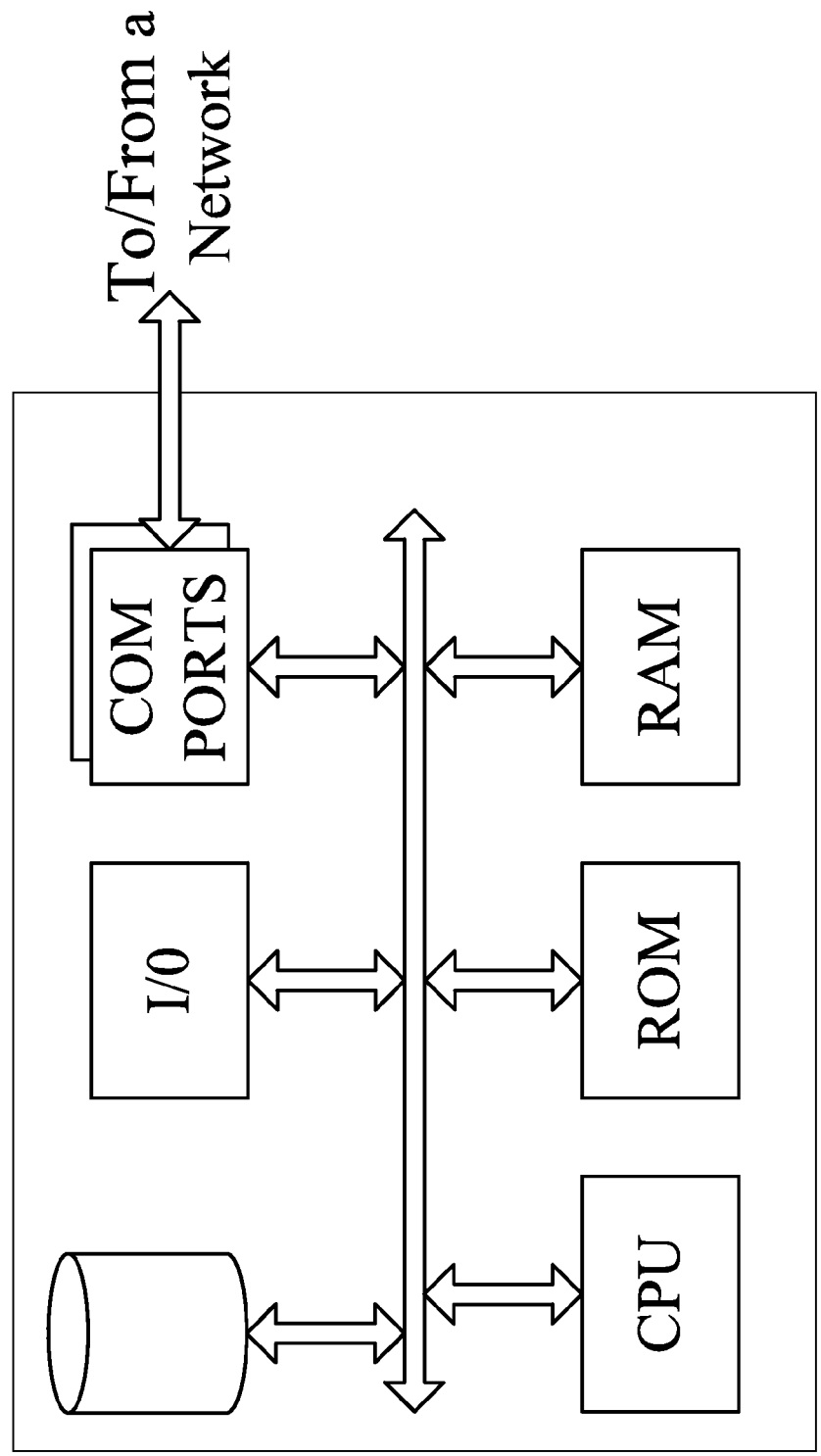
FIG. 35 is a simplified functional block diagram of a computer that may be configured as a host or server, for example, to function as server 1, server 2, and/or server 3 in the system of FIG. 1B, although other architectures may also be implemented.
Figure 36:
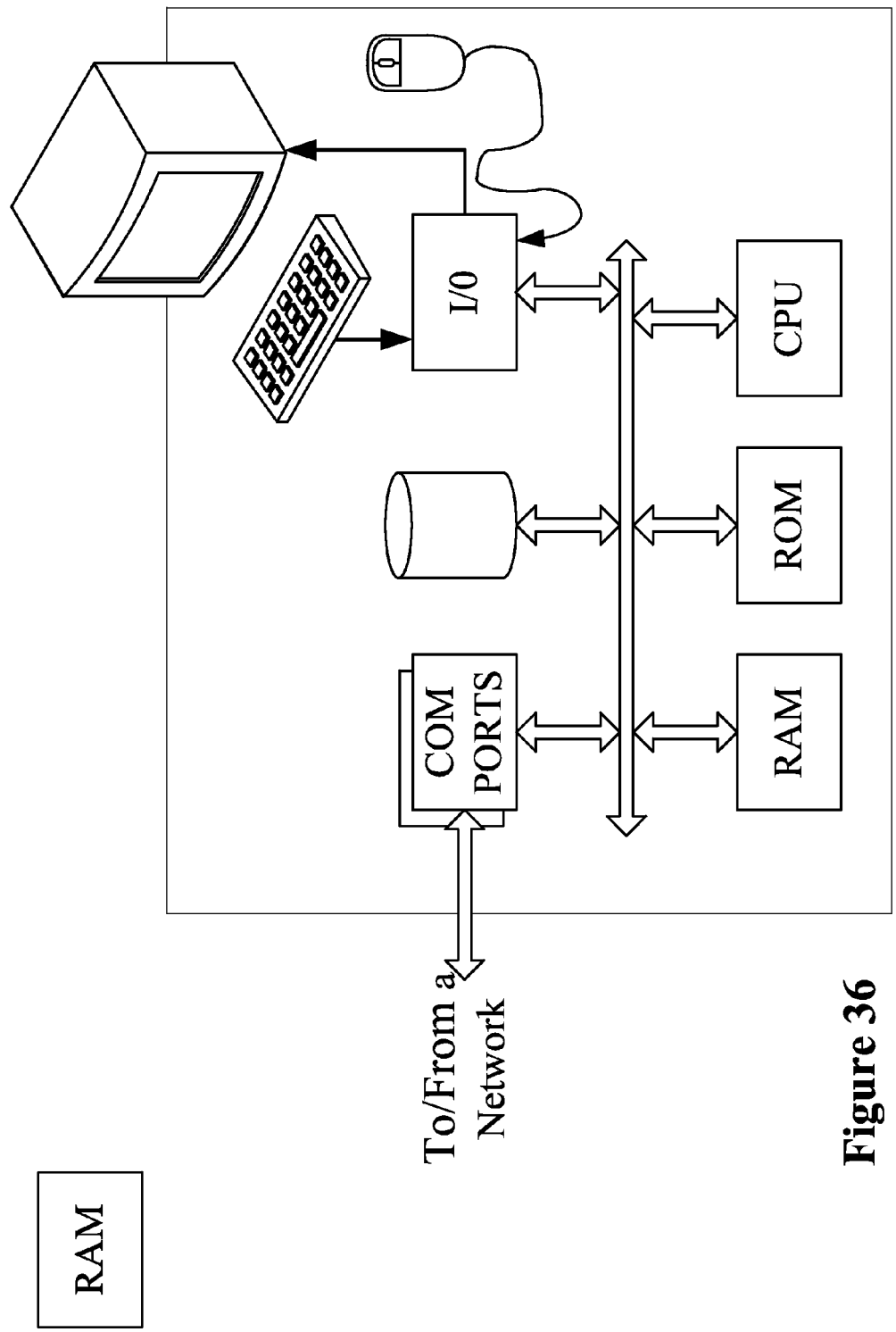
FIG. 36 is a simplified functional block diagram of a personal computer or other work station or terminal device.

FIGS. 35 and 36 provide examples of functional block diagram illustrations of general purpose computer hardware platforms. FIG. 35 illustrates an example of a network or host computer platform, as may be used to implement a server. FIG. 36 depicts a computer with user interface elements, as may be used to implement a personal computer or other type of work station or terminal device, although the computer of FIG. 36 may also act as a server if appropriately programmed. It is believed that those skilled in the art are familiar with the structure, programming and general operation of such computer equipment and as a result the drawings should be self-explanatory.

A server, for example, may include a data communication interface for packet data communication. The server may also include a central processing unit (CPU), in the form of one or more processors, for executing program instructions. The server platform may include an internal communication bus, program storage and data storage for various data files to be processed and/or communicated by the server, although the server may receive programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods outlined above may be embodied in programming. Program aspects of the technology may be thought of as "products" or "articles of manufacture" typically in the form of executable code and/or associated data that is carried on or embodied in a type of machine readable medium. "Storage" type media may include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Various embodiments as discussed above and as discussed below are possible.

In one embodiment, a method of editing high resolution video over a computer network may include: steps of storing high resolution footage on a first computer database, the first computer database coupled to a first computer system, the high resolution footage including video images of physical objects; creating lower resolution footage from the high resolution footage, the lower resolution footage having a lower resolution and using less storage than the high resolution footage; storing the lower resolution footage in a second computer database, the second computer database coupled to the first computer system; accessing the lower resolution footage in the second computer database and transmitting over a network video from the first computer system to a remote computer system based on the lower resolution footage, the remote computer system being remote to the first computer system and coupled to the first computer system over the network; prompting for editing commands from the remote computer system; receiving at the first computer system editing commands from the remote computer system over the network, the editing commands with respect to the lower resolution footage displayed on the remote computer system; storing modifications to the lower resolution footage based on the received editing commands from the remote computer system; receiving a selection of an export format; generating an edited video in the selected export format from the high resolution footage based on the modifications stored based on the received editing commands from the remote computer system; and exporting the edited video in the selected export format to a recipient computer system remote to the first computer system. In one embodiment, the selected export format is a standard and institutional format for an online, commercial or broadcast medium. In one embodiment, the modifications are stored as metadata. In one embodiment, the first computer database and second computer database are contained in a common computer database. In one embodiment, the lower resolution footage has at least one of: a lower resolution to a degree of at least 1% less, smaller frame size, lower frame rate, and a more compressed media codec/format. In one embodiment, the lower resolution footage is in flash video format with a lower data rate or mp4 video format. In one embodiment, the first computer system is on a content distribution network (CDN). In one embodiment, the received editing commands include one or more of: commands for applying effects to the edited video, an indication of a layer order of the video, an indication of volume level of the video, and identification of an order of the video. In one embodiment, the received editing commands include in and out points of video. In one embodiment, the edited video includes a plurality of high resolution footage combined into a single media product stored on a computer-readable medium. In one embodiment, the stored modifications include an edit decision list (EDL).

In one embodiment, a method of editing high resolution video over a computer network may include steps of: storing high resolution footage on a computer database, the computer database coupled to a first computer system; creating lower resolution footage from the high resolution footage, the lower resolution footage having a lower resolution and using less storage than the high resolution footage; storing the lower resolution footage in the computer database; receiving at the first computer system editing commands from a remote computer system; storing in metadata modifications to the lower resolution footage based on the received editing commands from the remote computer system; generating an edited video in high resolution from the high resolution footage based on the metadata stored based on the received editing commands from the remote computer system; and transmitting the edited video in high resolution to a recipient computer system remote to the first computer system. In one embodiment, the method also includes a step of receiving high resolution footage including images of physical objects captured by a user to be stored on the computer database, the high resolution footage including images of physical objects identified by a unique identifier, a title, a description and at least one keyword. In one embodiment, the method also includes a step of organizing the high resolution footage received from users into categories provided by the users. In one embodiment, the method also includes a step of organizing the high resolution footage received from users by projects. In one embodiment, the method also includes a step of organizing the high resolution footage received from users by studios.

In one embodiment, a system for editing high resolution video over a computer network may include: a first computer database, the first computer database including storage for high resolution video footage; a second computer database, the second computer database including storage for lower resolution video footage created from the high resolution video footage, the lower resolution video footage having a lower resolution and using less storage than the high resolution video footage; a first computer system coupled to the first computer database and the second computer database, the first computer system including a resource that accesses a network including communicating with a remote computer system; and a resource for: receiving editing commands from the remote computer system, the editing commands with respect to the lower resolution footage displayed on the remote computer system; storing modifications to the lower resolution footage based on the received editing commands from the remote computer system; generating an edited video in high resolution from the high resolution footage based on the modifications stored based on the received editing commands from the remote computer system; and transmitting the edited video in high resolution to a recipient computer system remote to the first computer system. In one embodiment, the resources comprise computer software. In one embodiment, the resources comprise electronic circuits. In one embodiment, the resources comprise computer software and electronic circuits. In one embodiment, the second computer database includes a content distribution network, the content distribution network being a network of servers for media distribution. In one embodiment, the system also includes: a network of application servers, at least one of the application servers including the resource for editing, storing, generating or transmitting the edited video; a network of storage servers including the first and second computer databases; a mail server for accepting email uploads from cell phones; a master and slave database on servers for storing modifications; and a content distribution network of servers for viewing the video footage. In one embodiment, the network of storage servers are distributed over an Internet or a local network. In one embodiment, the master and slave database resides on the application servers.

In one embodiment, a distributed editing system may include: a plurality of distributed video cameras for capturing images of physical objects; a plurality of distributed user computers having interfaces to a distributed network of remote computers; a system coupled to a computer network for communication with the user computers, the system including: logic to receive video submissions from user computers over the distributed network associated with a plurality of users; a first resource for storing the video submissions on a storage server for storing video files received from remote computer systems associated with a plurality of users, wherein the video files are recorded on the video cameras operated by the plurality of users; a second resource for storing copies of the video submissions on a proxy server; a resource for converting the video submissions for storage on the proxy server; a data organization structure including a mechanism for publishing sets of folders configurable based on input from a user for video files received from remote computer systems associated with the plurality of users; an editing module for receiving edit commands from the user and applying the edit commands comprising: a database for storing the edit commands, wherein the edit commands include combining portions of video submissions from various folders; a mechanism for displaying the application of the edit commands using the video files stored on the proxy server; and a module for applying the edit commands to the video files stored on the storage server for creating an edited video product; and a module for exporting the edited video product, wherein the edited video product is in a high resolution format.

In one embodiment, an article of manufacture may include: a computer readable storage medium; and programmable instructions embodied in said medium for execution by at least one computer, wherein execution causes said at least one computer to perform functions comprising: storing high resolution footage on a first computer database, the first computer database coupled to a first computer system, the high resolution footage including video images of physical objects; creating lower resolution footage from the high resolution footage, the lower resolution footage having a lower resolution and using less storage than the high resolution footage; storing the lower resolution footage in a second computer database, the second computer database coupled to the first computer system; accessing the lower resolution footage in the second computer database and transmitting over a network video from the first computer system to a remote computer system based on the lower resolution footage, the remote computer system being remote to the first computer system and coupled to the first computer system over the network; prompting for editing commands from the remote computer system; receiving at the first computer system editing commands from the remote computer system over the network, the editing commands with respect to the lower resolution footage displayed on the remote computer system; storing modifications to the lower resolution footage based on the received editing commands from the remote computer system; receiving a selection of an export format; generating an edited video in the selected export format from the high resolution footage based on the modifications stored based on the received editing commands from the remote computer system; and exporting the edited video in the selected export format to a recipient computer system remote to the first computer system. In one embodiment, the computer readable storage medium comprises a non-transitory computer readable disk.

In one embodiment, an electronic video system may include: an interface to a network; logic to receive video submissions from remote users over the computer network; a first resource for storing the video submissions; a second resource for storing copies of the video submissions; a resource for organizing submissions into categories provided by users; and a resource for recording edits to the video submissions.

In one embodiment, an electronic media system may include: an interface to a distributed network of remote computers; logic that receives media submissions from remote computer systems associated with a plurality of users; a storage server for storing media received from the remote computer systems associated with the plurality of users, wherein the media is recorded on a plurality of media recording devices operated by the plurality of users; a proxy server that stores copies of the media submissions; a resource that converts the media submissions for storage on the proxy server; a data organization structure including a mechanism for publishing sets of folders, the sets of folders configurable based on input from a user for media received from remote computer systems associated with the plurality of users; an editing module that receives edit commands from the user and applies the edit commands to the media comprising: a database that stores the edit commands, wherein the edit commands include combining portions of media submissions from various folders; a mechanism that displays the application of the edit commands using the media stored on the proxy server; and a module for applying the edit commands to the media stored on the storage server and creates an edited media product; and a module for exporting the edited media product, wherein the edited media product is in a high resolution format.

In one embodiment, an electronic media system may include: an interface to a distributed network of remote computers; logic that receives media submissions from remote computer systems associated with a plurality of users; a storage server for storing video files received from the remote computer systems associated with the plurality of users, wherein the video files are recorded on a plurality of recording devices operated by the plurality of users; a proxy server that stores copies of the media submissions; a resource for converting the video submissions for storage on the proxy server; a data organization structure including a mechanism for publishing sets of folders, the sets of folders configurable based on input from a user for video files received from remote computer systems associated with the plurality of users; an editing module that receives edit commands from the user and applies the edit commands comprising: a database that stores the edit commands, wherein the edit commands include combining portions of video submissions from various folders; a mechanism that displays the application of the edit commands using the video files stored on the proxy server; and a module for applying the edit commands to the video files stored on the storage server and creates an edited video product; and a module for exporting the edited video product, wherein the edited video product is in a high resolution format.

In one embodiment, an electronic media system may include: an interface to a distributed network of remote computers; logic to receive media submissions from remote computer systems over the distributed network associated with a plurality of users; a first server for storing the media submissions on a storage server including at least a processor, a network interface and a data storage for storing media received from remote computer systems associated with the plurality of users, wherein the media is recorded on a plurality of media recording devices operated by the plurality of users; a proxy server including at least a processor, a network interface and a data storage, the proxy server storing copies of the media submissions; a resource for converting the media submissions for storage on the proxy server; a memory having a data organization structure stored hereon, the data organization structure including a mechanism for publishing sets of folders configurable based on input from a user for media received from remote computer systems associated with the plurality of users; an editing server having an editing module thereon, the editing module for receiving edit commands from the user and applying the edit commands to the media, the editing module comprising: a database for storing the edit commands, wherein the edit commands include commands to combine portions of media submissions from various folders; a mechanism for displaying the application of the edit commands using the media stored on the proxy server; and a module for applying the edit commands to the media stored on the storage server for creating an edited media product; and a module for exporting the edited media product, wherein the edited media product is in a high resolution format.

In one embodiment, an electronic media system may include: a module for receiving uploaded media submitted over a computer network from groups of distributed devices associated with groups of distributed users; a user interface module for providing separate accounts and access for various users among the groups of distributed users; a module for managing a set of different projects associated with different media products in progress associated with different groups of distributed users; and a module for providing a user a project interface for creating an edited media product based on submissions from other distributed users.

In one embodiment, a method for handling video may include steps of: submitting a request over a computer network for media submissions, the request including request for a set of different categories of media; receiving media in response to the request, including receiving designations of respective categories with which the media is associated; storing the received media in a high resolution format and associating various media with the respective categories; providing lower resolution copies of the media; receiving requests to edit the receive media; displaying results of the requests to edit using the lower resolution media; and providing a high resolution media product based on the received edits and the high resolution media.

In one embodiment, a method for receiving and processing video may include steps of: receiving, in a first computer system from a remotely located computer system associated with a user, input for creation of a set of electronic folders for organization of electronic video clips associated with a project, the project associated with production of at least a video including video of physical objects; generating the set of electronic folders for organization of electronic video clips associated with the project, the electronic folders for organizing video input from a plurality of remote computer systems to respective folders for organization of electronic video clips associated with the project; receiving video from at least some of the plurality of remote computer systems; providing an interface to allow for selection of subportions of received video for submission to respective folders for organization of electronic video clips associated with the project; receiving from a remote computer system a request to submit a selected subportion of the received video to a selected one of the respective folders for organization of electronic video clips associated with the project, and recording the selection in metadata; associating the selected subportion of the received video with the selected respective folder; receiving, in the first computer system from the remotely located computer system associated with the user of the video project, input for creating a combination of a plurality of received electronic video clips associated with the project, the combination to generate a video for the project; and generating the video for the project based on the input from the remotely located computer system associated with the user of the video project and a videos in the set of electronic folders for organization of electronic video clips associated with the project. In one embodiment, the method may include steps of: transmitting electronic data over a network for receipt at the remotely located computer system to display representations of the electronic folders; and transmitting electronic data over a network for receipt at the remotely located computer system to display the interface; and transmitting electronic data over the network, for receipt at the remotely located computer system to display a representation of the received video in the selected respective folder among the respective folders, the display showing a graphical relationship between the selected respective folder and the other respective folders for organization of electronic video clips associated with the project.

In one embodiment, a method for receiving and processing video may include: generating a set of electronic folders for organization of electronic video clips associated with a video project, the video project associated with production of at least a video including video of physical objects; receiving, in a first computer system from a remotely located computer system associated with a producer of the video project, a request to display, on a plurality of remote computer systems, a representation of the set of electronic folders for organization of electronic video clips associated with the video project, in order to solicit video input from the plurality of remote computer systems for respective folders for organization of electronic video clips associated with the video project; receiving video from at least some of the plurality of remote computer systems; and transmitting electronic data over a distributed computer network, for receipt at the remotely located computer system associated with the producer of the video project, the electronic data causing the remotely located computer system associated with the producer of the video project to display the representation of the received video in a selected respective folder among the respective folders for organization of electronic video clips, the representation showing a graphical relationship between the selected respective folder and the other respective folders for organization of electronic video clips associated with the video project. In one embodiment, the method may include automatically organizing video input received from users other than the producer of the video project into the respective folders. In one embodiment, the method may include setting a price on video submissions to the video project in cost per second paid for by a user when the video submissions are used. In one embodiment, the method may include providing a plurality of varying levels of permissions for users for access to the set of electronic folders. In one embodiment, the method may include providing a first level of user permission and a second level of user permission, wherein the second level of user permission includes rights of the first level of user permission and additional rights. In one embodiment, the second level of user permission includes at least one of: access to private folders, rights to create notes on electronic video clips, rights to place calls for footage, and rights to pay for media. In one embodiment, the second level of user permission includes rights to access private level folders attached to projects, create notes on electronic video clips submitted to the video project of which the second level user is an editor, create and delete folders, and place calls for footage, edit electronic video clips in the video project and export high-resolution copies of edited media for the video project. In one embodiment, the first level of user permission includes rights to participate in editing of media in the project if the project permits. In one embodiment, the first level of user permission includes rights to participate in projects managed by studios, rights to upload media to projects, rights to set prices for purchase of media, and rights to participate in editing of media in the project if the project permits. In one embodiment, the second level of user permission includes rights to access private level folders attached to projects, create notes on media submitted to a project of which the second level user is an editor, create and delete folders, and place calls for footage, edit media in a project and export high-resolution copies of edited media for the project. In one embodiment, the administrator rights include the rights to modify the design of a studio and projects. In one embodiment, a third level of user permission, the third level of user permission having administrator rights associated with a particular studio and not other studios and a fourth level of user permission, the fourth level of user permission having administrator rights associated with a plurality of studios. In one embodiment, the fourth level of user permission includes administrator rights associated with all studios on the system. In one embodiment, the method may include providing a set of tools to perform operations on the media and projects associated with the studio, and making the tools available to users associated with the studio.

In one embodiment, a video storage processing system may include: a first database table that stores information related to projects associated with a production of at least a video including video of physical objects; a second database table that stores information related to a set of electronic folders for organization of electronic video clips associated with a video project, the project associated with production of at least a video including video of physical objects; a first computer including a user interface associated with the particular project that displays studios, the studios being selectable by a user; and a resource that, receives, in the first computer, a request to display, on a plurality of remote computer systems, representations of the set of electronic folders for organization of electronic video clips associated with the video project, in order to solicit video input from the plurality of remote computer systems for respective folders for organization of electronic video clips associated with the project; receives video from at least some of the plurality of remote computer systems; and transmits electronic data over a network, for receipt at the remotely located computer system associated with a producer, the electronic data causing the remotely located computer system associated with the producer to display a representation of the received video in a selected respective folder among the respective folders for organization of electronic video clips, the representation showing a graphical relationship between the selected respective folder and the other respective folders for organization of electronic video clips associated with the project. In one embodiment, the resource comprises computer software. In one embodiment, the resource comprises electronic circuits. In one embodiment, the resource comprises computer software and electronic circuits. In one embodiment, the first computer is on a content distribution network (CDN). In one embodiment, the system may include: a network of application servers at least one of the application servers including a resource for receiving video and transmitting electronic data; and a network of storage servers including the first and second database tables.

In one embodiment, an article of manufacture may include: a computer readable storage medium; and programmable instructions embodied in said medium for execution by at least one computer, wherein execution causes said at least one computer to perform functions comprising: receiving, in a first computer system from a remotely located computer system associated with a user, input for creation of a set of electronic folders for organization of electronic video clips associated with a project, the project associated with production of at least a video including video of physical objects; generating the set of electronic folders for organization of electronic video clips associated with the project, the electronic folders for organizing video input from a plurality of remote computer systems to respective folders for organization of electronic video clips associated with the project; receiving video from at least some of the plurality of remote computer systems; providing an interface to allow for selection of subportions of received video for submission to respective folders for organization of electronic video clips associated with the project; receiving from a remote computer system a request to submit a selected subportion of the received video to a selected one of the respective folders for organization of electronic video clips associated with the project, and recording the selection in metadata; associating the selected subportion of the received video with the selected respective folder; receiving, in the first computer system from the remotely located computer system associated with the user of the video project, input for creating a combination of a plurality of received electronic video clips associated with the project, the combination to generate a video for the project; and generating the video for the project based on the input from the remotely located computer system associated with the user of the video project and a videos in the set of electronic folders for organization of electronic video clips associated with the project. In one embodiment, the computer readable storage medium comprises a non-transitory computer readable disk.

In one embodiment, a method for collaborative video editing may include: generating an editing user interface for editing of media via a plurality of computer systems, the editing user interface including input for edit commands to a single edit decision list; transmitting electronic data over a network for receipt in a plurality of remote computer systems associated with a plurality of users, the electronic data causing the remote computer systems to display the editing user interface; receiving data over the network associated with edit commands from the plurality of users to a single video project for creating a single video export; recording edit commands to the media based on inputs from the plurality of users from remotely located computer systems onto the single edit decision list; transmitting to the plurality of remotely located computer systems a current state of the project based on the single edit decision list; receiving additional edit commands from the plurality of users and transmitting a new current state of the project based on the single edit decision list; and providing the single video export based on the single edit decision list modified with edits from the plurality of users on remotely located computer systems. In one embodiment, the edit commands are recorded in a chronological order that the edit commands are made by the plurality of users. In one embodiment, the edit commands include inputs for adding to the edit decision list and inputs for deleting from the edit decision list, wherein for edit commands submitted simultaneously, inputs for adding to the edit decision list are prioritized over inputs for deleting from the edit decision list. In one embodiment, the edit commands comprise: inputs for adding media files to the edit decision list; inputs for marking start points and stop points for media files; inputs for arranging an order of media files; inputs for applying transitions to media files; inputs for applying effects to media files; inputs for adjusting audio levels of media files; inputs for deleting media files from the edit decision list; and inputs for undoing changes made to the edit decision list. In one embodiment, recording edit commands to the media occurs via background communication with a server without interfering with a current state of the page. In one embodiment, the editing interface may include inputs for applying titles to media files. In one embodiment, the editing interface may include inputs for applying zoom and movement to media files. In one embodiment, the editing interface may include inputs for placing images and banners over media files. In one embodiment, the method may include computer readable code for recording previous edits to enable restoring the single video export to a previous version. In one embodiment, the method may include a resource that provides a first level of access to a user associated with a particular project and a lesser level of access to other users submitting media to the project, wherein the producer of the video project is granted the first level of access, and wherein the input for creation combining of a plurality of received electronic video clips includes edit commands. In one embodiment, the first level of access includes limited rights to submit edit commands and the lesser level of access does not include rights to submit edit commands. In one embodiment, the first level of access includes rights to set prices for purchase of electronic video clips. In one embodiment, the edit commands are stored as metadata. In one embodiment, the method may include a resource that applies the edit commands to the single video project to provide access to users to view the single video export. In one embodiment, the method may include providing an interface enabling management of a set of electronic folders for organization of electronic video clips used to create the single video project. In one embodiment, the media is video.

In one embodiment, a system for collaborative video editing may include: an editing user interface for editing of a video via a plurality of computer systems, the editing user interface including input for edit commands to a single edit decision list; electronic data transmitted over a network for receipt in a plurality of remote computer systems associated with a plurality of users, the electronic data causing the remote computer systems to display the editing user interface; a resource for receiving data over the network associated with edit commands from the plurality of users to a single video project for creating a single video export; a storage for recording edit commands to the video based on inputs from the plurality of users from remotely located computer systems onto the single edit decision list; a resource for transmitting to the plurality of remotely located computer systems based on the single edit decision list; a resource for receiving additional edit commands from the plurality of users and transmitting a new current state of the video based on the single edit decision list; and a resource for providing an edited video based on the single edit decision list modified with edits from the plurality of users on remotely located computer systems.

In one embodiment, a video editing user interface may include: a display of folders including media selectable by a user for including and editing in a video project; a media screen display that plays a portion of media selected by the user; a timeline that displays timestamps of the media as the media is being played; a resource that causes inputs for editing commands to a single edit decision list to be displayed, wherein the editing commands are received from the user and other users on remotely located computer systems; a resource for receiving additional editing commands from the user and other users, wherein the media screen display displays a current state of the edited video project based on the single edit decision list; and wherein the media screen display displays the edited video project upon request by the user and other users on remotely located computer systems. In one embodiment, the interface may include a chat module for users to exchange messages regarding the video project. In one embodiment, the editing commands include: inputs for adding media files to the edit decision list; inputs for marking start points and stop points for media files; inputs for arranging an order of media files; inputs for applying transitions to media files; inputs for applying effects to media files; inputs for adjusting audio levels of media files; inputs for deleting media files from the edit decision list; and inputs for undoing changes made to the edit decision list. In one embodiment, an article of manufacture may include: a non-transitory computer readable storage medium; and programmable instructions embodied in said medium for execution by at least one computer, wherein execution causes said at least one computer to perform functions comprising: recording a new collaboratively edited cut in a database, wherein a user is recorded as a moderator of a cut; receiving data for inviting and adding other users as collaborators of the cut, wherein the data is recorded in a database as invitations, acceptances or denials; providing access to the collaborators to an editing interface for editing of the cut, the editing user interface including inputs for editing an edit decision list; receiving data related to suggestions by the collaborators of the cut; transmitting data over a network associated with the cut for creating a single video export; receiving data over the network associated with edits to the cut for creating the single video export; recording edits to the cut based on inputs from the collaborators and moderator; transmitting a current state of the cut to remote systems based on the single edit decision list; receiving additional edits to the cut from the remote systems; and providing the collaboratively edited cut when requested by the collaborators and moderator. In one embodiment, the inputs for editing the edit decision list comprise one or more of: inputs for adding media files to the edit decision list; inputs for marking start points and stop points for media files; inputs for arranging an order of media files; inputs for applying transitions to media files; inputs for applying effects to media files; inputs for adjusting audio levels of media files; inputs for deleting media files from the edit decision list; and inputs for undoing changes made to the edit decision list.

In one embodiment, a method for exporting an edited media product may include: receiving inputs related to the edited media product, wherein the inputs include selection of an export format; recording the selection of the export format; accessing metadata related to an edit decision list created by a user for the edited media product; applying the metadata to a component of each media file to create a clip; converting the clip to a temporary conversion format; accessing an effect time in the edit decision list; breaking the clip into individual frames; accessing effect images from a library; calculating a length of effect time proportionately over the number of effect images; calculating and identifying an appropriate effect image for each individual frame based on the length of effect time; combining each individual frame with the appropriate effect image into a new combined frame; assembling the new combined frames into the clips; joining the clips to a completed media file in an order specified in the edit decision list; and converting the completed media file to the selected export format. In one embodiment, the method may also include storing the clips on a tangible computer medium. In one embodiment, the method may also include electronically transmitting the stored clips over a computer network to a remote computer system for storing on a computer readable medium accessible from the remote computer system. In one embodiment, each media file comprises a video component and an audio component, the metadata is applied separately to the video component and the audio component to create a video clip and an audio clip, the video clip and the audio clip are converted separately to a temporary video conversion format and a temporary audio conversion format, the video clips and the audio clips are separately joined into a joined video file and a joined audio file, and the joined video file and the joined audio file are combined into the completed media file. In one embodiment, the metadata related to the edit decision list comprises one or more of: in and out points for at least one media file, wherein each media file includes a video component and an audio component, and wherein each media file corresponds to an original media file stored on a storage server; transitions or effects for at least one media file; and a list describing an order for a sequence of each media file in the edited media product. In one embodiment, the method may include applying the effects and transitions to the video clip and the audio clip. In one embodiment, the temporary video conversion format is AVI format. In one embodiment, the temporary audio conversion format is PCM format. In one embodiment, the temporary audio conversion format is MP3 format. In one embodiment, the method may include storing the completed media file in storage for download by a user. In one embodiment, the inputs related to the edited media product further include edit commands made to low resolution media files, and wherein the selected export format is a higher resolution format. In one embodiment, the low resolution media files have a lower resolution to the degree of at least 1% less through its conversion into lower data rate, smaller frame size, lower frame rate and/or more compressed media codec/format and use less storage than files in the higher resolution format. In one embodiment, the low resolution media files are stored on a proxy server. In one embodiment, the selected export format includes a frame size, a frame rate, and a data rate. In one embodiment, the selected export format is a format compatible to be viewed on a mobile device.

In one embodiment, a method for exporting an edited media product may include: receiving inputs related to the edited media product, wherein the inputs include a selection of an export format; recording the selection of the export format; accessing metadata related to an edit decision list created by a user for the edited media product, the edit decision list including: in and out points for at least one media file, wherein each media file includes a video component and an audio component, and wherein each media file corresponds to an original media file stored on a storage server; transitions or effects for at least one media file; and a list describing an order for a sequence of each media file in the edited media product; applying the in and out points to the video component of each media file to create a video clip; converting the video clip to the selected export format; applying the in and out points to the audio component of each media file to create an audio clip; converting the audio clip to the selected export format; applying the effects and transitions to the video clip and the audio clip; joining the video clips to a joined video file in the order specified in the edit decision list; joining the audio clips to a joined audio file in the order specified in the edit decision list; and combining the joined video file and joined audio file to one completed media file. In one embodiment, the step of applying the effects and transitions to the video clip and the audio clip comprises: accessing an effect time in the edit decision list; breaking the video clip and audio clip into individual frames; accessing effect images from a library; calculating a length of effect time proportionately over the number of effect images; calculating and identifying an appropriate effect image for each individual frame based on the length of effect time; combining each individual frame with the appropriate effect image into a new combined frame; and assembling the new combined frames into the video clip and audio clip.

In one embodiment, a system for exporting an edited media product may include: a resource that receives inputs related to the edited media product, wherein the inputs include a selected export format; a memory for recording the selected export format; a resource that accesses metadata related to an edit decision list created by a user for the edited media product; a resource that applies the metadata to each media file to create a media clip; a resource that converts the media clip to the selected export format; a resource that joins the media clips to a joined media file in an order specified in the edit decision list; a resource that accesses an effect time in the edit decision list; a resource that breaks the media clips into individual frames; a resource that calculates a length of effect time proportionally over the number of effect images; a resource that calculates and identify an appropriate effect image for each individual frame based on the length of effect time; a resource that combines each individual frame with the appropriate effect image into a new combined frame; and a resource that assembles the new combined frames into the media clips for the joined media file.

In one embodiment, an article of manufacture may include: a computer readable storage medium; and programmable instructions embodied in said medium for execution by at least one computer, wherein execution causes said at least one computer to perform functions comprising: receiving inputs related to the edited media product, wherein the inputs include selection of an export format; recording the selection of the export format; accessing metadata related to an edit decision list created by a user for the edited media product; applying the metadata to a component of each media file to create a clip; converting the clip to a temporary conversion format; accessing an effect time in the edit decision list; breaking the clip into individual frames; accessing effect images from a library; calculating a length of effect time proportionately over the number of effect images; calculating and identifying an appropriate effect image for each individual frame based on the length of effect time; combining each individual frame with the appropriate effect image into a new combined frame; assembling the new combined frames into the clips; joining the clips to a completed media file in an order specified in the edit decision list; and converting the completed media file to the selected export format.

In one embodiment, a method for editing, receiving and processing video may include: receiving media submissions from remote devices associated with a plurality of users; storing media received from the remote devices associated with the plurality of users and at least a copy of the media received from the remote devices associated with the plurality of users, in a format for easier access; converting the media submissions for storage on a server into the format for easier access; providing a data organization structure including a mechanism for providing sets of folders, the sets of folders configurable based on input from a user, the sets of folders for media received from remote computer systems associated with the plurality of users; displaying a representation of the data organization structure including the sets of folders; organizing media submissions into the respective folders designated by the users based on user input in response to the display of the representation of the data organization including the sets of folders; displaying media from the storage to users creating a media product based on one or more media submissions; and creating the media product based on one or more media submissions based on user input in response to the displayed media from the storage, wherein the created media product is created based on media stored in the storage. In one embodiment, the method may include: receiving a selection of an export format; generating the media product in the selected export format from the media stored in the storage based on user input; and exporting the media product in the selected export format to a recipient computer system. In one embodiment, the format for easier access is a lower resolution and uses less storage than the media submissions received from the remote devices. In one embodiment, the user input in response to the displayed media from the storage include one or more of: commands for applying effects to the media, in and out points of the media, an indication of a layer order of the media, an indication of the volume level of the media, and identification of an order of the media. In one embodiment, the media product includes a plurality of high resolution footage combined into a single media product stored on a computer-readable medium. In one embodiment, the respective folders organize the media received from the remote devices into categories provided by users. In one embodiment, the method may include: transmitting electronic data over a network for receipt at the remote devices to display the representation of the data organization structure; and transmitting electronic data over a network for receipt at the remote devices to display the media from storage. In one embodiment, the method may include providing a plurality of varying levels of permissions for users for access to the set of electronic folders. In one embodiment, the method may include providing a first level of user permission and a second level of user permission, wherein the second level of user permission includes rights of the first level of user permission and additional rights. In one embodiment, the second level of user permission includes at least one of: access to private folders, rights to create notes on electronic video clips of media submissions, rights to place calls for footage, and rights to pay for media.

In one embodiment, an electronic media system may include: an interface to a distributed network of remote devices; logic that receives media submissions from remote devices associated with a plurality of users; a storage for storing media received from the remote devices associated with the plurality of users and for storing at least a copy of the media received from the remote devices associated with the plurality of users, in a format for easier access; a resource that converts the media submissions for storage on a server into the format for easier access; a data organization structure including a mechanism for providing sets of folders, the sets of folders configurable based on input from a user, the sets of folders for media received from remote computer systems associated with the plurality of users; a mechanism to cause display of a representation of the data organization structure including the sets of folders; a mechanism to organize media submissions into the respective folders designated by the users based on user input in response to the display of the representation of the data organization including the sets of folders; a mechanism to display media from the storage to users creating a media product based on one or more media submissions; and a mechanism to create the media product based on one or more media submissions based on user input in response to the displayed media from the storage, wherein the created media product is created based on media stored in the storage. In one embodiment, the system may include: a resource for receiving a selection of an export format; a resource for generating the media product in the selected export format from the media stored in the storage based on user input; and a resource for exporting the media product in the selected export format to a recipient computer system.

In one embodiment, a method of editing high resolution video over a computer network may include: storing high resolution footage on a database, the high resolution footage including video images of physical objects; creating lower resolution footage from the high resolution footage, the lower resolution footage having a lower resolution and using less storage than the high resolution footage and storing the lower resolution footage in the database; generating an editing user interface for editing of the lower resolution footage via a plurality of computer systems, the editing user interface including input for edit commands to a single edit decision list; transmitting electronic data associated with a single video project for creating a single video export, the electronic data causing the remote computer systems to display the editing user interface; receiving data over the network associated with edit commands from a plurality of users on the plurality of computer systems to the single video project for creating the single video export, the editing commands with respect to the lower resolution footage displayed on the remote computer system; recording edit commands to the video based on inputs from the plurality of users from remotely located computer systems onto the single edit decision list; and transmitting a current state of the video based on the single edit decision list for the plurality of remotely located computer systems. In one embodiment, the method may include: receiving a selection of an format; generating an edited video in the selected export format from the high resolution footage based on the modifications stored based on the received editing commands from the remote computer system; and exporting the edited video in the selected export format to a recipient computer system. In one embodiment, the edit commands comprise at least one of: inputs for adding media files to the single edit decision list; inputs for marking start points and stop points for media files; inputs for arranging an order of media files; inputs for applying transitions to media files; inputs for applying effects to media files; inputs for adjusting audio levels of media files; inputs for deleting media files from the single edit decision list; and inputs for undoing changes made to the single edit decision list. In one embodiment, the method may include computer readable code for recording previous edits to enable restoring the single video export to a previous version. In one embodiment, the method may include a resource that provides a first level of access to a user associated with a particular project and a lesser level of access to other users submitting media to the project, wherein a producer of the single video project is granted the first level of access. In one embodiment, the method may include an interface for enabling management of a set of electronic folders for organization of electronic video clips used to create the single video project.

In one embodiment, an article of manufacture may include: a computer readable storage medium; and programmable instructions embodied in said medium for execution by at least one computer, wherein execution causes said at least one computer to perform functions comprising: receiving media submissions from remote devices associated with a plurality of users over a computer network; storing media received from the remote devices associated with the plurality of users and at least a copy of the media received from the remote devices associated with the plurality of users, in a format for easier access; converting the media submissions for storage on a server into the format for easier access; providing a data organization structure including a mechanism for providing sets of folders, the sets of folders configurable based on input from a user, the sets of folders for media received from remote computer systems associated with the plurality of users; displaying a representation of the data organization structure including the sets of folders; organizing media submissions into the respective folders designated by the users based on user input in response to the display of the representation of the data organization including the sets of folders; displaying media from the storage to users creating a media product based on one or more media submissions; and creating the media product based on one or more media submissions based on user input in response to the displayed media from the storage, wherein the created media product is created based on media stored in the storage.

Various methods and architectures as described herein, such as the various processes shown in the flow charts herein or otherwise described herein or other processes or architectures, may be implemented in resources including computer software such as computer executable code embodied in a computer readable medium, or in electrical circuitry, or in combinations of computer software and electronic circuitry.

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description herein. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any one or more of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods.

The various features described above may be combined in various combinations. Without limitation, features described may be combined with various systems, methods and products described. Without limitation, multiple dependent claims may be made based on the description herein.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for editing, receiving and processing video, the method comprising:
   receiving media submissions from remote devices associated with a plurality of users;
   storing media received from the remote devices associated with the plurality of users and at least a copy of the media received from the remote devices associated with the plurality of users, in a format for easier access;

converting the media submissions for storage on a server into the format for easier access;

providing a data organization structure including a mechanism for providing sets of folders, the sets of folders configurable based on input from a user, the sets of folders for media received from remote computer systems associated with the plurality of users, wherein:

each folder includes a media clip having a clip ID, the clip ID being associated with a media ID and a hash ID, the media ID is associated with a parent media from which the media clip is created and has the format for easier access, and the hash ID is associated with an original media having a higher resolution than the parent media;

displaying a representation of the data organization structure including the sets of folders;

organizing media submissions into the respective folders designated by the users based on user input in response to the display of the representation of the data organization including the sets of folders;

displaying media from the storage to users creating a media product based on one or more media submissions; and creating the media product based on one or more media submissions based on user input in response to the displayed media from the storage, wherein the created media product is created based on media stored in the storage.

2. The method of claim 1, further comprising:
receiving a selection of an export format;
generating the media product in the selected export format from the media stored in the storage based on user input; and
exporting the media product in the selected export format to a recipient computer system.

3. The method of claim 1, wherein the format for easier access is a lower resolution and uses less storage than the media submissions received from the remote devices.

4. The method of claim 1, wherein the user input in response to the displayed media from the storage include one or more of: commands for applying effects to the media, in and out points of the media, an indication of a layer order of the media, an indication of the volume level of the media, and identification of an order of the media.

5. The method of claim 1, wherein the media product includes a plurality of high resolution footage combined into a single media product stored on a computer-readable medium.

6. The method of claim 1, wherein the respective folders organize the media received from the remote devices into categories provided by users.

7. The method of claim 1, further comprising:
transmitting electronic data over a network for receipt at the remote devices to display the representation of the data organization structure; and
transmitting electronic data over a network for receipt at the remote devices to display the media from storage.

8. The method of claim 1, including providing a plurality of varying levels of permissions for users for access to the set of electronic folders.

9. The method of claim 8, including providing a first level of user permission and a second level of user permission, wherein the second level of user permission includes rights of the first level of user permission and additional rights.

10. The method of claim 9, wherein the second level of user permission includes at least one of: access to private folders, rights to create notes on electronic video clips of media submissions, rights to place calls for footage, and rights to pay for media.

11. An electronic media system, the system comprising:
an interface to a distributed network of remote devices;
a processor;
a memory storing executable instructions for causing the processor to:
receive media submissions from remote devices associated with a plurality of users;
store in a storage media received from the remote devices associated with the plurality of users and store in the storage at least a copy of the media received from the remote devices associated with the plurality of users, in a format for easier access; and
convert the media submissions for storage on a server into the format for easier access; and
a data organization structure including a mechanism for providing sets of folders, the sets of folders configurable based on input from a user, the sets of folders for media received from remote computer systems associated with the plurality of users, wherein:
each folder includes a media clip having a clip ID, the clip ID being associated with a media ID and a hash ID,
the media ID is associated with a parent media from which the media clip is created and has the format for easier access, and
the hash ID is associated with an original media having a higher resolution than the parent media, wherein:
the memory further stores executable instructions for causing the processor to:
cause display of a representation of the data organization structure including the sets of folders;
organize media submissions into the respective folders designated by the users based on user input in response to the display of the representation of the data organization including the sets of folders;
display media from the storage to users creating a media product based on one or more media submissions; and
create the media product based on one or more media submissions based on user input in response to the displayed media from the storage, wherein the created media product is created based on media stored in the storage.

12. The system of claim 11, wherein the memory further stores executable instructions for causing the processor to:
receive a selection of an export format;
generate the media product in the selected export format from the media stored in the storage based on user input; and
export the media product in the selected export format to a recipient computer system.

13. An article of manufacture, comprising:
a non-transitory computer readable storage medium; and
programmable instructions embodied in said medium for execution by at least one computer, wherein execution causes said at least one computer to perform functions comprising:
receiving media submissions from remote devices associated with a plurality of users over a computer network;
storing media received from the remote devices associated with the plurality of users and at least a copy of the media received from the remote devices associated with the plurality of users, in a format for easier access;
converting the media submissions for storage on a server into the format for easier access;
providing a data organization structure including a mechanism for providing sets of folders, the sets of folders configurable based on input from a user, the sets of folders for media received from remote computer systems associated with the plurality of users, wherein:
each folder includes a media clip having a clip ID, the clip ID being associated with a media ID and a hash ID,
the media ID is associated with a parent media from which the media clip is created and has the format for easier access, and
the hash ID is associated with an original media having a higher resolution than the parent media;
displaying a representation of the data organization structure including the sets of folders;
organizing media submissions into the respective folders designated by the users based on user input in response to the display of the representation of the data organization including the sets of folders;
displaying media from the storage to users creating a media product based on one or more media submissions; and
creating the media product based on one or more media submissions based on user input in response to the displayed media from the storage, wherein the created media product is created based on media stored in the storage.

14. The method of claim 1, wherein the media submissions, the media clip, the parent media, and the original media respectively correspond to video submissions, a video clip, a parent video having a low-resolution format as a result of the converting step, and an original video submission having a high-resolution format.

15. The method of claim 1, wherein the media clip includes a video clip corresponding to a portion of a video extracted from the parent media and having an IN and OUT points with respect to the parent media.

16. The method of claim 1, wherein each folder is associated with a project and each project is associated with a studio, the project having a project ID being linked to a folder ID and a studio ID.

* * * * *